United States Patent
Takashima et al.

(10) Patent No.: US 9,203,622 B2
(45) Date of Patent: Dec. 1, 2015

(54) CRYPTOGRAPHIC PROCESSING SYSTEM, CRYPTOGRAPHIC PROCESSING METHOD, CRYPTOGRAHPIC PROCESSING PROGRAM, AND KEY GENERATION DEVICE

(71) Applicants: Katsuyuki Takashima, Tokyo (JP); Tatsuaki Okamoto, Tokyo (JP)

(72) Inventors: Katsuyuki Takashima, Tokyo (JP); Tatsuaki Okamoto, Tokyo (JP)

(73) Assignees: Mitsubishi Electric Corporation, Chiyoda-ku (JP); NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 14/355,699

(22) PCT Filed: Nov. 12, 2012

(86) PCT No.: PCT/JP2012/079210
§ 371 (c)(1),
(2) Date: May 1, 2014

(87) PCT Pub. No.: WO2013/073488
PCT Pub. Date: May 23, 2013

(65) Prior Publication Data
US 2014/0298028 A1 Oct. 2, 2014

(30) Foreign Application Priority Data
Nov. 18, 2011 (JP) .................................. 2011-252244

(51) Int. Cl.
*H04L 29/06* (2006.01)
*H04L 9/30* (2006.01)
*H04L 9/08* (2006.01)

(52) U.S. Cl.
CPC ............ *H04L 9/3073* (2013.01); *H04L 9/0822* (2013.01); *H04L 2209/601* (2013.01)

(58) Field of Classification Search
CPC ............................ H04L 9/3073; H04L 9/0827
USPC ............................................................. 713/171
See application file for complete search history.

(56) References Cited

U.S. PATENT DOCUMENTS 7,634,085 B1   12/2009   Sahai et al.
8,559,638 B2   10/2013   Takashima et al.
(Continued)

FOREIGN PATENT DOCUMENTS

| JP | 2010-273317 | 12/2010 |
| JP | 2011-141472 | 7/2011 |
| JP | 2011-232475 | 11/2011 |

OTHER PUBLICATIONS

International Search Report issued Dec. 25, 2012, in PCT/JP2012/079210, filed Nov. 12, 2012.
(Continued)

*Primary Examiner* — Michael S McNally
(74) *Attorney, Agent, or Firm* — Oblon, McClelland, Maier & Neustadt, L.L.P.

(57) ABSTRACT

A cryptographic processing system and method to decrease the sizes of public parameters and a master secret key, and shorten the time taken for the generation process of the secret key to be supplied to the user and the encryption process. A generation device generates a basis B and a basis B* that form public parameters and a master secret key using a sparse matrix in which each row and each column have at least one value other than 0. An encryption device generates a vector in the basis B, the vector being embedded with predetermined information, as a cipher vector. A decryption device, by treating a predetermined vector in the basis B* as a key vector, conducts a pairing operation for the cipher vector and the key vector, to decrypt the cipher vector.

15 Claims, 23 Drawing Sheets

(56) References Cited

U.S. PATENT DOCUMENTS

| | | | |
|---|---|---|---|
| 2009/0080658 A1 | 3/2009 | Waters et al. | |
| 2012/0027206 A1* | 2/2012 | Suzuki et al. | 380/44 |
| 2012/0027210 A1* | 2/2012 | Takeuchi et al. | 380/255 |
| 2012/0297201 A1* | 11/2012 | Matsuda et al. | 713/189 |
| 2013/0028415 A1 | 1/2013 | Takashima et al. | |
| 2013/0039489 A1 | 2/2013 | Takashima et al. | |
| 2013/0091081 A1* | 4/2013 | He et al. | 706/12 |
| 2013/0114810 A1* | 5/2013 | Kobayashi et al. | 380/47 |

OTHER PUBLICATIONS

Nuttapong Attrapadung, et al., "Functional Encryption for Inner Product: Achieving Constant-Size Ciphertexts with Adaptive Security or Support for Negation", PKC, LNCS, vol. 6056, 2010, 384-402.

John Bethencourt, et al., "Ciphertext-Policy Attribute-Based Encryption", IEEE Symposium on Security and Privacy, 2007, pp. 321-334.

Dan Boneh, et al., "Generalized Identity Based and Broadcast Encryption Schemes", ASIACRYPT, LNCS, vol. 5350, 2008, pp. 455-470.

Vipul Goyal, et al., "Attribute-Based Encryption for Fine-Grained Access Control of Encrypted Data", ACM Conference on Computer and Security, 2006, 28 pages.

Jonathan Katz, et al., "Predicate Encryption Supporting Disjunctions, Polynomial Equations, and Inner Products", EUROCRYPT, LNCS, vol. 4965, 2008, 28 pages.

Allison Lewko, et al., "Fully Secure Functional Encryption: Attribute-Based Encryption and (Hierarchical) Inner Product Encryption", EUROCRYPT, LNCS, 2010, 56 pages.

Allison Lewko, et al., "New Techniques for Dual System Encryption and Fully Secure HIBE with Short Ciphertexts", TCC, LNCS, vol. 5978, 2010, 22 pages.

Tatsuaki Okamoto, et al., "Homomorphic Encryption and Signatures from Vector Decomposition", PAIRING, LNCS, vol. 5209, 2008, pp. 57-74.

Tatsuaki Okamoto, et al., "Hierarchical Predicate Encryption for Inner-Products", ASIACRYPT, LNCS, vol. 5912, 2009, pp. 214-231.

Tatsuaki Okamoto, et al., "Fully Secure Functional Encryption with General Relations from the Decisional Linear Assumption", Advances in Cryptology, CRYPTO, LNCS, vol. 6223, 2010, pp. 191-208.

Amit Sahai, et al., "Fuzzy Identity-Based Encryption", EUROCRYPT, LNCS, vol. 3494, 2005, 15 pages.

Brent Waters, "Dual System Encryption: Realizing Fully Secure IBE and HIBE under Simple Assumptions", CRYPTO, LNCS, vol. 5677, 2009, 38 pages.

Allison Lewko, et al., "Decentralizing Attribute-Based Encryption", Cryptology Eprint Archive, http://eprint.iacr.org/2010/351, Report 2010/351, Jun. 16, 2010, 29 pages.

Extended European Search Report issued Aug. 10, 2015 in Patent Application No. 12850218.4.

* cited by examiner

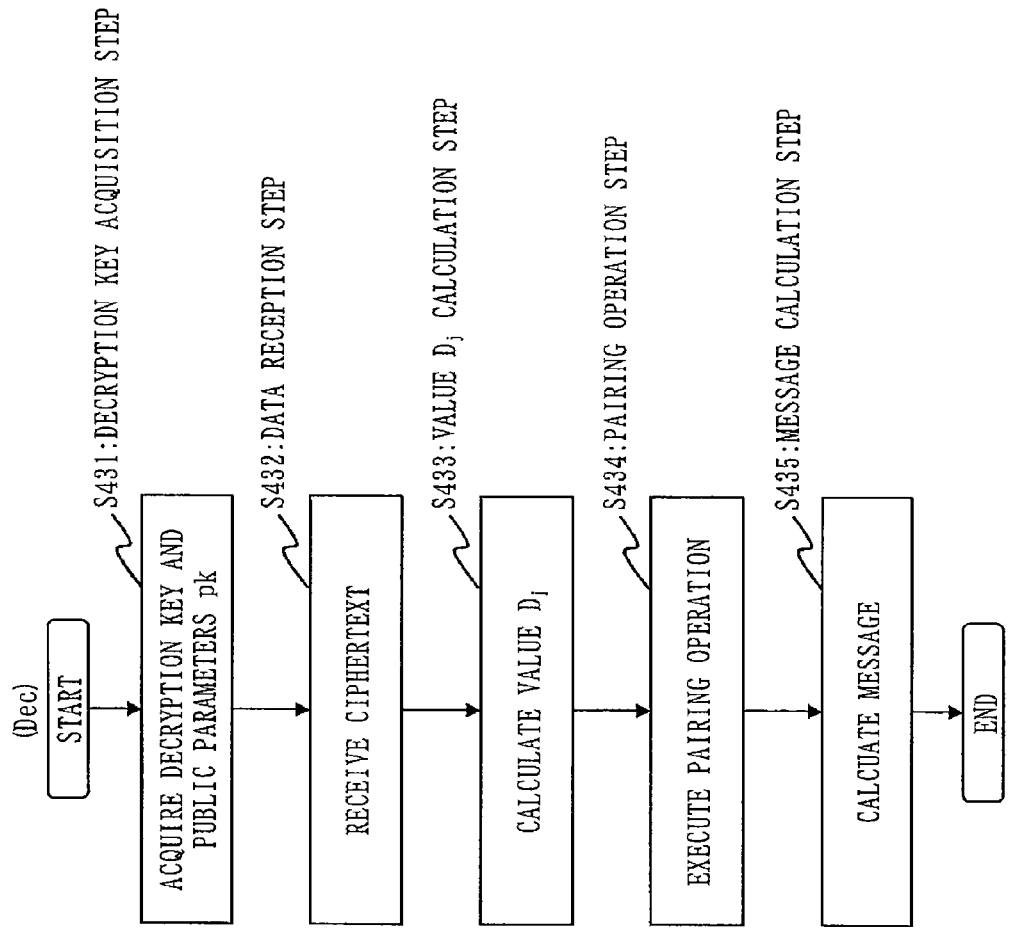

Fig. 22

| | SCHEME OF NON-PATENT LITERATURE 2 ZIPE with Short CTs | SCHEME OF NON-PATENT LITERATURE 2 NIPE with Short CTs | SCHEME OF EMBODIMENT 2 ZIPE with Short CTs | SCHEME OF EMBODIMENT 4 NIPE with Short CTs | SCHEME OF EMBODIMENT 3 ZIPE with Short SKs | SCHEME OF EMBODIMENT 5 NIPE with Short SKs |
|---|---|---|---|---|---|---|
| Security | Adaptive | Co-selective | Adaptive | Adaptive | Adaptive | Adaptive |
| Assump. | DLIN & DBDH | DLIN & DBDH | DLIN | DLIN | DLIN | DLIN |
| IP Rel. | Zero | Non-zero | Zero | Non-zero | Zero | Non-zero |
| PK Size | $(n+11)\|\mathbb{G}\|$ $+\|\mathbb{G}_T\|$ | $(n+11)\|\mathbb{G}\|$ $+\|\mathbb{G}_T\|$ | $(10n+13)\|\mathbb{G}\|$ $+\|\mathbb{G}_T\|$ | $(8n+23)\|\mathbb{G}\|$ $+\|\mathbb{G}_T\|$ | $(10n+13)\|\mathbb{G}\|$ $+\|\mathbb{G}_T\|$ | $(8n+23)\|\mathbb{G}\|$ $+\|\mathbb{G}_T\|$ |
| SK Size | $(n+6)\|\mathbb{G}\|$ $+(n+1)\|\mathbb{F}_q\|$ | $(n+6)\|\mathbb{G}\|$ | $(4n+1)\|\mathbb{G}\|$ | $(4n+5)\|\mathbb{G}\|$ | $9\|\mathbb{G}\|$ | $13\|\mathbb{G}\|$ |
| CT Size | $9\|\mathbb{G}\|+\|\mathbb{G}_T\|$ $+\|\mathbb{F}_q\|$ | $9\|\mathbb{G}\|$ $+\|\mathbb{G}_T\|$ | $9\|\mathbb{G}\|$ $+\|\mathbb{G}_T\|$ | $13\|\mathbb{G}\|$ $+\|\mathbb{G}_T\|$ | $(4n+1)\|\mathbb{G}\|$ $+\|\mathbb{G}_T\|$ | $(4n+5)\|\mathbb{G}\|$ $+\|\mathbb{G}_T\|$ |
| Dec Time | 9P+nM | 9P+nM | 9P+4(n−1)M | 13P+4(n−1)M | 9P+4(n−1)M | 13P+4(n−1)M |

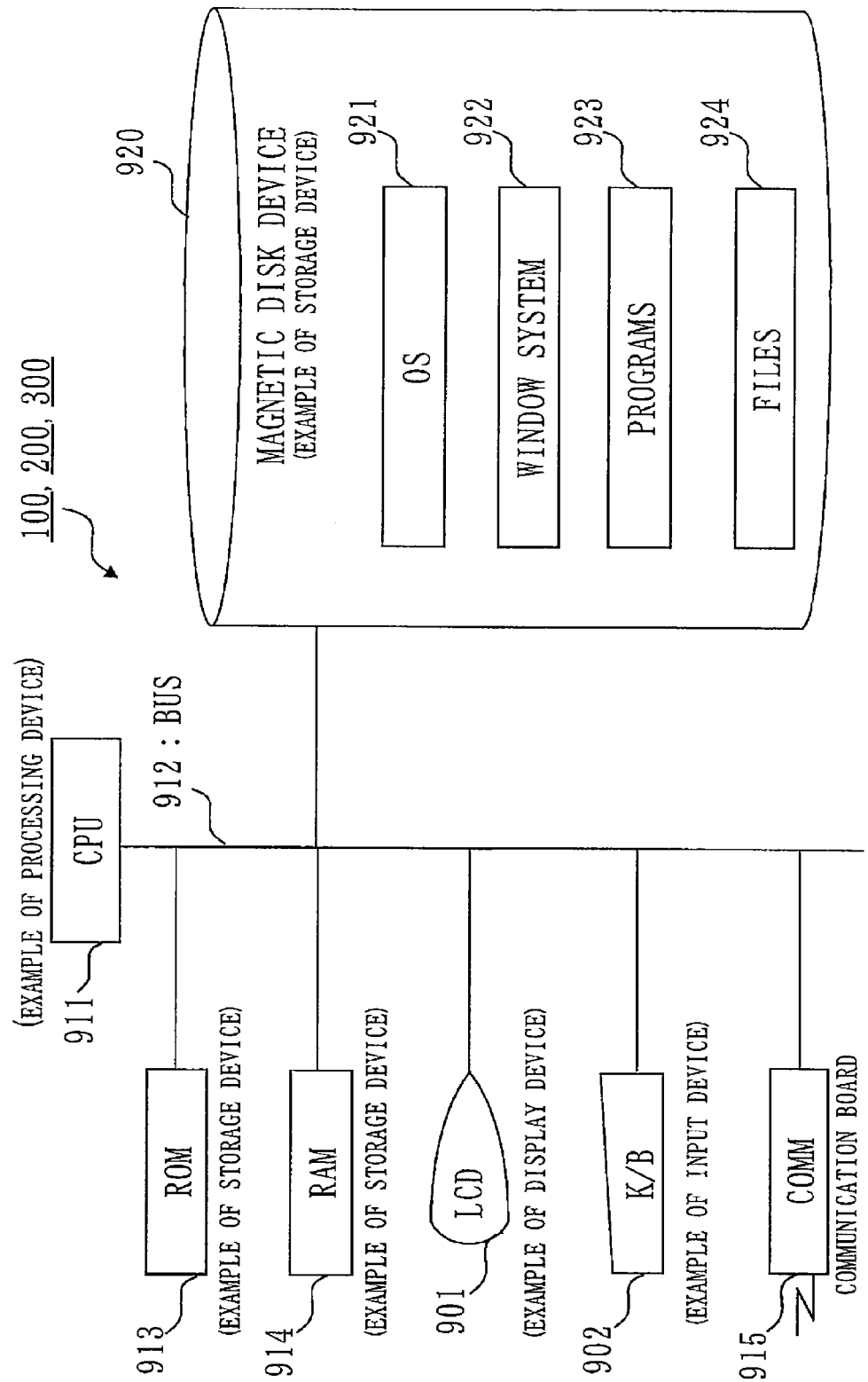

CRYPTOGRAPHIC PROCESSING SYSTEM, CRYPTOGRAPHIC PROCESSING METHOD, CRYPTOGRAHPIC PROCESSING PROGRAM, AND KEY GENERATION DEVICE

TECHNICAL FIELD

The present invention relates to inner-product encryption (IPE).

BACKGROUND ART

Non-Patent Literatures 13, 16, and 17 describe inner-product encryption.

According to the inner-product encryption described in Non-Patent Literatures 13, 16, and 17, a public parameter and a master secret key are given by the basis of a vector space.

CITATION LIST

Non-Patent Literature

Non-Patent Literature 1: Abdalla, M., Kiltz, E., Neven, G.: Generalized key delegation for hierarchical identity-based encryption. ESORICS'07, LNCS 4734, pp. 139-154. Springer, (2007)

Non-Patent Literature 2: Attrapadung, N., Libert, B.: Functional encryption for inner product: Achieving constant-size ciphertexts with adaptive security or support for negation. PKC 2010. LNCS, vol. 6056, pp. 384-402. Springer Heidelberg (2010)

Non-Patent Literature 3: Attrapadung, N., Libert, B., De Panafieu, E.: Expressive key-policy attribute-based encryption with constant-size ciphertexts. PKC 2011. LNCS, vol. 6571, pp. 90-108. Springer Heidelberg (2011)

Non-Patent Literature 4: Bethencourt, J., Sahai, A., Waters, B.: Ciphertext-policy attribute-based encryption. In:2007 IEEE Symposium on Security and Privacy, pp. 321-334. IEEE Press (2007)

Non-Patent Literature 5: Boneh, D., Hamburg, M.: Generalized identity based and broadcast encryption scheme. In:Pieprzyk, J. (ed.) ASIACRYPT 2008. LNCS, vol. 5350, pp. 455-470. Springer Heidelberg (2008)

Non-Patent Literature 6: Delerablee, C.: Identity-based broadcast encryption with constant size ciphertexts and private keys. In: ASIACRYPT 2007, LNCS, pp. 200-215. Springer-Verlag (2007)

Non-Patent Literature 7: Emura, K., Miyaji, A., Nomura, A., Omote, K., Soshi, M.: A ciphertext-policy attribute-based encryption scheme with constant ciphertext length. Proceedings of ISPEC 2009, LNCS, pp. 13-23. Springer-Verlag (2009)

Non-Patent Literature 8: Gentry, C., Waters, B.: Adaptive security in broadcast encryption systems (with short ciphertexts). In: Joux, A. (ed.) EUROCRYPT 2009. LNCS, vol. 5479, pp. 171-188. Springer Heidelberg (2009)

Non-Patent Literature 9: Goyal, V., Pandey, O., Sahai, A., Waters, B.: Attribute-based encryption for fine-grained access control of encrypted data. In: ACM Conference on Computer and Communication Security 2006, pp. 89-98, ACM (2006)

Non-Patent Literature 10: Herranz, J., Laguillaumie, F., Rafols, C.: Constant size ciphertexts in thereshold attribute-based encryption, In Nguyen, P. Q., Pointcheval, D. (eds.) PKC 2010. LNCS, vol. 6056, pp. 19-34. Springer Heidelberg (2010)

Non-Patent Literature 11: Katz, J., Sahai, A., Waters, B.: Predicate encryption supporting disjunctions, polynomial equations, and inner products. In: Smart, N. P. (ed.) EUROCRYPT 2008. LNCS, vol. 4965, pp. 146-162. Springer Heidelberg (2008)

Non-Patent Literature 12: Lewko, A., Sahai, A., Waters, B.: Revocation systems with very small private keys, In IEEE Symposium on Security and Privacy 2010 (2010)

Non-Patent Literature 13: Lewko, A., Okamoto, T., Sahai, A., Takashima, K., Waters, B.: Fully secure functional encryption: Attribute-based encryption and (hierarchical) inner product encryption, EUROCRYPT 2010. LNCS, Springer Heidelberg (2010) Full version is available at http://eprint.iacr.org/2010/110

Non-Patent Literature 14: Lewko, A. B., Waters, B.: New techniques for dual system encryption and fully secure HIBE with short ciphertexts. In: Micciancio, D. (ed.) TCC 2010. LNCS, vol. 5978, pp. 455-479. Springer Heidelberg (2010)

Non-Patent Literature 15: Okamoto, T., Takashima, K.: Homomorphic encryption and signatures from vector decomposition. In: Galbraith, S. D., Paterson, K. G. (eds.) Pairing 2008. LNCS, vol. 5209, pp. 57-74, Springer Heidelberg (2008)

Non-Patent Literature 16: Okamoto, T., Takashima, K.: Hierarchical predicate encryption for inner-products, In: Matsui, M. (ed.) ASIACRYPT 2009. LNCS, vol. 5912, pp. 214-231. Springer Heidelberg (2009)

Non-Patent Literature 17: Okamoto, T., Takashima, K.: Fully secure functional encryption with general relations from the decisional linear assumption. In: Rabin, T. (ed.) CRYPTO 2010. LNCS, vol. 6223, pp. 191-208. Springer Heidelberg (2010). Full version is available at http://eprint.iacr.org/2010/563

Non-Patent Literature 18: Sahai, A., Waters, B.: Fuzzy identity-based encryption. In: Cramer, R. (ed.) EUROCRYPT 2005. LNCS, vol. 3494, pp. 457-473. Springer Heidelberg (2005)

Non-Patent Literature 19: Sakai, R., Furukawa, J.: Identity-based broadcast encryption, IACR ePrint Archive: Report 2007/217 http://eprint.iacr.org/2007/217 (2007).

Non-Patent Literature 20: Waters, B.: Dual system encryption: realizing fully secure IBE and HIBE under simple assumptions. In: Halevi, S. (ed.) CRYPTO 2009. LNCS, vol. 5677, pp. 619-636. Springer Heidelberg (2009)

SUMMARY OF INVENTION

Technical Problem

According to the inner-product encryption described in Non-Patent Literatures 13, 16, and 17, assuming that the length of a vector employed in the inner-product encryption is defined as N, the sizes of public parameters and a master secret key are proportional to $N^2$, and the generation process of a secret key to be supplied to the user or an encryption process takes time that is proportional to $N^2$.

It is an object of the present invention to decrease the sizes of the public parameters and master secret key, and to shorten the time taken for the generation process of the secret key to be supplied to the user and the encryption process.

Solution to Problem

A cryptographic processing system according to the present invention is configured to utilize a basis B and a basis B* generated by transforming a predetermined basis A using a sparse matrix in which each row and each column have at least one value that is other than constant value 0, to conduct a cryptographic process, the cryptographic processing system comprising:

an encryption device which generates a vector in the basis B, the vector being embedded with predetermined information, as a cipher vector; and a decryption device which, by treating a predetermined vector in the basis B* as a key vector, conducts a pairing operation for the key vector and the cipher vector which is generated by the encryption device, so as to decrypt the cipher vector, and extracts information on the predetermined information.

Advantageous Effects of Invention

The cryptographic processing system according to the present invention uses a sparse matrix as a matrix that is used for generating bases B and B* which are to form public parameters and a master secret key. This decreases the sizes of the public parameters and master secret key, and shortens the time taken for the generation process of the secret key to be supplied to the user and the encryption process.

BRIEF DESCRIPTION OF DRAWINGS

[FIG. 21] is a flowchart showing the process of Dec algorithm according to Embodiment 5.

[FIG. 22] shows comparison of non-zero inner-product encryption schemes and zero inner-product encryption schemes explained in Embodiments 2 to 5 with the non-zero inner-product encryption scheme and the zero inner-product encryption scheme described in Non-Patent Literature 2.

[FIG. 23] is a diagram showing an example of the hardware configuration of each of the key generation device 100, the encryption device 200, the decryption device 300, and a key delegation device 400.

DESCRIPTION OF EMBODIMENTS

Figure 1:
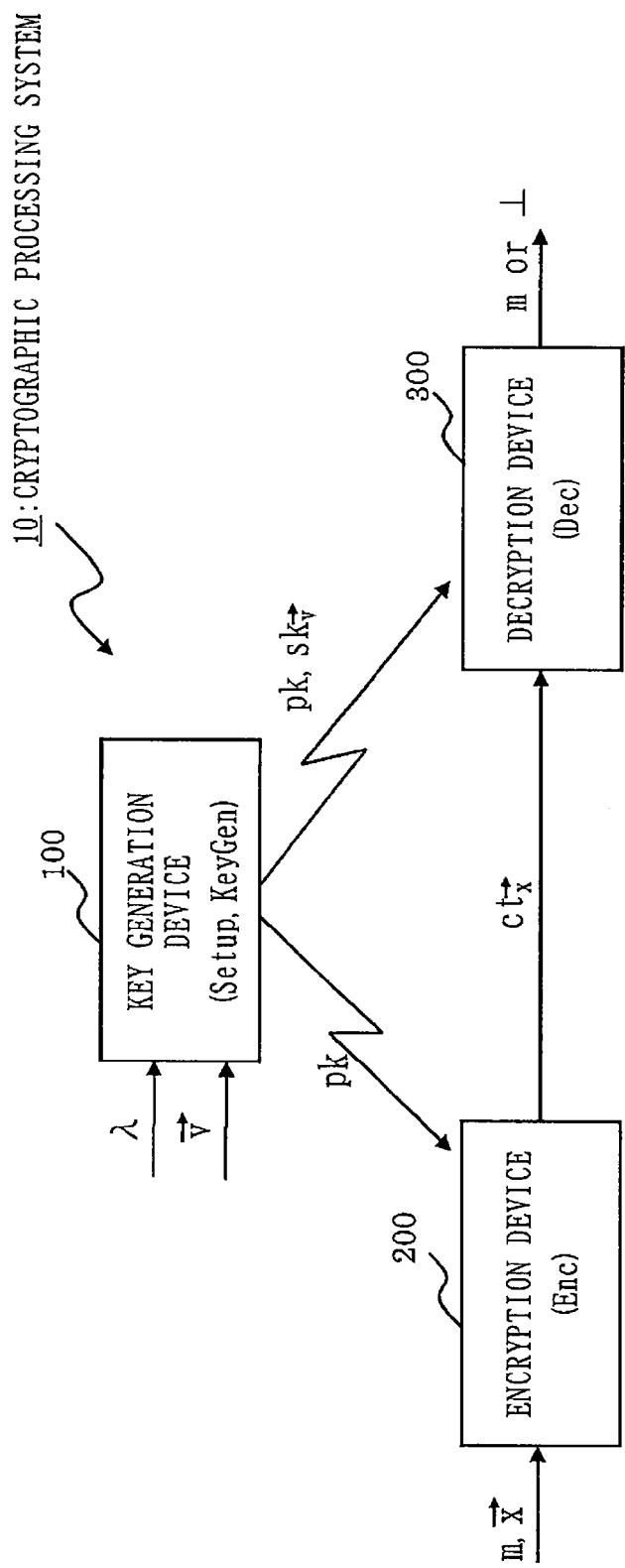
[FIG. 1] is a configuration diagram of a cryptographic processing system 10 which executes a zero inner-product encryption scheme and a non-zero inner-product encryption scheme.

Embodiments of the present invention will be described hereinafter with reference to the accompanying drawings.

In the following description, a processing device is, for example, a CPU 911 (to be described later). A storage device is, for example, a ROM 913, a RAM 914, or a magnetic disk 920 (each will be described later). A communication device is, for example, a communication board 915 (to be described later). An input device is, for example, a keyboard 902 or the communication board 915 (each will be described later). An output device is, for example, the RAM 914, the magnetic disk 920, the communication board 915, or an LCD 901 (each will be described later). Namely, the processing device, the storage device, the communication device, the input device, and the output device are hardware.

The notations in the following description will be explained.

When A is a random variable or distribution, Formula 101 denotes that y is randomly selected from A according to the distribution of A. Namely, in Formula 101, y is a random number.

$$y \xleftarrow{R} A \qquad \text{[Formula 101]}$$

When A is a set, Formula 102 denotes that y is uniformly selected from A. Namely, in Formula 102, y is a uniform random number.

$$y \xleftarrow{U} A \qquad \text{[Formula 102]}$$

A vector symbol denotes a vector representation of order q over a finite field $F_q$. For example, Formula 103 is established.

$\vec{x}$ denotes $$(x_1, \ldots, x_n) \in F_q^n \qquad \text{[Formula 103]}$$

Formula 104 denotes the inner-product, indicated by Formula 106, of two vectors $\vec{x}$ and $\vec{v}$ indicated by Formula 105.

$$\vec{x} \cdot \vec{v} \qquad \text{[Formula 104]}$$

$$\vec{x} = (x_1, \ldots, x_n)$$

$$\vec{v} = (v_1, \ldots, v_n) \qquad \text{[Formula 105]}$$

$$\Sigma_{i=1}^{n} x_i v_i \qquad \text{[Formula 106]}$$

Note that $X^T$ denotes the transpose of matrix X.

Where $b_i$ (i=1, ..., n) is an element of a vector in a space V, namely where Formula 107 is established, Formula 108 represents a subspace generated by Formula 109.

$$b_i \in \mathbb{V} \quad (i=1, \ldots, L)$$

$$\text{span}\langle b_1, \ldots, b_L \rangle \underline{\cup} \mathbb{V} \ (\text{resp. span}\langle \vec{x}_1, \ldots, \vec{x}_L \rangle) \quad \text{[Formula 108]}$$

$$b_1, \ldots, b_L \ (\text{resp. } \vec{x}_1, \ldots, \vec{x}_L) \quad \text{[Formula 109]}$$

For bases B and B* indicated by Formula 110, Formula 111 is established.

$$\mathbb{B} := (b_1, \ldots, b_N)$$

$$\mathbb{B}^* := (b_1^*, \ldots, b_N^*) \quad \text{[Formula 110]}$$

$$(x_1, \ldots, x_N)_\mathbb{B} := \Sigma_{i=1}^N x_i b_i,$$

$$(y_1, \ldots, y_N)_\mathbb{B} := \Sigma_{i=1}^N y_i b_i^*, \quad \text{[Formula 111]}$$

For n of vectors j=1, ..., n, $\vec{e}_j$ denotes the canonical basis vector indicated by Formula 112.

$$\vec{e}_j : \left( \overbrace{0 \ldots 0}^{j-1}, 1, \overbrace{0 \ldots 0}^{n-j} \right) \in \mathbb{F}_q^n \quad \text{[Formula 112]}$$

for $j = 1, \ldots, n$

Note that GL(n, $\mathbb{F}_q$) stands for a general linear group with an order n over the finite field $\mathbb{F}_q$.

In the following description, when "→" indicating a vector is attached to a subscript or superscript, "→" is attached as a superscript to the subscript or superscript. Likewise, when "*" in a basis B* is attached to a subscript or superscript, "*" is attached as a superscript to the subscript or superscript. Likewise, when t in a space $V_t$ is attached to a subscript or superscript, "t" is attached as a subscript to the subscript or superscript.

In the following description, a cryptographic process includes an encryption process, a decryption process, and a key generation process.

Embodiment 1

This embodiment explains a basic concept for implementing an inner-product encryption, and a structure of the inner-product encryption.

First, the concept of the inner-product encryption will be explained.

Second, dual pairing vector spaces (DPVS) which are a space for implementing the inner-product encryption will be explained.

Third, the basic structure of an inner-product encryption scheme to be described in the following embodiments will be explained.

Fourth, the basic structure of a cryptographic processing system 10 which implements the inner-product encryption scheme to be described in the following embodiments will be explained.

Fifth, the basic approach to the inner-product encryption scheme to be described in the following embodiments will be explained.

<1. Concept of Inner-Product Encryption>

First, functional encryption will be explained.

The functional encryption is an advanced concept of encryption. The functional encryption is also a generalization of public-key encryption (PKE) and ID-based encryption (Identity-based encryption; IBE). In functional encryption systems, a receiver can decrypt a ciphertext using a secret key corresponding to a parameter x if the parameter x is suitably related to a parameter y specified for the ciphertext. More specifically, decryption requires R(x, y)=1 for some relation R (relation R that holds for (x, y)).

The inner-product encryption is a kind of functional encryption.

The inner-product encryption includes zero inner-product encryption (ZIPE) and non-zero inner-product encryption (NIPE).

According to the zero inner-product encryption, a cipher encrypted with vector $\vec{x}$ can be decrypted by a secret key associated with vector $\vec{y}$ such that $\vec{x} \cdot \vec{y} = 0$. Namely, $R^{ZIPE}(\vec{x}, \vec{y}) = 1$ is required if and only if $\vec{x} \cdot \vec{y} = 0$.

According to the non-zero inner-product encryption, a cipher encrypted with vector $\vec{x}$ can be decrypted by a secret key associated with vector $\vec{y}$ such that $\vec{x} \cdot \vec{y} \neq 0$. Namely, $R^{NIPE}(\vec{x}, \vec{y}) = 1$ is required if and only if $\vec{x} \cdot \vec{y} \neq 0$.

<2. Dual Pairing Vector Spaces>

First, symmetric bilinear pairing groups will be described.

The symmetric bilinear pairing groups (q, G, $G_T$, g, e) are a tuple of a prime q, a cyclic additive group G of order q, a cyclic multiplicative group $G_T$ of order q, an element $g \neq 0 \in G$, and a polynomial-time computable nondegenerate bilinear pairing e:G×G→$G_T$. The nondegenerate bilinear pairing signifies e(sg, tg)=e(g, g)$^{st}$ where e(g, g)≠1.

In the following description, let $G_{bpg}$ be an algorithm that takes input $1^\lambda$ and outputs the value of a parameter param$_G$:=(q, G, $G_T$, g, e) of bilinear pairing groups with a security parameter λ.

Dual pairing vector spaces will now be described.

The dual pairing vector spaces (q, V, $G_T$, A, e) can be constituted by a direct product of symmetric bilinear pairing groups (param$_G$:=(q, G, $G_T$, g, e)). The dual pairing vector spaces (q, V, $G_T$, A, e) are a tuple of a prime q, an N-dimensional vector space V over finite field $\mathbb{F}_q$ indicated in Formula 113, a cyclic group $G_T$ of the order q, and a canonical basis A:=($a_1$, ..., $a_N$) of a space V, and have the following operations (1) and (2) where $a_i$ is as indicated by Formula 114.

$$\mathbb{V} := \overbrace{\mathbb{G} \times \ldots \times \mathbb{G}}^{N} \quad \text{[Formula 113]}$$

$$a_i := \left( \overbrace{0, \ldots, 0}^{i-1}, g, \overbrace{0, \ldots, 0}^{N-i} \right) \quad \text{[Formula 114]}$$

Operation (1): Nondegenerate Bilinear Pairing
The pairing on the space V is defined by Formula 115.

$$e(x,y) := \Pi_{i=1}^N e(g_i, h_i) \in \mathbb{G}_T \quad \text{[Formula 115]}$$

where $(g_1, \ldots, g_N) := x \in \mathbb{V}$ $(h_1, \ldots, h_N) := y \in \mathbb{V}$ This is nondegenerate bilinear, i.e., e(sx, ty)=e(s, y)$^{st}$ and if e(x, y)=1 for all y∈V, then x=0. For all i and j, e($a_i$, $a_j$)=e(g, g)$^{\delta_{i,j}}$ ($\delta_{i,j}$ signifying $\delta_{i,j}$) where $\delta_{i,j}$=1 if i=j, and $\delta_{i,j}$=0 if i≠j. Also, e(g, g)≠1∈$G_T$.

Operation (2): Standard Maps
Linear transformation $\phi_{i,j}$ on the space V indicated by Formula 116 can be easily implemented by Formula 117.

$$\phi_{i,j}(a_j) = a_i \quad \text{[Formula 116]}$$

if $k \neq j$ then $\phi_{i,j}(a_k) = 0$

-continued $$\phi_{i,j}(x) := (\overbrace{0, \ldots, 0}^{i-1}, g_j, \overbrace{0, \ldots, 0}^{N-i})$$ [Formula 117]

Note that $(g_1, \ldots g_N) := x$

Linear transformation $\phi_{i,j}$ will be called "standard maps".

In the following description, let $G_{dpvs}$ be an algorithm that takes as input, $1^\lambda$ ($\lambda \in$ natural number) and $N \in$ natural number, and outputs the value of a parameter $param_v := (q, V, G_T, A, e)$ of dual pairing vector spaces which have a security parameter $\lambda$ and which form an N-dimensional space V.

A case will be described where dual pairing vector spaces are constructed from the symmetric bilinear pairing groups described above. Dual pairing vector spaces can be constructed from asymmetric bilinear pairing groups as well. The following description can be easily applied to a case where dual pairing vector spaces are constructed from asymmetric bilinear pairing groups.

<3. Basic Structure of Inner-Product Encryption Scheme>

First, the zero inner-product encryption scheme will be explained.

A relation $R^{ZIPE}$ in the zero inner-product encryption scheme is defined over a vector $x^\rightarrow \in F^n_q \backslash \{0^\rightarrow\}$ and a vector $v^\rightarrow \in F^n_q \backslash \{0^\rightarrow\}$, where $R^{ZIPE}(x^\rightarrow, v^\rightarrow) := 1$ if and only if $x^\rightarrow \cdot v^\rightarrow = 0$.

Likewise, a relation $R^{NIPE}$ in the non-zero inner-product encryption scheme is defined over a vector $x^\rightarrow \in F^n_q \backslash \{0^\rightarrow\}$ and a vector $v^\rightarrow \in F^n_q \backslash \{0^\rightarrow\}$, where $R^{NIPE}(x^\rightarrow, v^\rightarrow) := 1$ if and only if $x^\rightarrow \cdot v^\rightarrow \neq 0$.

The zero inner-product encryption scheme and the non-zero inner-product encryption scheme each consist of four algorithms: Setup, KeyGen, Enc, and Dec.

(Setup)

A Setup algorithm is a randomized algorithm that takes as input a security parameter $\lambda$ and outputs public parameters pk and a master secret key sk.

(KeyGen)

A KeyGen algorithm is a randomized algorithm that takes as input a vector $v^\rightarrow$, public parameters pk, and a master secret key sk, and outputs a decryption key $sk_{v^\rightarrow}$.

(Enc)

An Enc algorithm is a randomized algorithm that takes as input a message m, a vector $x^\rightarrow$, and public parameters pk, and outputs a ciphertext $ct_{x^\rightarrow}$.

(Dec)

A Dec algorithm is an algorithm that takes as input a ciphertext $ct_{x^\rightarrow}$ that was encrypted under a vector $x^\rightarrow$, a decryption key $sk_{v^\rightarrow}$ for vector $v^\rightarrow$, and public parameters pk, and outputs either a message m or distinguished symbol $\bot$. The distinguished symbol $\bot$ indicates that decryption could not be achieved.

<4. Basic Structure of Cryptographic Processing System 10>

FIG. 1 is a configuration diagram of a cryptographic processing system 10 which executes the zero inner-product encryption scheme and the non-zero inner-product encryption scheme.

A key generation device 100 executes the Setup algorithm by taking as input a security parameter $\lambda$, to generate public parameters pk and a master secret key sk. The key generation device 100 publicizes the generated public parameters pk. The key generation device 100 also executes the KeyGen algorithm by taking as input a vector $v^\rightarrow$, to generate a decryption key $sk_{v^\rightarrow}$, and distributes the decryption key $sk_{v^\rightarrow}$ to a decryption device 300 in secrecy.

An encryption device 200 executes the Enc algorithm by taking as input a message m, a vector $x^\rightarrow$, and the public parameters pk, to generate a ciphertext $ct_{x^\rightarrow}$. The encryption device 200 transmits the generated ciphertext $ct_{x^\rightarrow}$ to the decryption device 300.

The decryption device 300 executes the Dec algorithm by taking as input the public parameters pk, the decryption key $sk_{v^\rightarrow}$, and the ciphertext $ct_{x^\rightarrow}$, and outputs a message m' (=m) or distinguished symbol $\bot$.

<5. Basic Approach to Encryption Scheme>

In a typical application in which dual pairing vector spaces are applied to cryptographic processing, a pair of dual (or orthogonal) bases, B and B*, are generated. The bases B and B* are generated using a fully random linear transformation X (basis transformation matrix) uniformly selected from $GL(N, F_q)$. Particularly, the bases B and B* are each generated through conversion of a canonical basis A using linear transformations X and $(X^{-1})^T$ where N is the number of dimensions of span<B> and span <B*>.

The typical application in which the dual pairing vector spaces are applied to cryptographic processing employs part of the basis B (called B^) as a public parameter, and part of the corresponding basis B* (called B^*) as a secret key or trap door.

In the inner-product encryption to be explained in the following embodiments, a special form of random linear transformation X, being $X \in GL(N, F_q)$, is employed in place of the fully random linear transformation X described above. This special form of linear transformation X can decrease the sizes of the ciphertext and secret key, and decrease the number of pairing operations which are time-consuming to process.

Figure 2:
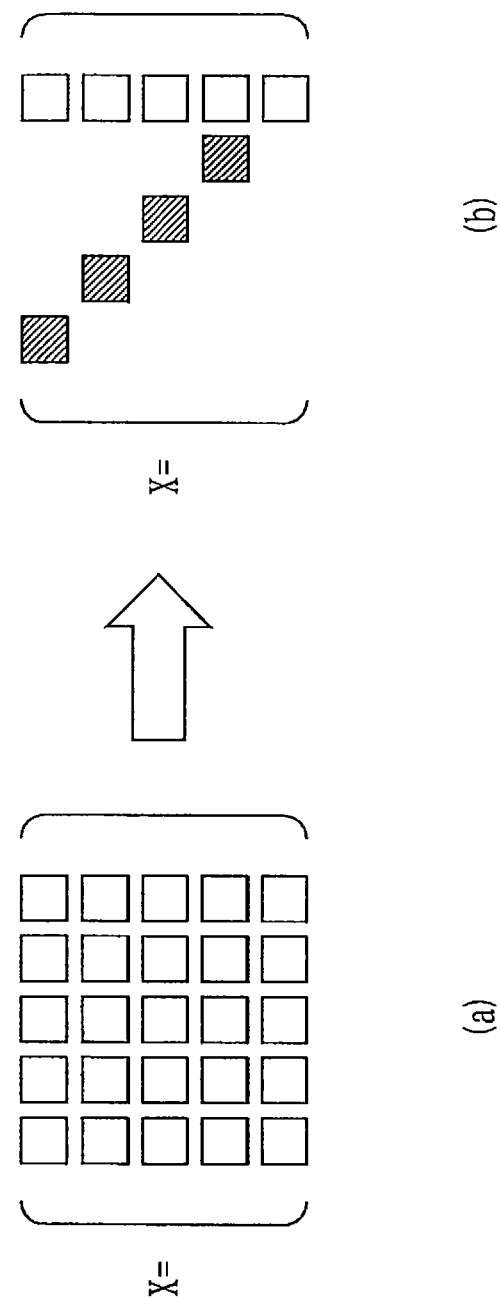
[FIG. 2] includes an explanatory drawing of a special form of random linear transformation X.

FIG. 2 includes an explanatory drawing of a special form of linear transformation X.

Fully random linear transformation X is shown in (a) of FIG. 2, and a special form of linear transformation X is shown in (b) of FIG. 2. In (a) and (b) of FIG. 2, square portions indicate components the values of which are random numbers other than 0. In (b) of FIG. 2, blank elements indicate components the values of which are 0. In (b) of FIG. 2, hatched squares indicate components the values of which are the same. Note that N=5.

As shown in (a) of FIG. 2, a conventional linear transformation X has a size of $N^2$ (here $5^2$=25). In contrast, as shown in (b) of FIG. 2, a linear transformation X employed in the inner-product encryption to be explained in the following embodiments (to be referred to as a new linear transformation X hereinafter) has a size of N+1 (here 5+1=6).

As mentioned above, the bases B and B* are generated through conversion of the canonical basis A using the linear transformation X. Accordingly, the sizes of the bases B and B* are proportional to the size of the linear transformation X. As described above, part of the basis B and part of the basis B* form the public parameter and the secret key. Hence, the sizes of the public parameter and secret key are proportional to the linear transformation X. More specifically, with the conventional linear transformation X, the sizes of the public parameter and secret key are proportional to $N^2$, whereas with the new linear transformation X, the sizes of the public parameter and secret key are proportional to N+1.

Consequently, with the conventional linear transformation X, the generation process of a user key or the encryption process takes time that is proportional to $N^2$, whereas with the new linear transformation X, the generation process of the user key or the encryption process takes time that is proportional to N+1. Namely, with the new linear transformation X, the calculation time is on the order of N.

A specific method of realizing a constant-size ciphertext and efficient decryption will be explained regarding the non-zero inner-product encryption scheme as an example.

Note that in the explanation of a ciphertext size, vector description will not be included as part of the ciphertext. Likewise, note that in the explanation of a decryption key size as well, vector description will not be included as part of the decryption key.

An explanation will be given using a simplified form of the non-zero inner-product scheme to be described in the following embodiments.

A ciphertext in a simplified non-zero inner-product encryption scheme consists of two vector elements $(c_0, c_1) \in G^5 \times G^n$, and $c_3 \in G_T$. A secret key consists of two vector elements $k^*_0$ and $k^*_1 \in G^5 \times G^n$. Note that $(c_0, c_1) \in G^5 \times G^n$ signifies that $c_0$ consists of five elements of G and $c_1$ consists of n of elements of G. Likewise, $k^*_0$ and $k^*_1 \in G^5 \times G^n$ signify that $k^*_0$ consists of five elements of G and $k^*_1$ consists of n of elements of G.

Therefore, to achieve a constant-size ciphertext, $c_1 \in G^n$ need be compressed to a constant size in n.

The special linear transformation X indicated by Formula 118 is employed.

$$X := \begin{pmatrix} \mu & & & \mu'_1 \\ & \ddots & & \vdots \\ & & \mu & \mu'_{n-1} \\ & & & \mu'_n \end{pmatrix} \in \mathcal{H}(n, \mathbb{F}_q) \quad \text{[Formula 118]}$$

Note that $\mu, \mu'_1, \ldots, \mu'_n$ are values uniformly selected from a finite field $\mathbb{F}_q$, and that a blank in the linear transformation X denotes a constant value $0 \in \mathbb{F}_q$. The constant value 0 signifies that the value is fixed to 0. Namely, $\mu, \mu'_1, \ldots, \mu'_n$ are uniform random values that can take 0 as well, whereas a blank in the linear transformation X have a value that is fixed to 0. Also, $H(n, \mathbb{F}_q)$ signifies a set of n-order matrices having the finite field $\mathbb{F}_q$ as an element.

The system parameter, or the public basis of DPVS is the basis B indicated by Formula 119.

$$\mathbb{B} := \begin{pmatrix} b_1 \\ \vdots \\ b_n \end{pmatrix} := \begin{pmatrix} \mu g & & & \mu'_1 g \\ & \ddots & & \vdots \\ & & \mu g & \mu'_{n-1} g \\ & & & \mu'_n g \end{pmatrix} \quad \text{[Formula 119]}$$

Let a ciphertext associated with $\vec{x} := (x_1, \ldots, x_n)$ be a ciphertext $c_1$ indicated by Formula 120.

$$c_1 := (\omega \vec{x}) \mathbb{B} = \omega(x_1 b_1 + \ldots + x_n b_n) = (x_1 \omega \mu g, \ldots, x_{n-1} \omega \mu g, \omega(\Sigma_{i=1}^n x_i \mu'_i) g) \quad \text{[Formula 120]}$$

Note that ω is a value uniformly selected from the finite field $\mathbb{F}_q$.

Then, the ciphertext $c_1$ can be compressed to the vector $\vec{x}$ and two group elements $C_1$ and $C_2$ indicated by Formula 121.

$$C_1 := \omega \mu g,$$

$$C_2 := \omega(\Sigma_{i=1}^n x_i \mu'_i) g \quad \text{[Formula 121]}$$

This is because the ciphertext $c_1$ can be obtained by $(x_1 C_1, \ldots, x_{n-1} C_1, C_2)$. Note that $x_i C_1 = x_i \omega \mu g$ holds for each i of i=1, . . . , n−1.

Hence, a ciphertext (excluding the vector $\vec{x}$) can consist of two group elements, and has a constant size in n.

Let $B^* := (b^*_i)$ be the dual orthogonal basis of $B := (b_i)$, and the basis $B^*$ be the master secret key in the simplified non-zero inner-product encryption scheme. Note that $(c_0, k^*_0, c_3)$ is specified such that $e(c_0, k^*_0) = gT^\zeta \cdot g_T^{\omega\delta}$ and $c_3 := g_T^\zeta m \in G_T$. Also, note that a secret key for the vector $\vec{v}$ is set as $k^*_1 (\delta \vec{v})_{B^*} = \delta(v_1 b^*_1 + \ldots + v_n b^*_n)$.

From the dual orthonormality of the bases B and $B^*$, it then holds that $e(c_1, k^*_1) = g_T^{\omega\delta(\vec{x} \cdot \vec{v})}$. Hence, a decryptor can compute $g_T^{\omega\delta}$ if and only if $\vec{x} \cdot \vec{v} \neq 0$. Namely, the decryptor can obtain a message m by Formula 122.

$$c_3 \cdot e(c_0, k_0^*)^{-1} \cdot e(c_1, k_1^*)^{(\vec{x} \cdot \vec{v})-1} \quad \text{[Formula 122]}$$

The ciphertext $c_1$ is expressed as $(x_1 C_1, \ldots, x_{n-1} C_1, C_2) \in G^n$, and the secret key $k^*_1$ is parsed as a n-tuple $(K_1, \ldots, K_n)$. Hence, the value of $e(c_1, k^*_1)$ is as indicated by Formula 123.

$$\prod_{i=1}^{n-1} e(x_i C_1, K_i) \cdot e(C_2, K_n) = \quad \text{[Formula 123]}$$

$$\prod_{i=1}^{n-1} e(C_1, x_i K_i) \cdot e(C_2, K_n) = e\left(C_1, \sum_{i=1}^{n-1} x_i K_i\right) \cdot e(C_2, K_n)$$

That is, n−1 scalar multiplications in G and two pairing operations are enough for computing $e(c_1, k^*_1)$. That is, only a small (constant) number of pairing operations are required for decryption. Generally, pairing operations take a long processing time. By decreasing the number of pairing operations, the processing time as the whole process can be shortened.

In the simplified non-zero inner-product encryption scheme, the ciphertext $c_1$ consists of only a basis vector (real encoding part) where the vector $\vec{x}$ is set, and the secret key $k^*_1$ consists of only a basis vector (real encoding part) where the vector $\vec{v}$ is set.

In the non-zero inner-product encryption scheme to be described in the following embodiments, in order to improve the security, basis vectors for a real encoding part as well as for a hidden part, a secret-key randomness part, and a ciphertext randomness part are added to the ciphertext $c_1$ and the secret key $k^*_1$.

Four this purpose, the linear transformation X is extended as indicated by Formula 124.

$$X := \begin{pmatrix} X_{1,1} & \ldots & X_{1,4} \\ \vdots & & \vdots \\ X_{4,1} & \ldots & X_{4,4} \end{pmatrix} \quad \text{[Formula 124]}$$

Note that each $X_{i,j}$ is of the form of $X \in H(n, \mathbb{F}_q)$ indicated by Formula 118. The vector space consists of four orthogonal subspaces. Namely, the vector space consists of four orthogonal subspaces for the real encoding part, hidden part, secret-key randomness part, and ciphertext randomness part.

Embodiment 2

In Embodiment 2, a non-zero inner-product encryption scheme having a constant-size ciphertext will be described.

Figure 3:
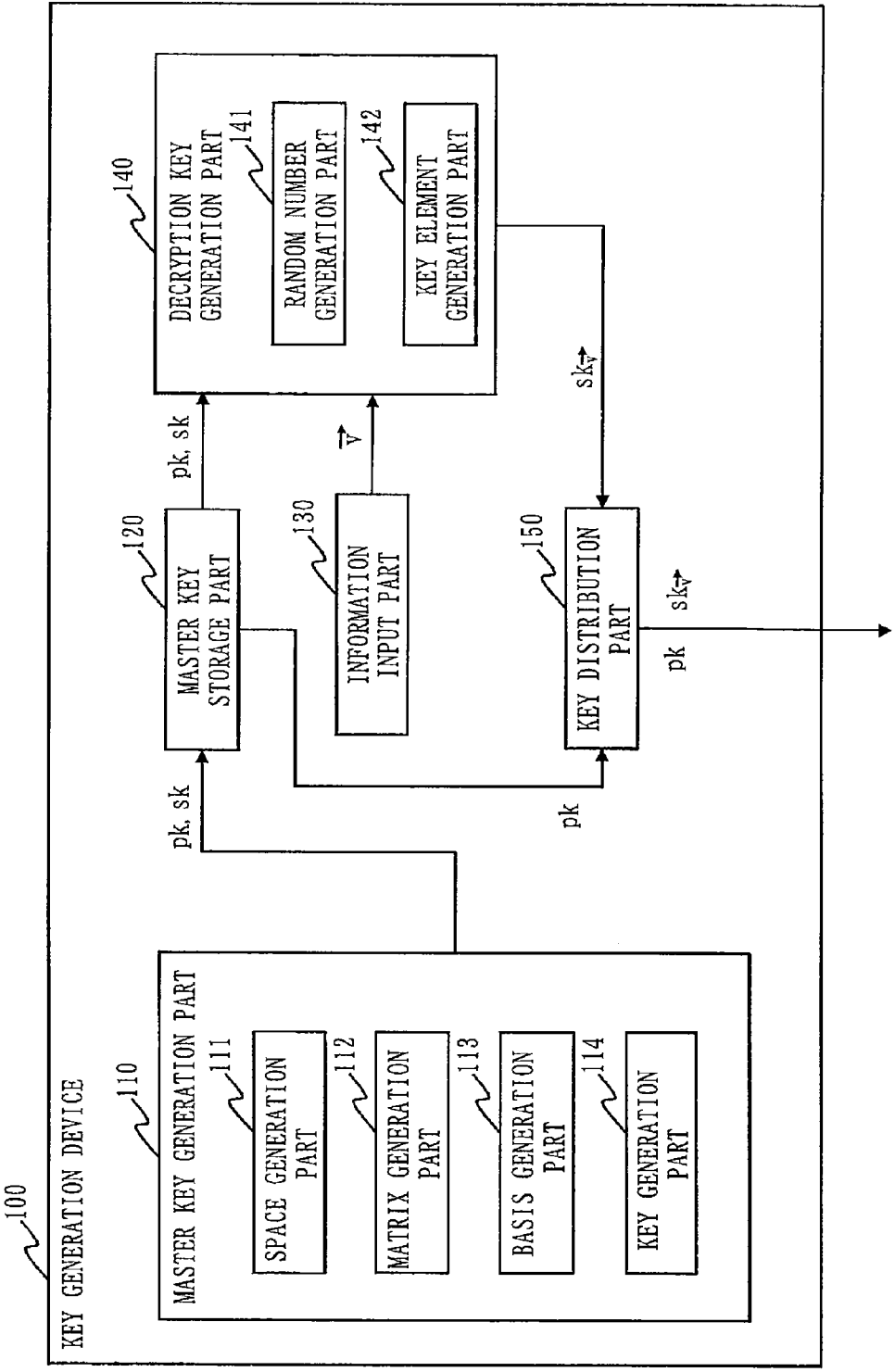
[FIG. 3] is a configuration diagram of a key generation device 100 according to Embodiment 2.
Figure 4:
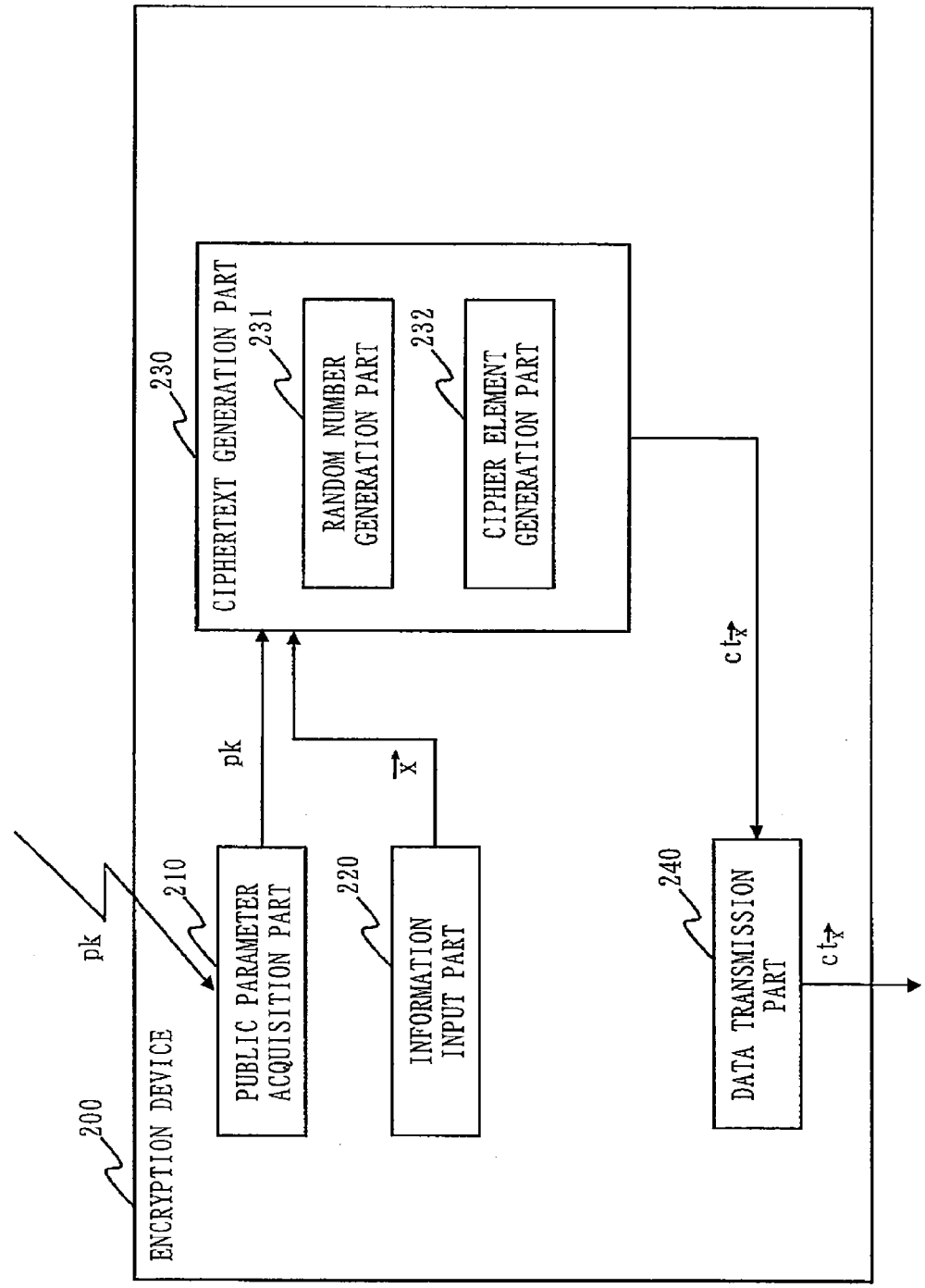
[FIG. 4] is a configuration diagram of an encryption device 200 according to Embodiment 2.
Figure 5:
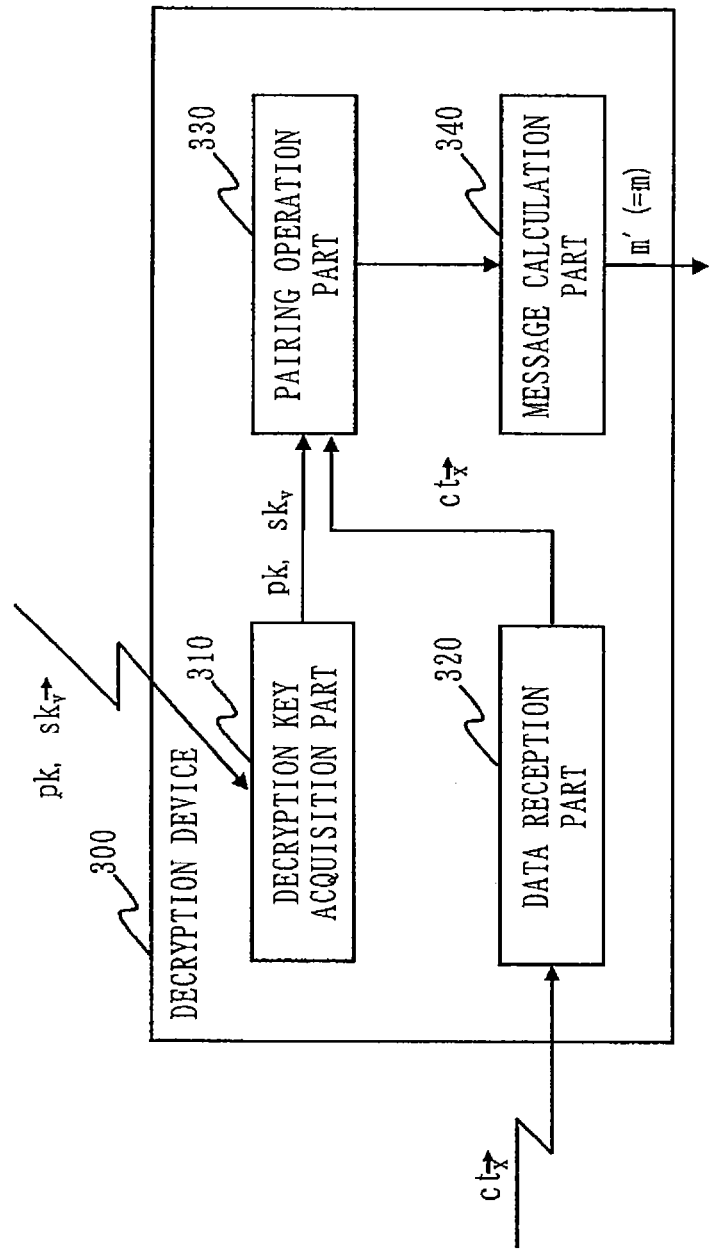
[FIG. 5] is a configuration diagram of a decryption device 300 according to Embodiment 2.

FIG. 3 is a configuration diagram of a key generation device 100 according to Embodiment 2. FIG. 4 is a configuration diagram of an encryption device 200 according to Embodiment 2. FIG. 5 is a configuration diagram of a decryption device 300 according to Embodiment 2.

Figure 6:
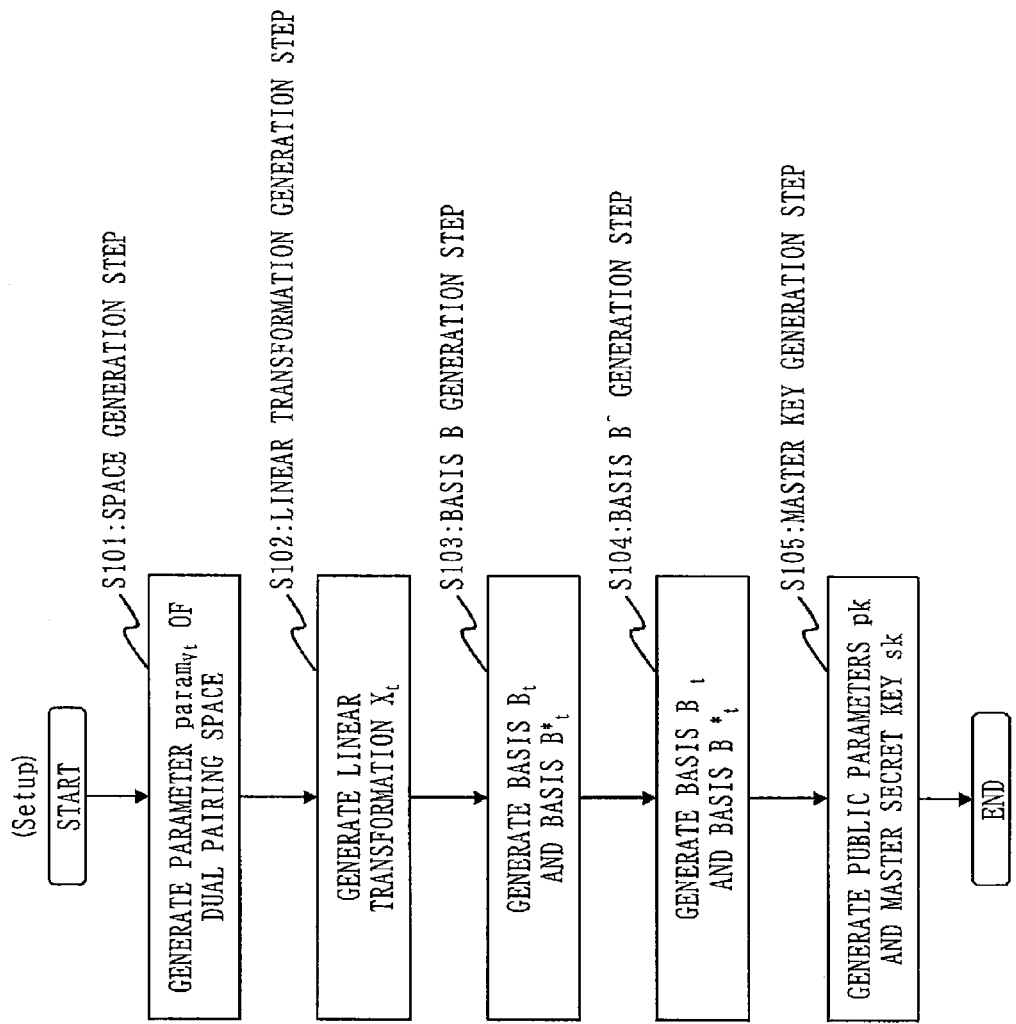
[FIG. 6] is a flowchart showing the process of Setup algorithm according to Embodiment 2.
Figure 7:
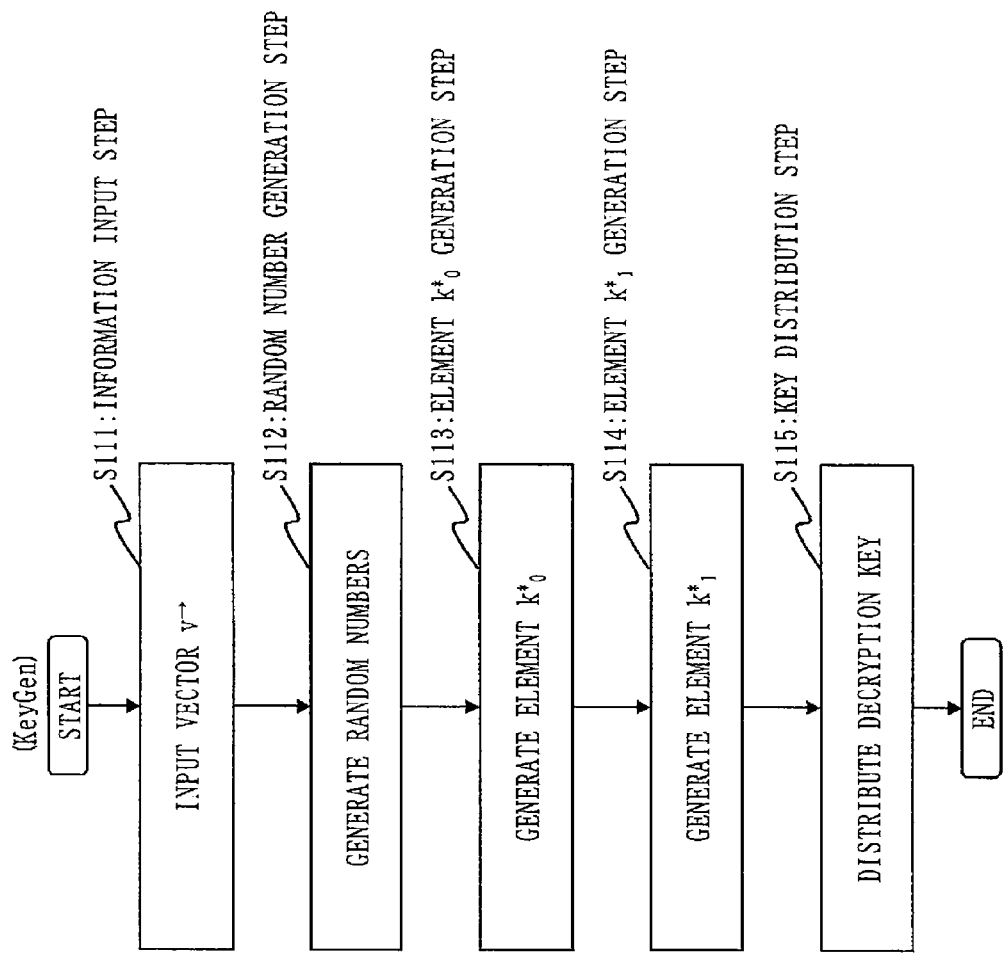
[FIG. 7] is a flowchart showing the process of KeyGen algorithm according to Embodiment 2.
Figure 8:
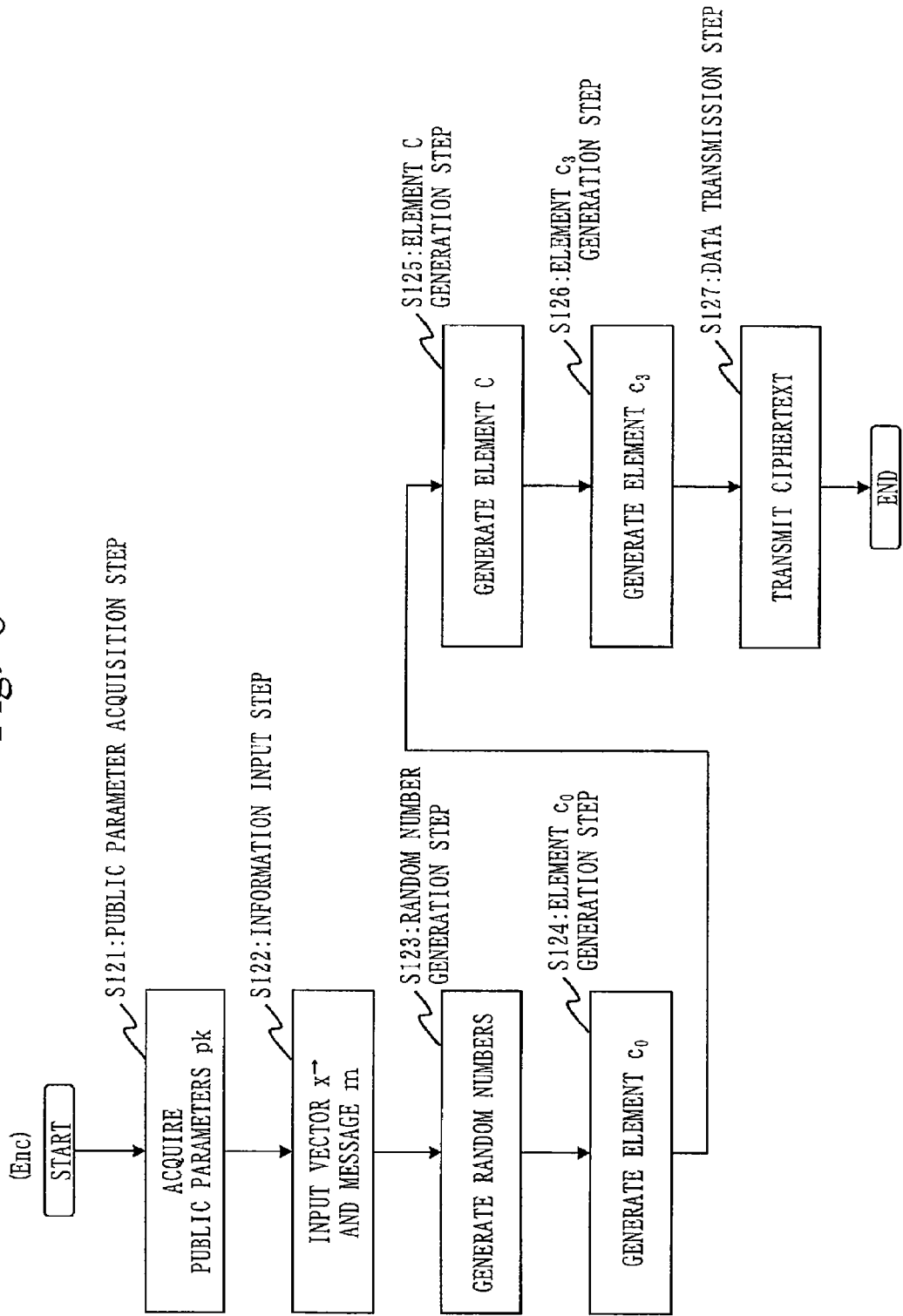
[FIG. 8] is a flowchart showing the process of Enc algorithm according to Embodiment 2.
Figure 9:
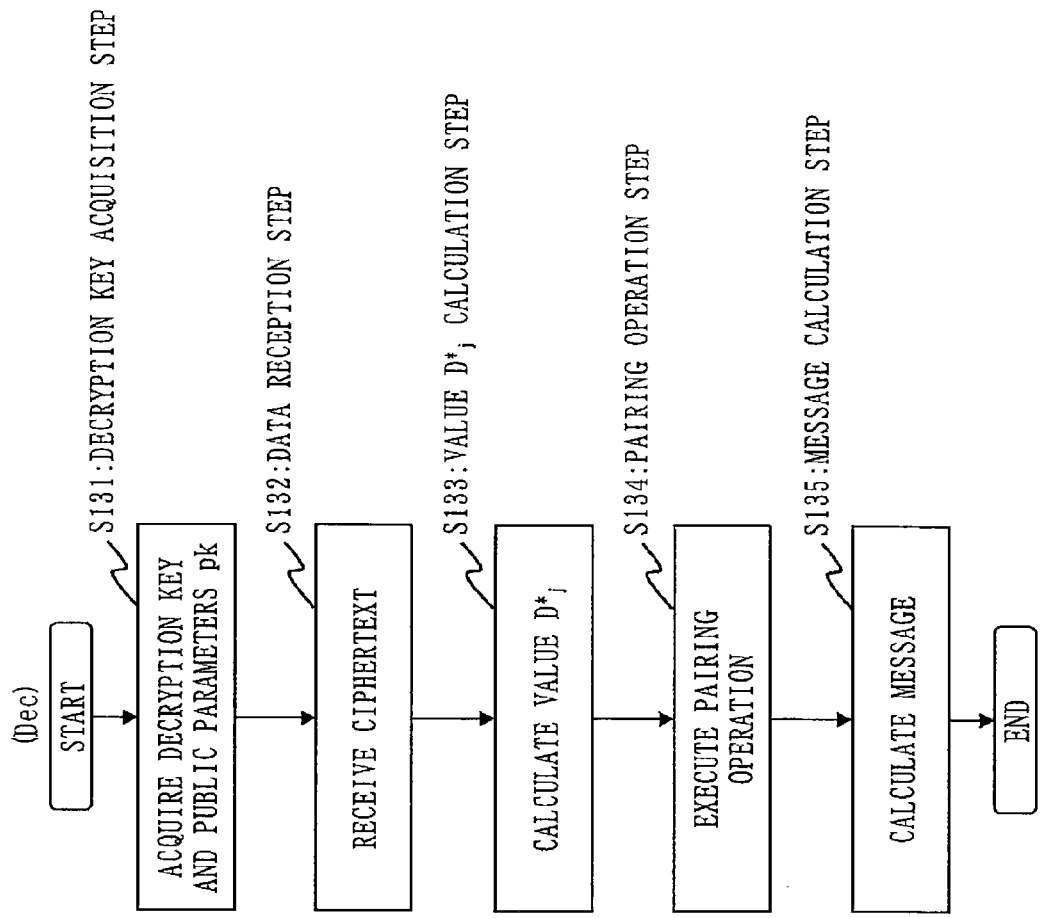
[FIG. 9] is a flowchart showing the process of Dec algorithm according to Embodiment 2.

FIGS. 6 and 7 are flowcharts showing the operation of the key generation device 100 according to Embodiment 2, in which FIG. 6 is a flowchart showing the process of Setup algorithm according to Embodiment 2, and FIG. 7 is a flowchart showing the process of KeyGen algorithm according to Embodiment 2. FIG. 8 is a flowchart showing the operation of the encryption device 200 according to Embodiment 2, that is, a flowchart showing the process of Enc algorithm according to Embodiment 2. FIG. 9 is a flowchart showing the operation of the decryption device 300 according to Embodiment 2, that is, a flowchart showing the process of Dec algorithm according to Embodiment 2.

In the following description, let a vector $\vec{x}^* := (x_1, \ldots, x_n)$ to be inputted hold $x_L \neq 0$ for each integer L of $L=1, \ldots, n-1$, and let a vector $\vec{v} := (v_1, \ldots, v_n)$ to be inputted hold $v_n \neq 0$.

The key generation device 100 will be described.

As shown in FIG. 3, the key generation device 100 is provided with a master key generation part 110, a master key storage part 120, an information input part 130, a decryption key generation part 140, and a key distribution part 150. The master key generation part 110 is provided with a space generation part 111, a matrix generation part 112, a basis generation part 113, and a key generation part 114. The decryption key generation part 140 is provided with a random number generation part 141 and a key element generation part 142.

The process of the Setup algorithm will be described with reference to FIG. 6.

(S101: Space Generation Step)

The space generation part 111 takes security parameter $1^\lambda$ as an input and executes $G_{bpg}$ with a processing device, to generate parameter $param_G := (q, G, G_T, g, e)$ of symmetric bilinear pairing groups.

Furthermore, the space generation part 111 sets $N_0 := 5$ and $N_1 := 4n$. Then, for each t of $t=0, 1$, the space generation part 111 takes as input the security parameter $1^\lambda$, $N_t$, and the parameter $param_G$ of the symmetric bilinear pairing groups and executes $G_{dpvs}$ with the processing device, to generate a parameter $param_{vt} := (q, V_t, G_t, A_t, e)$ of the dual pairing vector spaces.

(S102: Linear Transformation Generation Step)

With the processing device, the matrix generation part 112 generates linear transformation $X_0$, as indicated by Formula 125.

$$X_0 := (\chi_{0,i,j})_{i,j=1,\ldots,5} \xleftarrow{U} GL(N_0, \mathbb{F}_q) \quad \text{[Formula 125]}$$

Note that $(\chi_{0,i,j})_{i,j=1,\ldots,5}$ in Formula 125 signifies a matrix concerning subscripts and j of a matrix $\chi_{0,i,j}$.

With the processing device, the matrix generation part 112 generates linear transformation $X_1$, as indicated by Formula 126.

$$X_1 \xleftarrow{U} \mathcal{L}(N_1, \mathbb{F}_q) \quad \text{[Formula 126]}$$

Note that $L(N, \mathbb{F}_q)$ in Formula 126 is as indicated by Formula 127.

$$\mathcal{L}(N, \mathbb{F}_q) := \left\{ X := \begin{pmatrix} X_{1,1} & \cdots & X_{1,4} \\ \vdots & & \vdots \\ X_{4,1} & \cdots & X_{4,4} \end{pmatrix} \middle| X_{i,j} := \begin{pmatrix} \mu_{i,j} & & \mu'_{i,j,1} \\ & \ddots & \vdots \\ & & \mu_{i,j} & \mu'_{i,j,n-1} \\ & & & \mu'_{i,j,n} \end{pmatrix} \in \mathcal{H}(n, \mathbb{F}_q) \text{ for } i,j = 1, \ldots, 4 \right\} \quad \text{[Formula 127]}$$

$$\cap GL(N, \mathbb{F}_q),$$

$$\mathcal{H}(n, \mathbb{F}_q) := \left\{ \begin{pmatrix} u & & u'_1 \\ & \ddots & \vdots \\ & & u & u'_{n-1} \\ & & & u'_n \end{pmatrix} \middle| \begin{array}{l} u, u'_L \in \mathbb{F}_q \\ \text{for} \\ L = 1, \ldots, n, \\ \text{a blank element} \\ \text{in the matrix} \\ \text{denotes } 0 \in \mathbb{F}_q \end{array} \right\}$$

Note that $\{\mu_{i,j}, \mu'_{i,j,L}\}_{i,j=1,\ldots,4;L=1,\ldots,n}$ in the following description denotes an element other than constant value 0 in the linear transformation $X_1$.

(S103: Basis B Generation Step)

With the processing device, the basis generation part 113 generates a basis $B_0$ and variables $B_{i,j}$ and $B'_{i,j,L}$, as indicated by Formula 128.

$$b_{0,i} := (\chi_{0,i,1}, \ldots, \chi_{0,i,5}) \mathbb{A} = \Sigma_{j=1}^{5} \chi_{0,i,k} a_j \text{ for } i=1, \ldots, 5,$$

$$\mathbb{B}_0 := (b_{0,1}, \ldots, b_{0,5}),$$

$$B_{i,j} := \mu_{i,j} g, B_{i,j,L}' := \mu_{i,j,L}' g \text{ for } i,j=1, \ldots, 4; L=1, \ldots, n \quad \text{[Formula 128]}$$

With the processing device, the basis generation part 113 also generates a basis $B^*_0$ and a basis $B^*_1$, as indicated by Formula 129.

for $t=0,1$ $$(\theta_{t,i,j})_{i,j=1,\ldots,N_t} := \psi \cdot (X_t^T)^{-1},$$

$$b_{t,i}^* := (\theta_{t,i,1}, \ldots, \theta_{t,i,N_t}) \mathbb{A} = \Sigma_{j=1}^{N_t} \theta_{t,i,j} a_j \text{ for } i=1, \ldots, N_t,$$

$$\mathbb{B}_t^* := (b_{t,1}^*, \ldots, b_{t,N_t}^*) \quad \text{[Formula 129]}$$

(S104: Basis BA Generation Step)

With the processing device, the key generation part 114 generates bases $\hat{B}_0$, $\hat{B}^*_0$, and $\hat{B}^*_1$, as indicated by Formula 130.

$$\hat{\mathbb{B}}_0 := (b_{0,1}, b_{0,3}, b_{0,5}),$$

$$\hat{\mathbb{B}}_0^* := (b_{0,1}^*, b_{0,3}^*, b_{0,4}^*),$$

$$\hat{\mathbb{B}}_1^* := (b_{1,1}^*, \ldots, b_{1,n}^*, b_{1,2n+1}^*, \ldots b_{1,3n}^*) \quad \text{[Formula 130]}$$

(S105: Master Key Generation Step)

With the processing device, the key generation part 114 sets public parameters $pk := (1^\lambda, param_n, \hat{B}_0, \{B_{i,j}, B'_{i,j,L}\}_{i=1,4;j=1,\ldots,4;L=1,\ldots,n})$, and master secret key $sk := \{\hat{B}^*_t\}_{t=0,1}$. Then, the key generation part 114 stores the public parameters pk and the master secret key sk in the master key storage part 120.

Note $param_n := (\{param_{vt}\}_{t=0,1}, g_T)$.

More specifically, from S101 through S105, the key generation device 100 executes the Setup algorithm indicated by Formula 132 using algorithm $G^{(1)}_{ob}$ indicated by Formula 131, to generate the public parameters pk and the master secret key sk.

$$\mathcal{G}^{(1)}_{ob}(1^\lambda, n): \text{param}_{\mathbb{G}} := (q, \mathbb{G}, \mathbb{G}_T, g, e) \xleftarrow{R} \mathcal{G}_{bpg}(1^\lambda), \quad \text{[Formula 131]}$$

$$N_0 := 5, N_1 := 4n,$$

$$\text{param}_{\mathbb{V}_t} :=$$

$$(q, \mathbb{V}_t, \mathbb{G}_T, \mathbb{A}_t, e) := \mathcal{G}_{dpvs}(1^\lambda, N_t, \text{param}_{\mathbb{G}})$$

for $$t = 0, 1, \psi \xleftarrow{U} \mathbb{F}_q^\times, g_T := e(g, g)^\psi,$$

$$\text{param}_n := \left( \{\text{param}_{\mathbb{V}_t}\}_{t=0,1}, g_T \right),$$

$$X_0 := (\chi_{0,i,j})_{i,j=1,\ldots,5} \xleftarrow{U} GL(N_0, \mathbb{F}_q),$$

$$X_1 \xleftarrow{U} \mathcal{L}(N_1, \mathbb{F}_q),$$

hereafter, $\{\mu_{i,j}, \mu'_{i,j,L}\}_{i,j=1,\ldots,4;L=1,\ldots,n}$ denotes non-zero entries of $X_1$, $$b_{0,i} := (\chi_{0,i,1}, \ldots, \chi_{0,i,5})_{\mathbb{A}} = \sum_{j=1}^{5} \chi_{0,i,j} a_j$$

for $i = 1, \ldots, 5, \mathbb{B}_0 := (b_{0,1}, \ldots, b_{0,5}),$ $B_{i,j} := \mu_{i,j} g, B'_{i,j,L} := \mu'_{i,j,L} g$ for $i, j = 1, \ldots, 4; L = 1, \ldots, n,$ for $$t = 0, 1 (\vartheta_{t,i,j})_{i,j=1,\ldots,N_t} := \psi \cdot (X_t^T)^{-1},$$

$$b^*_{t,i} := (\vartheta_{t,i,1}, \ldots, \vartheta_{t,i,N_t})_{\mathbb{A}} = \sum_{j=1}^{N_t} \vartheta_{t,i,j} a_j$$

for $i = 1, \ldots, N_t, \mathbb{B}^*_t := (b^*_{t,1}, \ldots, b^*_{t,N_t}),$ return $(\text{param}_n, \mathbb{B}_0, \mathbb{B}^*_0 \{B_{i,j}, B'_{i,j,L}\}_{i,j=1,\ldots,4;L=1,\ldots,n}, \mathbb{B}^*_1).$ Setup$(1^\lambda, n)$: [Formula 132]

$(\text{param}_n, \mathbb{B}_0, \mathbb{B}^*_0 \{B_{i,j}, B'_{i,j,L}\}_{i,j=1,\ldots,4;L=1,\ldots,n}, \mathbb{B}^*_1) \xleftarrow{R}$ $\mathcal{G}^{(1)}_{ob}(1^\lambda, n),$ $\hat{\mathbb{B}}_0 := (b_{0,1}, b_{0,3}, b_{0,5}), \hat{\mathbb{B}}^*_0 := (b^*_{0,1}, b^*_{0,3}, b^*_{0,4}),$ $\hat{\mathbb{B}}^*_1 := (b^*_{1,1}, \ldots, b^*_{1,n}, b^*_{1,2n+1}, \ldots, b^*_{1,3n}),$ return $pk := (1^\lambda, \text{param}_n, \hat{\mathbb{B}}_0, \{B_{i,j}, B'_{i,j,L}\}_{i=1,4;j=1,\ldots,4;L=1,\ldots,n}),$ $sk := \{\hat{\mathbb{B}}^*_t\}_{t=0,1}.$ Note that the public parameters are publicized via, e.g., a network, so the encryption device 200 and decryption device 300 can acquire them.

In S103, instead of basis $B_1$, variable $B_{i,j}$ was generated. If basis $B_1$ is to be generated, it will be as indicated by Formula 133.

$$\begin{pmatrix} b_{1,(i-1)n+1} \\ \vdots \\ b_{1,in} \end{pmatrix} := \quad \text{[Formula 133]}$$

$$\begin{pmatrix} B_{i,1} & B'_{i,1,1} & & B_{i,4} & B'_{i,4,1} \\ & \ddots & \vdots & \ldots & & \ddots & \vdots \\ & B_{i,1} & B'_{i,1,n-1} & & B_{i,4} & B'_{i,4,n-1} \\ & & B'_{i,1,n} & & & & B'_{i,4,n} \end{pmatrix}$$

for $i = 1, \ldots, 4,$ $\mathbb{B}_1 := (b_{1,1}, \ldots, b_{1,4n})$

A blank element in the matrix of Formula 133 denotes a component value $0 \in G$. The basis $B_1$ is an orthogonal basis of the basis $B^*_1$. That is, $e(b_{1,i}, b^*_{1,i}) = g_T$, and $e(b_{1,i}, b^*_{1,j}) = 1$ for integers i, j satisfying $1 \leq i \neq j \leq 4n$.

The process of the KeyGen algorithm will be described with reference to FIG. 7.

(S111: Information Input Step)

With the input device, the information nut part 130 takes as input the vector $\vec{v}$.

(S112: Random Number Generation Step)

With the processing device, the random number generation part 141 generates random numbers, as indicated by Formula 134.

$$\delta, \varphi_0, \varphi_1, \xleftarrow{U} \mathbb{F}_q \quad \text{[Formula 134]}$$

(S113: Element $k^*_0$ Generation Step)

With the processing device, the key element generation part 142 generates element $k^*_0$, which is an element of a decryption key $sk_{\vec{v}}$, as indicated by Formula 135.

$$k_0^* := (\delta, 0, 1, \varphi_0, 0)_{\mathbb{B}^*_0} \quad \text{[Formula 135]}$$

As mentioned above, for the bases B and B* indicated by Formula 110, Formula 111 is established. Hence, Formula 135 means that: $\delta$ is set as the coefficient for basis vector $b^*_{0,1}$ of the basis $B^*_0$; 0 is set as the coefficient for basis vector $b^*_{0,2}$; 1 is set as the coefficient for basis vector $b^*_{0,3}$; $\varphi_0$ is set as the coefficient for basis vector $b_{0,4}^*$; and 0 is set as the coefficient for basis vector $b^*_{0,5}$.

(S114: Element $k^*_1$ Generation Step)

With the processing device, the key element generation part 142 generates element $k^*_1$, which is an element of the decryption key $sk_{\vec{v}}$, as indicated by Formula 136.

$$k_1^* := ( \overbrace{\delta \vec{v}}^{n}, \overbrace{0^n}^{n}, \overbrace{\varphi_1 \vec{v}}^{n}, \overbrace{0^n}^{n} )_{\mathbb{B}^*_1} \quad \text{[Formula 136]}$$

As with Formula 135, Formula 136 means that: $\delta v_1, \ldots, \delta v_n$ are each set as the coefficient for basis vectors $b^*_{1,1}, b^*_{1,n}$ of the basis $B^*_1$; 0 is set as the coefficient for basis vectors $b^*_{1,n+1}, \ldots, b^*_{1,2n}$; $\varphi_1 v_1, \ldots, \varphi_1 v_n$ are each set as the coefficient for basis vectors $b^*_{1,2n+1}, \ldots,$ and $b^*_{1,3n}$; and 0 is set as the coefficient for basis vectors $b^*_{1,3n+1}, \ldots, b^*_{1,4n}$.

(S115: Key Distribution Step)

For example, with the communication device, the key distribution part 150 distributes the decryption key $sk_{\vec{v}}$, constituted by as elements: the vector $\vec{v}$ inputted in S111; the element $k^*_0$ generated in S113; and the element $k^*_1$ generated in S114, to the decryption device 300 in secrecy via the network. As a matter of course, the decryption key $sk_{v^\rightarrow}$ might as well be distributed to the decryption device 300 by another method.

More specifically, from S111 through S114, the key generation device 100 executes the KeyGen algorithm indicated by Formula 137, to generate the decryption key $sk_{v^\rightarrow}$. Then, in S 115, the key generation device 100 distributes the generated decryption key $sk_{v^\rightarrow}$ to the decryption device 300.

$$KeyGen(pk, sk, \vec{v}):$$

$$\delta, \varphi_0, \varphi_1, \xleftarrow{U} \mathbb{F}_q,$$

$$k_0^* := (\delta, 0, 1, \varphi_0, 0)_{\mathbb{B}_0^*},$$

$$k_1^* := \left( \underbrace{\frac{n}{\delta \vec{v}}}, \underbrace{\frac{n}{0^n}}, \underbrace{\frac{n}{\varphi_1 \vec{v}}}, \underbrace{\frac{n}{0^n}} \right)_{\mathbb{B}_1^*},$$

$$\text{return } sk_{\vec{v}} := (\vec{v}, k_0^*, k_1^*).$$

[Formula 137]

The encryption device 200 will be described.

As shown in FIG. 4, the encryption device 200 is provided with a public parameter acquisition part 210, an information input part 220, a ciphertext generation part 230, and a data transmission part 240. The ciphertext generation part 230 is provided with a random number generation part 231 and a cipher element generation part 232.

The process of the Enc algorithm will be described with reference to FIG. 8.

(S121: Public Parameter Acquisition Step)

For example, with the communication device, the public parameter acquisition part 210 acquires the public parameters pk generated by the key generation device 100, via the network.

(S122: Information Input Step)

With the input device, the information input part 220 takes as input the vector $x^\rightarrow$.

Also, with the input device, the information input part 222 takes as input a message m.

(S 123: Random Number Generation Step)

With the processing device, the random number generation part 231 generates random numbers, as indicated by Formula 138.

$$\omega, \eta_0, \eta_1, \zeta \xleftarrow{U} \mathbb{F}_q$$

[Formula 138]

(S124: Element $c_0$ Generation Step)

With the processing device, the cipher element generation part 232 generates element $c_0$, which is an element of a ciphertext $ct_{x^\rightarrow}$, as indicated by Formula 139.

$$c_0 := (-\omega, 0, \zeta, 0, \eta_0)_{\mathbb{B}_0}$$

[Formula 139]

As with Formula 135, Formula 139 means that: $-\omega$ is set as the coefficient for basis vector $b_{0,1}$ of the basis $B_0$; 0 is set as the coefficient for basis vector $b_{0,2}$; $\zeta$ is set as the coefficient for basis vector $b_{0,3}$; 0 is set as the coefficient for basis vector $b_{0,4}$; and $\eta_0$ is set as the coefficient for basis vector $b_{0,5}$.

(S125: Element C Generation Step)

With the processing device, the cipher element generation part 232 generates an element $C_{1,j}$ and an element $C_{2,j}$, which are elements of the ciphertext $ct_{x^\rightarrow}$, as indicated by Formula 140.

for $j=1,\ldots,4$ $$C_{1,j} := \omega B_{1,j} + \eta_1 B_{4,j},$$

$$C_{2,j} := \Sigma_{L=1}^n x_L(\omega B'_{1,j,L} + \eta_1 B'_{4,j,L})$$

[Formula 140]

(S126: Element $c_3$ Generation Step)

With the processing device, the cipher element generation part 232 generates element $c_3$, which is an element of the ciphertext $ct_{x^\rightarrow}$, as indicated by Formula 141.

$$c_3 := g_T^\zeta m$$

[Formula 141]

(S127: Data Transmission Step)

For example, with the communication device, the data transmission part 240 transmits the ciphertext $ct_{x^\rightarrow}$, constituted by as elements: the vector $x^\rightarrow$ inputted in S122, the element $c_0$ generated in S124; the elements $C_{1,j}$ and $C_{2,j}$ generated in S125; and the element $c_3$ generated in S126, to the decryption device 300 via the network. As a matter of course, the ciphertext $ct_{x^\rightarrow}$ might as well be transmitted to the decryption device 300 by another method.

More specifically, from S121 through S126, the encryption device 200 executes the Enc algorithm indicated by Formula 142, to generate the ciphertext $ct_{x^\rightarrow}$. In S127, the encryption device 200 transmits the generated ciphertext $ct_{x^\rightarrow}$ to the decryption device 300.

$$Enc(pk, m, \vec{x}):$$

$$\omega, \eta_0, \eta_1, \zeta \xleftarrow{U} \mathbb{F}_q,$$

$$c_0 := (-\omega, 0, \zeta, 0, \eta_0)_{\mathbb{B}_0},$$

$$c_3 := g_T^\zeta m,$$

$$C_{1,j} := \omega B_{1,j} + \eta_1 B_{4,j},$$

$$C_{2,j} := \sum_{L=1}^n x_L(\omega B'_{1,j,L} + \eta_1 B'_{4,j,L})$$

for $j = 1, \ldots, 4,$ $$\text{return } ct_{\vec{x}} := (\vec{x}, c_0, \{C_{1,j}, C_{2,j}\}_{j=1,\ldots,4}, c_3).$$

[Formula 142]

The decryption device 300 will be described.

As shown in FIG. 5, the decryption device 300 is provided with a decryption key acquisition part 310, a data reception part 320, a pairing operation part 330, and a message calculation part 340.

The process of the Dec algorithm will be described with reference to FIG. 9.

(S131: Decryption key Acquisition Step)

For example, with the communication device, the decryption key acquisition part 310 acquires $sk_\rightarrow$ distributed by the key generation device 100, via the network.

The decryption key acquisition part 310 also acquires the public parameters pk generated by the key generation device 100.

(S132: Data Reception Step)

For example, with the communication device, the data reception part 320 receives the ciphertext $ct_{x^\rightarrow}$ transmitted by the encryption device 200, via the network.

(S133: Value $D^*_j$ Calculation Step)

With the processing device, the pairing operation part 330 calculates value $D^*_j$, as indicated by Formula 143.

for $j=1,\ldots,4$ $$D_j^* := \Sigma_{L=1}^{n-1}((\vec{x} \cdot \vec{v})^{-1} x_L) K_{j-1)n+L}^*$$

[Formula 143]

Note that the element $k^*_1$ is parsed as 4n-tuples $(K^*_1, \ldots K^*_{4n}) \in G^{4n}$.

(S134: Pairing Operation Step)

With the processing device, the pairing operation part 330 executes a pairing operation, as indicated by Formula 144, to calculate value F.

$$F := e(c_0, k_0^*) \cdot \Pi_{j=1}^4 (e(C_{1,j}, D_j^*) \cdot e(C_{2,j}, K_{jn}^*)) \quad \text{[Formula 144]}$$

(S135: Message Calculation Step)

With the processing device, the message calculation part 340 calculates a message m', as indicated by Formula 145.

$$m' := c_3/F \quad \text{[Formula 145]}$$

More specifically, from S131 through S135, the decryption device 300 executes the Dec algorithm indicated by Formula 146, to calculate the message m'.

$$Dec(pk, sk_{\vec{v}} := (\vec{v}, k_0^*, k_1^*), ct_{\vec{x}} := (\vec{x}, c_0, \{C_{1,j}, C_{2,j}\}_{j=1,\ldots,4}, c_3)):$$

Parse $k_1^*$ as a $4n$-tuple $(K_1^*, \ldots, K_{4n}^*) \in \mathbb{G}^{4n}$, $$D_j^* := \Sigma_{L=1}^{n-1}((\vec{x} \cdot \vec{v})^{-1} x_L) K_{(j-1)n+L}^* \text{ for } j=1,\ldots,4$$

$$F := e(c_0, k_0^*) \cdot \Pi_{j=1}^4 (e(C_{1,j}, D_j^*) \cdot e(C_{2,j}, K_{jn}^*)),$$

return $m' := c_3/F$. [Formula 146]

Formula 133 indicates that $B_1 := (b_{1,1}, b_{1,4n})$ is specified by $\{B_{i,j}, B'_{i,j,L}\}_{i,j=1,\ldots,4;L=1,\ldots,n}$. Also, $\{B_{i,j}, B'_{i,j,L}\}_{i=1,4;j=1,\ldots,4;L=1,\ldots,n}$ included in an output of the Setup algorithm is specified by $\hat{B}_1 := (b_{1,1}, \ldots, b_{1,n}, b_{1,3n+1}, b_{1,4n})$.

The Dec algorithm can be described as Dec' algorithm indicated by Formula 147.

$$Dec'(pk, sk_{\vec{v}} := (\vec{v}, k_0^*, k_1^*), \quad \text{[Formula 147]}$$

$$ct_{\vec{x}} := (\vec{x}, c_0, \{C_{1,j}, C_{2,j}\}_{j=1,\ldots,4}, c_3)):$$

$$c_1 := \left( \overbrace{x_1 C_{1,1}, \ldots, x_{n-1} C_{1,1}}^{n}, C_{2,1} \ldots, \right.$$

$$\left. \overbrace{x_1 C_{1,4}, \ldots, x_{n-1} C_{1,4}}^{n}, C_{2,4} \right),$$

that is, $$c_1 = \left( \overbrace{\omega \vec{x}}^{n}, \overbrace{0^n}^{n}, \overbrace{0^n}^{n}, \overbrace{\eta_1 \vec{x}}^{n} \right)_{\mathbb{B}_1},$$

$$F := e(c_0, k_0^*) \cdot e\left(c_1, (\vec{x} \cdot \vec{v})^{-1} k_1^*\right),$$

return $m' := c_3/F$.

As indicated by Formula 148, using the Dec' algorithm, $F = g_T^\zeta$ is obtained if $\vec{x} \cdot \vec{v} \neq 0$. Hence, the message m' (=m) can be obtained by dividing $c_3 = g_T^\zeta m$ by F.

$$F = e(c_0, k_0^*) \cdot e\left(c_1, (\vec{x} \cdot \vec{v})^{-1} k_1^*\right) \quad \text{[Formula 148]}$$

$$= g_T^{-\omega \delta + \zeta} g_T^{\omega \delta (\vec{x} \cdot \vec{v})/(\vec{x} \cdot \vec{v})}$$

$$= g_T^\zeta$$

if $\vec{x} \cdot \vec{v} \neq 0$.

In the non-zero inner-product encryption scheme explained in Embodiment 2, the ciphertext $ct_{\vec{x}}$ includes a total of 13 elements of G, namely, 5 by element $c_0$ indicated by Formula 139 and 8 by elements $C_{1,j}$ and $C_{2,j}$ for each integer j of j=1, . . . , 4 indicated by Formula 140. Also, the ciphertext $ct_{\vec{x}}$ includes 1 element of $G_T$, namely, 1 by element $c_3$ indicated by Formula 141. In fine, the ciphertext $ct_{\vec{x}}$ has a constant size in n.

Also, in the non-zero innerproduct encryption scheme explained in Embodiment 2, the decryption process (Dec algorithm) executes a total of only 13 pairing operations, namely, 5 by $e(c_0, k_0^*)$ and 8 by $\Pi_{j=1}^4 (e(C_{1,j}, D_j^*) \cdot e(C_{2,j}, K_{jn}^*))$ indicated by Formula 144. In fine, the decryption process requires only a small number of pairing operations.

Embodiment 3

In Embodiment 3, a nonzero inner-product encryption scheme having a constant-size secret key will be described.

The configurations of a key generation device 100, an encryption device 200, and a decryption device 300 are respectively the same as the configurations of the key generation device 100, the encryption device 200, and the decryption device 300 shown in FIGS. 3, 4, and 5 according to Embodiment 2.

Figure 10:
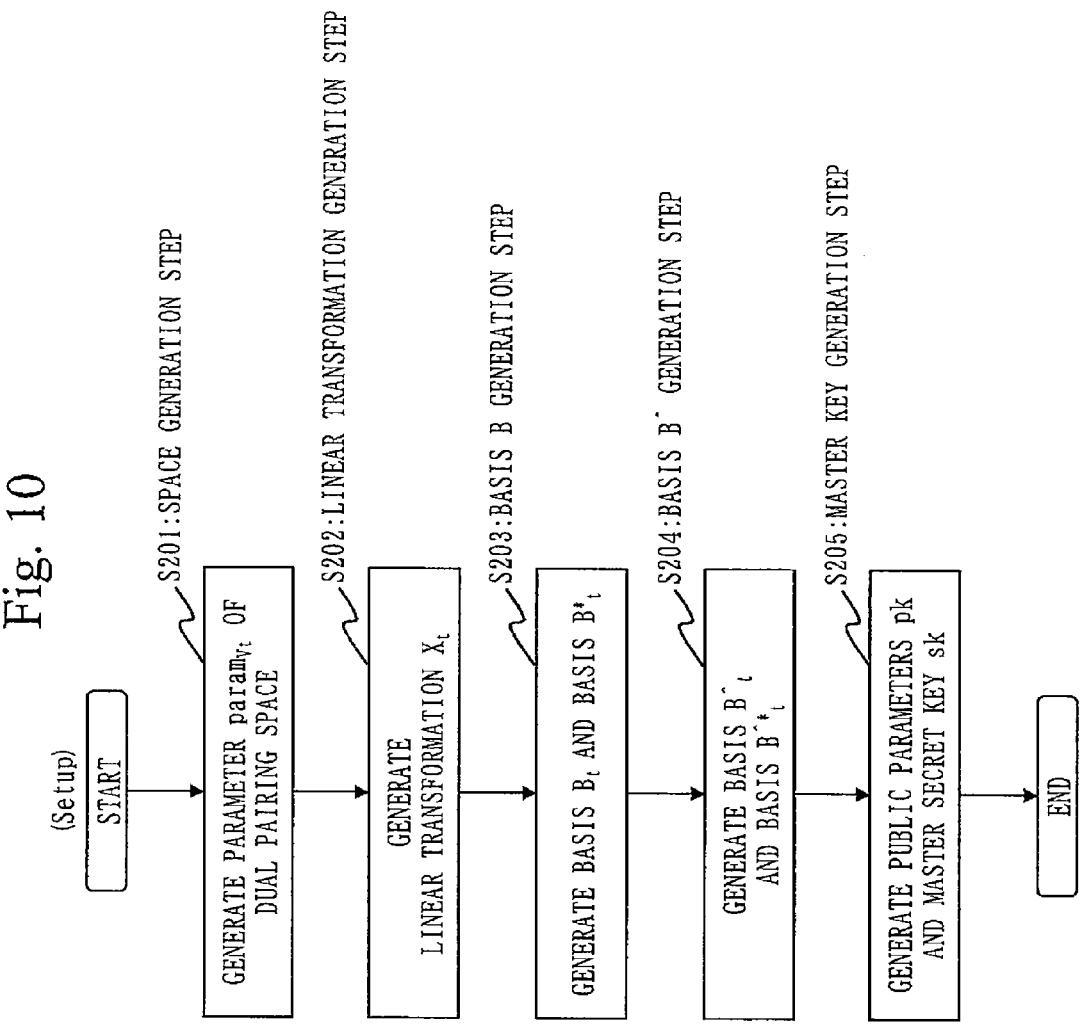
[FIG. 10] is a flowchart showing the process of Setup algorithm according to Embodiment 3.
Figure 11:
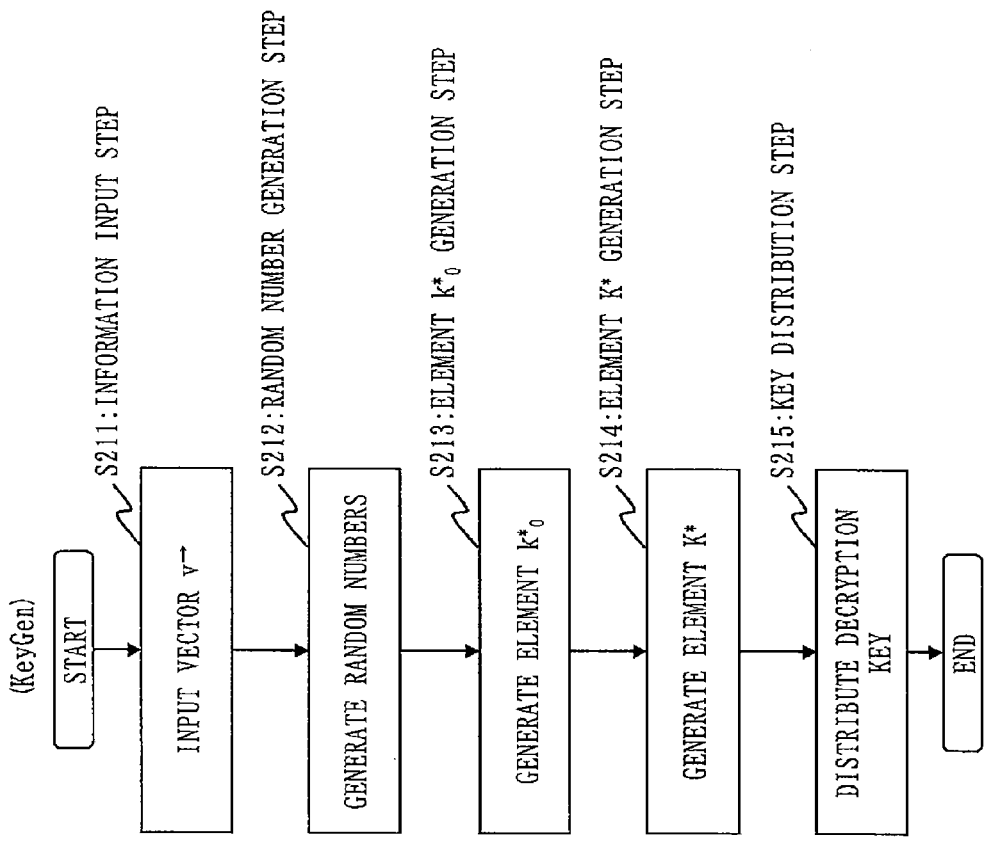
[FIG. 11] is a flowchart showing the process of KeyGen algorithm according to Embodiment 3.
Figure 12:
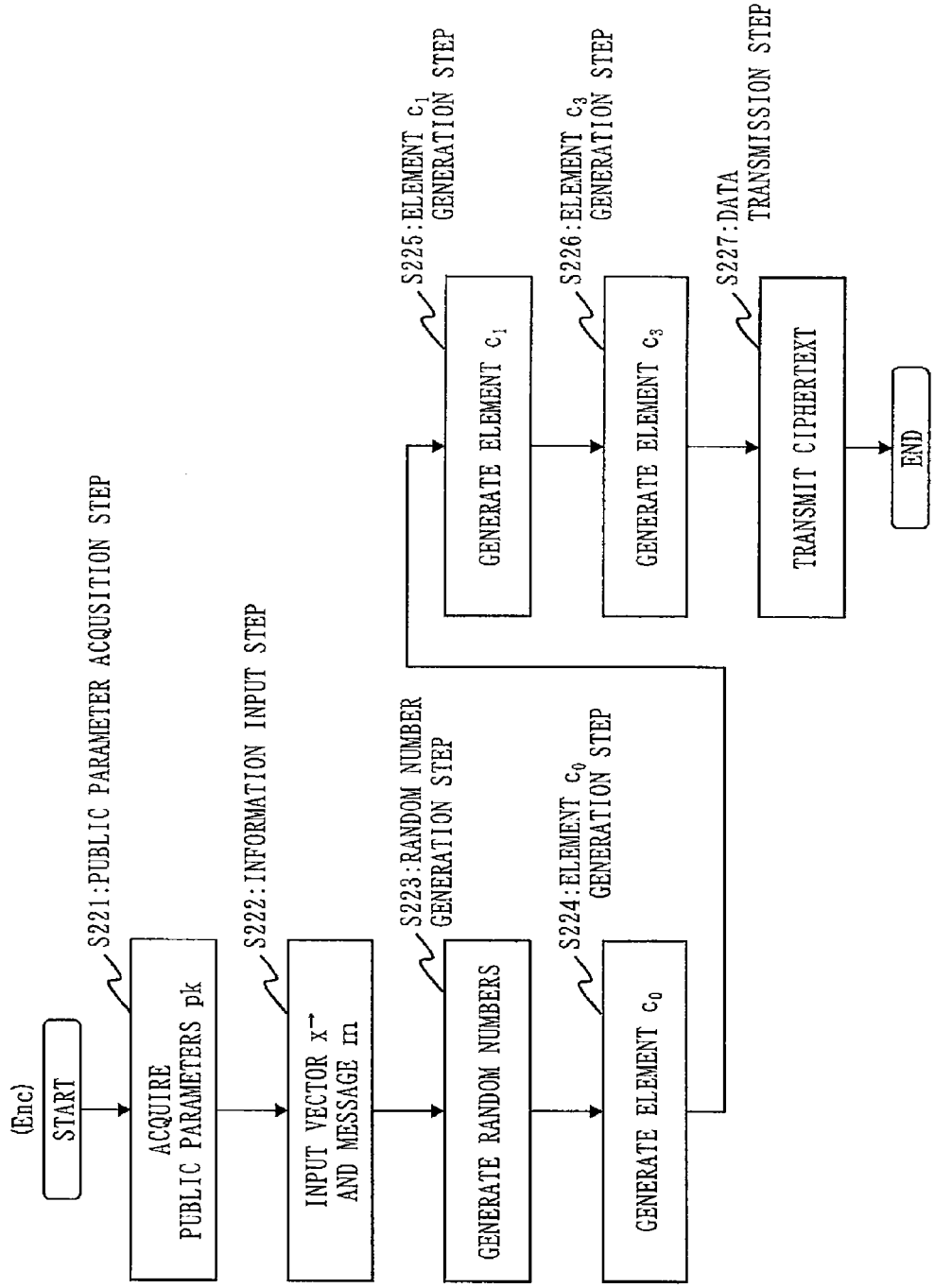
[FIG. 12] is a flowchart showing the process of Enc algorithm according to Embodiment 3.
Figure 13:
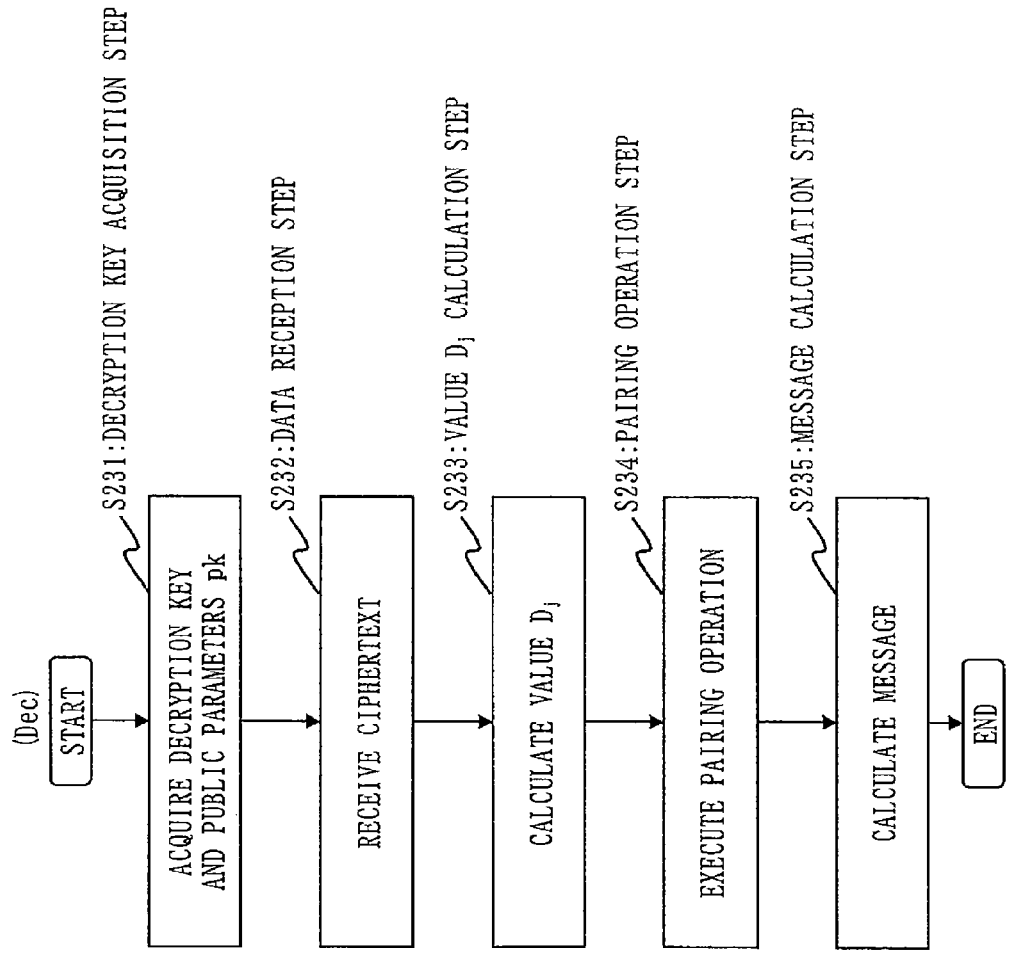
[FIG. 13] is a flowchart showing the process of Dec algorithm according to Embodiment 3.

FIGS. 10 and 11 are flowcharts showing the operation of the key generation device 100 according to Embodiment 3, in which FIG. 10 is a flowchart showing the process of Setup algorithm according to Embodiment 3, and FIG. 11 is a flowchart showing the process of KeyGen algorithm according to Embodiment 3. FIG. 12 is a flowchart showing the operation of the encryption device 200 according to Embodiment 3, that is, a flowchart showing the process of Enc algorithm according to Embodiment 3. FIG. 13 is a flowchart showing the operation of the decryption device 300 according to Embodiment 3, that is, a flowchart showing the process of Dec algorithm according to Embodiment 3.

In the following description, let a vector $\vec{v} := (v_1, \ldots, v_n)$ to be inputted hold $v_L \neq 0$ for each integer L of L=1, . . . , n−1, and let a vector $\vec{x} := (x_1, \ldots, x_n)$ to be inputted hold $x_n \neq 0$.

The key generation device 100 will be described.

The process of the Setup algorithm will be described with reference to FIG. 10.

The processes of S201 to S202 are the same as the processes of S101 to S102 shown in FIG. 6.

(S203: Basis B Generation Step)

With a processing device, a basis generation part 113 generates a basis $D_0$ and variables $D_{i,j}$ and $D'_{i,j,L}$, as indicated by Formula 149, in the same manner as the basis $B_0$ and the variable $B_{i,j}$ of Embodiment 2 are.

$$b_{0,i} := (\chi_{0,i,1}, \ldots, \chi_{0,i,5})_\mathbb{A} = \Sigma_{j=1}^5 \chi_{0,i,j} a_j \text{ for } i=1, \ldots, 5,$$

$$\mathbb{D}_0 := (b_{0,1}, \ldots, b_{0,5}),$$

$$D_{i,j} := \mu_{i,j} g, D_{i,j,L} := \mu_{i,j,L}' g \text{ for } i,j=1, \ldots, 4; L=1, \ldots, n \quad \text{[Formula 149]}$$

With the processing device, the basis generation part 113 also generates a basis $D^*_0$ and a basis $D^*_1$, as indicated by Formula 150, in the same manner as the basis $B^*_0$ and the basis $B^*_1$ of Embodiment 2 are.

for t=0,1

$$(\theta_{t,i,j})_{i,j=1,\ldots,N_t} := \psi \cdot (X_t^T)^{-1},$$

$$b_{t,i}^* := (\theta_{t,i,1}, \ldots, \theta_{t,i,N_t})_\mathbb{A} = \Sigma_{j=1}^{N_t} \theta_{t,i,j} a_j \text{ for } i=1, \ldots, N_t,$$

$$\mathbb{D}_t^* := (b_{t,1}^*, \ldots, b_{t,N_t}^*) \quad \text{[Formula 150]}$$

Then, the basis generation part 113 treats the basis $D^*_0$ as a basis $B_0$, the basis $D_0$ as a basis $B^*_0$, and the basis $D^*_1$ as a basis $B_1$. Also, for each of integers i, j of i, j=1, . . . , 4 and each integer L of L=1, n, the basis generation part 113 treats the variable $D_{i,j}$ as a variable $B^*_{i,j}$ and the variable $D'_{i,j,L}$ as a variable $B'^*_{i,j,L}$.

(S204: Basis B^ Generation Step)

With the processing device, a key generation part 114 generates bases $\hat{B}_0$, $\hat{B}_1$, and $\hat{B}^*_0$, as indicated by Formula 151.

$\hat{\mathbb{B}}_0 := (b_{0,1}, b_{0,3}, b_{0,5})$, $\hat{\mathbb{B}}_0^* := (b_{0,1}^*, b_{0,3}^*, b_{0,4}^*)$, $\hat{\mathbb{B}}_1^* := (b_{1,1}^*, \ldots, b_{1,n}^*, b_{1,2n+1}^*, \ldots b_{1,3n}^*)$ [Formula 151]

(S205: Master Key Generation Step)

With the processing device, the key generation part 114 sets public parameters $pk := (1^\lambda, param_n, \{\hat{B}_t\}_{t=0,1})$, and master secret key $sk := \hat{B}^*_0, \{B^*_{i,j}, B'^*_{i,j,L}\}_{i=1,3;j=1,\ldots,4;L=1,\ldots,n}$. Then, the key generation part 114 stores the public parameters pk and the master secret key sk in a master key storage part 120.

Note $param_n := (\{param_{V_t}\}_{t=0,1}, g_T)$.

More specifically, from S201 through S205, the key generation device 100 executes the Setup algorithm indicated by Formula 153 using algorithm $G^{(2)}_{ob}$ indicated by Formula 152, to generate the public parameters pk and the master secret key sk. As indicated by Formula 152, the algorithm $G^{(2)}_{ob}$ employs algorithm $G^{(1)}_{ob}$ indicated by Formula 131.

$\mathcal{G}^{(2)}_{ob}(1^\lambda, n):$ [Formula 152]

$(param_n, \mathbb{D}_0, \mathbb{D}_0^*,$ $\{D_{i,j}, D'_{i,j,L}\}_{i,j=1,\ldots,4;L=1,\ldots,n}, \mathbb{D}_1^*) \xleftarrow{R} \mathcal{G}^{(1)}_{ob}(1^\lambda, n),$ $\mathbb{B}_0 := \mathbb{D}_0^*, \mathbb{B}_0^* := \mathbb{D}_0, \mathbb{B}_1 := \mathbb{D}_1^*, B^*_{i,j} := D_{i,j}, B'^*_{i,j,L} := D'_{i,j,L}$ for $i, j = 1, \ldots 4; L = 1, \ldots, n,$ return $(param_n, \mathbb{B}_0, \mathbb{B}_0^*, \mathbb{B}_1, \{B^*_{i,j}, B'^*_{i,j,L}\}_{i,j=1,\ldots,4;L=1,\ldots,n}).$ Setup$(1^\lambda, n):$ [Formula 153]

$(param_n, \mathbb{B}_0, \mathbb{B}_0^*, \mathbb{B}_1,$ $\{B^*_{i,j}, B'^*_{i,j,L}\}_{i,j=1,\ldots,4;L=1,\ldots,n}) \xleftarrow{R} \mathcal{G}^{(2)}_{ob}(1^\lambda, n),$ $\hat{\mathbb{B}}_0 := (b_{0,1}, b_{0,3}, b_{0,5}),$ $\hat{\mathbb{B}}_0^* := (b_{0,1}^*, b_{0,3}^*, b_{0,4}^*),$ $\hat{\mathbb{B}}_1 := (b_{1,1}, \ldots, b_{1,n}, b_{1,3n+1}, \ldots, b_{1,4n}),$ return $pk := (1^\lambda, param_n, \{\hat{\mathbb{B}}_t\}_{t=0,1}),$ $sk := (\hat{\mathbb{B}}_0^*, \{B^*_{i,j}, B'^*_{i,j,L}\}_{i=1,3;j=1,\ldots,4;L=1,\ldots,n}).$ Note that the public parameters are publicized via, e.g., a network, so the encryption device 200 and decryption device 300 can acquire them.

The process of the KeyGen algorithm will be described with reference to FIG. 11.

The processes of S211 to S213 are the same as the processes of S111 to S113 shown in FIG. 7.

(S214: Element K* Generation Step)

With the processing device, a key element generation part 142 generates elements $K^*_{1,j}$ and $K^*_{2,j}$ which are elements of a decryption key $sk_{v^\rightarrow}$, as indicated by Formula 154.

for $j = 1, \ldots, 4$ $K_{1,j}^* := \delta B_{1,j}^* + \varphi_1 B_{3,k}^*,$ $K_{2,j}^* := \Sigma_{L=1}^n v_L(\delta B_{i,j,L}'^* + \varphi_1 B_{3,j,L}'^*)$ [Formula 154]

(S215: Key Distribution Step)

For example, with a communication device, a key distribution part 150 distributes the decryption key $sk_{v^\rightarrow}$, constituted by as elements: the vector $v^\rightarrow$ inputted in S211; an element $k^*_0$ generated in S213; and the elements $K^*_{1,j}$ and $K^*_{2,j}$ generated in S214, to the decryption device 300 in secrecy via the network. As a matter of course, the decryption key $sk_{v^\rightarrow}$ might as well be distributed to the decryption device 300 by another method.

More specifically, from S211 through S214, the key generation device 100 executes the KeyGen algorithm indicated by Formula 155, to generate the decryption key $sk_{v^\rightarrow}$. Then, in S215, the key generation device 100 distributes the generated decryption key $sk_{v^\rightarrow}$ to the decryption device 300.

KeyGen$(pk, sk, \vec{v})$: [Formula 155]

$\delta, \varphi_0, \varphi_1 \xleftarrow{U} \mathbb{F}_q,$ $k_0^* := (\delta, 0, 1, \varphi_0, 0)_{\mathbb{B}_0^*},$ $K_{1,j}^* := \delta B_{1,j}^* + \varphi_1 B_{3,j}^*,$ $K_{2,j}^* := \sum_{L=1}^{n} v_L(\delta B_{1,j,L}'^* + \varphi_1 B_{3,j,L}'^*)$ for $j = 1, \ldots, 4,$ return $sk_{\vec{v}} := (\vec{v}, k_0^*, \{K_{1,j}^*, K_{2,j}^*\}_{j=1,\ldots,4}).$ The encryption device 200 will be described.

The process of the Enc algorithm will be described with reference to FIG. 12.

The processes of S221 to S224 are the same as the processes of S121 to S124 shown in FIG. 8.

(S225: Element $c_1$ Generation Step)

With the processing device, a cipher element generation part 232 generates element $c_1$, which is an element of a ciphertext $ct_{x^\rightarrow}$, as indicated by Formula 156.

$c_1 := (\omega \vec{x}, 0^n, 0^n, \eta_1 \vec{x})_{\mathbb{B}_1}$ [Formula 156]

As with Formula 135, Formula 156 means that: $\omega_{x1}, \ldots, \omega_{xn}$ are each set as the coefficient for basis vectors $b^*_{1,1}, \ldots b^*_{1,n}$ of the basis $B_1$; 0 is set as the coefficient for basis vectors $b^*_{1,n+1}, \ldots, b^*_{1,3n}$; and $\eta_1 x_1, \ldots, \eta_1 x_n$ are each set as the coefficient for basis vectors $b^*_{1,3n+1}, \ldots, b^*_{1,4n}$.

The process of S226 is the same as the process of S126 shown in FIG. 8.

(S227: Data Transmission Step)

For example, with the communication device, a data transmission part 240 transmits the ciphertext $ct_{x^\rightarrow}$, constituted by as elements: the vector $x^\rightarrow$ inputted in S222; an element $c_0$ generated in S224; the element $C_1$ generated in S225; and an element $c_3$ generated in S226, to the decryption device 300 via the network. As a matter of course, the ciphertext $ct_{x^\rightarrow}$ might as well be transmitted to the decryption device 300 by another method.

More specifically, from S221 through S226, the encryption device 200 executes the Enc algorithm indicated by Formula 157, to generate the ciphertext $ct_{x^\rightarrow}$. In S227, the encryption device 200 transmits the generated ciphertext $ct_{x^\rightarrow}$ to the decryption device 300.

$Enc(pk, m, \vec{x})$: [Formula 157]

$\omega, \eta_0, \eta_1, \zeta \xleftarrow{U} \mathbb{F}_q$, $c_0 := (-\omega, 0, \varsigma, 0, \eta_0)_{\mathbb{B}_0}$, $c_1 := (\omega \vec{x}, 0^n, 0^n, \eta_1 \vec{x})_{\mathbb{B}_1}$, $c_3 := g_T^\zeta m$, return $ct_{\vec{x}} := (x, c_0, c_1, c_3)$.

The decryption device 300 will be described.
The process of the Dec algorithm will be described with reference to FIG. 13.
The processes of S231 to S232 are the same as the processes of S131 to S132 shown in FIG. 9.
(S233: Value $D_j$ Calculation Step)
With the processing device, a pairing operation part 330 calculates value $D_j$, as indicated by Formula 158.

for $j=1, \ldots, 4$ $D_j := \Sigma_{L=1}^{n-1}((\vec{x} \cdot \vec{v})^{-1} v_L) C_{(j-1)n+L}$ [Formula 158]

Note that the element $c_1$ is parsed as 4n-tuples $(C_1, \ldots, C_{4n}) \in \mathbb{G}^{4n}$.
(S234: Pairing Operation Step)
With the processing device, the pairing operation part 330 executes a pairing operation, as indicated by Formula 159, to calculate value F.

$F := e(c_0, k_0^*) \cdot \Pi_{j=1}^4 (e(D_j, K_{1,j}^*) \cdot e(C_{j n}, K_{2,j}^*))$ [Formula 159]

The process of S235 is the same as the process of S135 shown in FIG. 9.
More specifically, from S231 through S235, the decryption device 300 executes the Dec algorithm indicated by Formula 160, to calculate a message m'.

$Dec(pk, sk_{\vec{v}} := (\vec{v}, k_0^*, \{K_{1,j}^*, K_{2,j}^*\}_{j=1,\ldots,4}), ct_{\vec{x}} := (\vec{x}, c_0, c_1, c_3))$:

Parse $c_1$ as a 4n-tuple $(C_1, \ldots, C_{4n}) \in \mathbb{G}^{4n}$, $D_j^* := \Sigma_{L=1}^{n-1}((\vec{x} \cdot \vec{v})^{-1} v_L) C_{(j-1)n+L}$ for $j=1, \ldots, 4$ $F := e(c_0, k_0^*) \cdot \Pi_{j=1}^4 (e(D_j, K_j^*) \cdot e(C_{j n}, K_{2,j}^*))$, return $m' := c_3/F$. [Formula 160]

Note that $B^*_1$ $(b^*_{1,1}, \ldots, b^*_{1,4n})$ is specified by $\{B^*_{i,j}, B'^*_{i,j,L}\}_{i,j=1,\ldots,4;L=1,\ldots,n}$. Also, $\{B^*_{i,j}, B'^*_{i,j,l}\}_{i=1,3;j=1,\ldots,4;L=1,\ldots,n}$ included in an output of the Setup algorithm is specified by $B'^*_1 := (b^*_{1,1}, \ldots, b^*_{1,n}, b^*_{1,2n+1}, \ldots, b^*_{1,3n})$.

The Dec algorithm can be described as Dec' algorithm indicated by Formula 161.

$Dec'(pk, sk_{\vec{v}} := (\vec{v}, k_0^*, \{K_{1,j}^*, K_{2,j}^*\}_{j=1,\ldots,4}),$ [Formula 161]

$ct_{\vec{x}} := (\vec{x}, c_0, c_1, c_3))$:

$k_1^* := (\overbrace{v_1 K_{1,1}^*, \ldots, v_{n-1} K_{1,1}^*}^{n}, K_{2,1}^*, \ldots,$ $\overbrace{v_1 K_{1,4}^*, \ldots, v_{n-1} K_{1,4}^*}^{n}, K_{2,4}^*)$, that is, $k_1^* = (\delta \vec{v}, 0^n, 0^n, \varphi_1 \vec{v})_{\mathbb{B}_1}$, $F := e(c_0, k_0^*) \cdot e((\vec{x} \cdot \vec{v})^{-1} c_1, k_1^*)$, return $m' := c_3/F$.

In the non-zero inner-product encryption scheme explained in Embodiment 3, the decryption key $sk_{\vec{v}}$ includes a total of 13 elements of G, namely, 5 by element $k^*_0$ indicated by Formula 135 and 8 by elements $K^*_{1,j}$ and $K^*_{2,j}$; for each integer j of $j=1, \ldots, 4$ indicated by Formula 154. In fine, the decryption key $sk_v$, has a constant size in n.

Also, in the non-zero inner-product encryption scheme explained in Embodiment 3, the decryption process (Dec algorithm) executes a total of only 13 pairing operations, namely, 5 by $e(c_0, k^*_0)$ and 8 by $\Pi_{j=1}^4 (e(D_j, K^*_{1,j}) \cdot e(C_{j n}, K_{2,j}^*))$ indicated by Formula 159. In fine, the decryption process requires only a small number of pairing operations.

Embodiment 4

In Embodiment 4, a zero inner-product encryption scheme having a constant-size ciphertext will be described.

The configurations of a key generation device 100, an encryption device 200, and a decryption device 300 are respectively the same as the configurations of the key generation device 100, the encryption device 200, and the decryption device 300 shown in FIGS. 3, 4, and 5 according to Embodiment 2.

Figure 14:
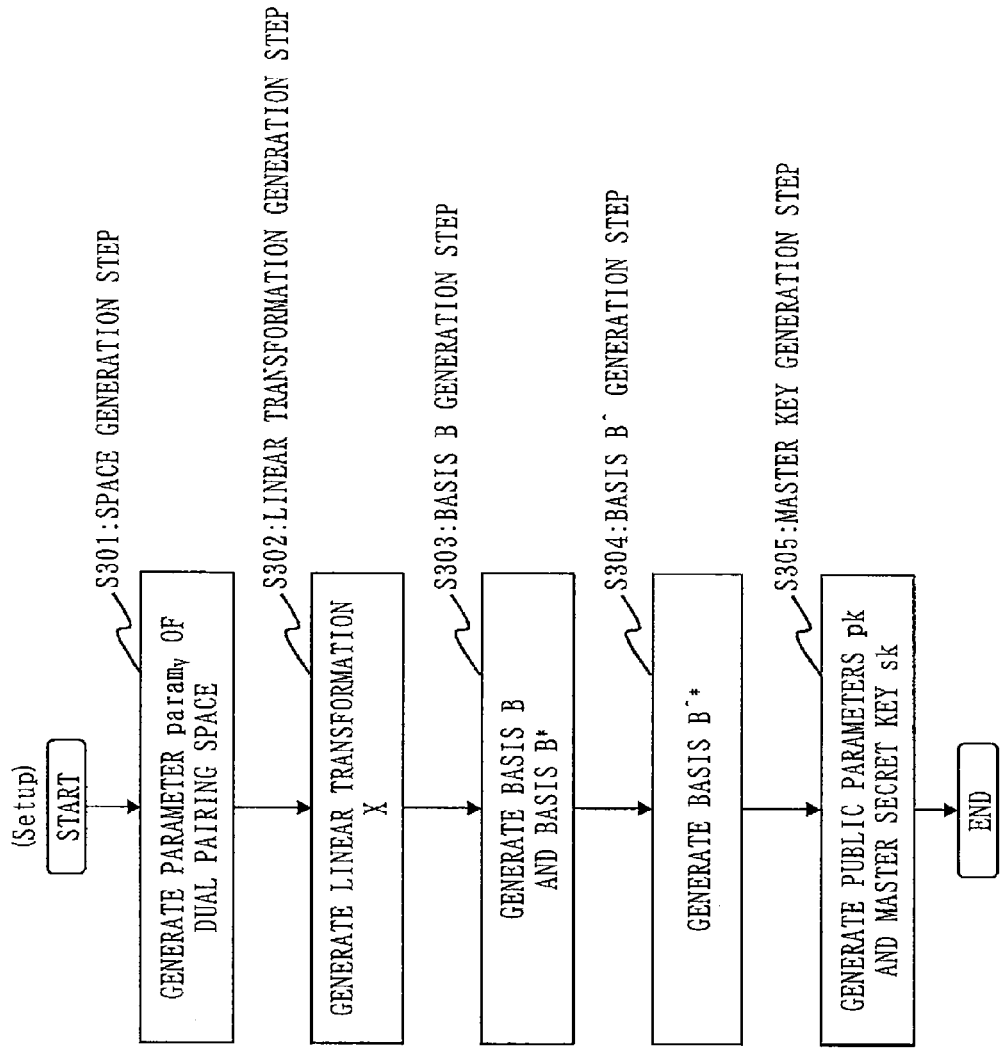
[FIG. 14] is a flowchart showing the process of Setup algorithm according to Embodiment 4.
Figure 15:
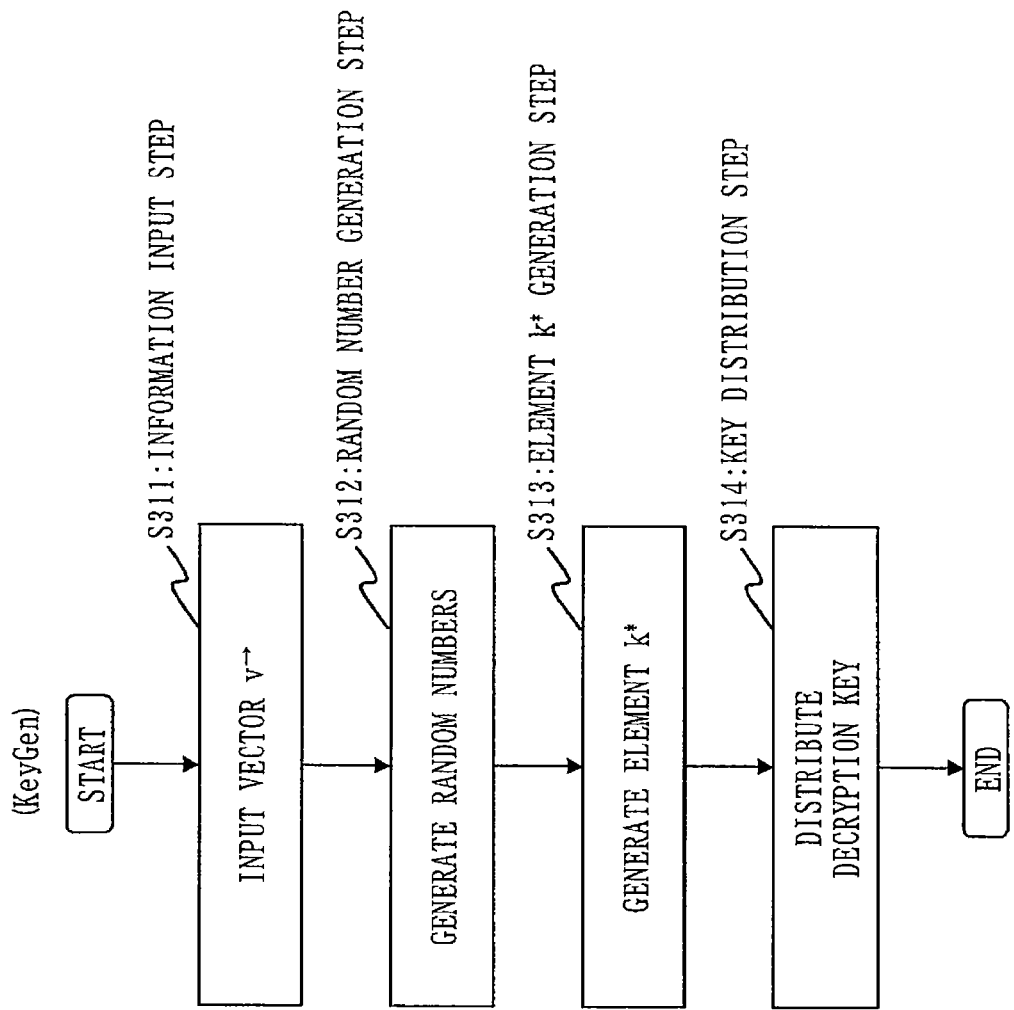
[FIG. 15] is a flowchart showing the process of KeyGen algorithm according to Embodiment 4.
Figure 16:
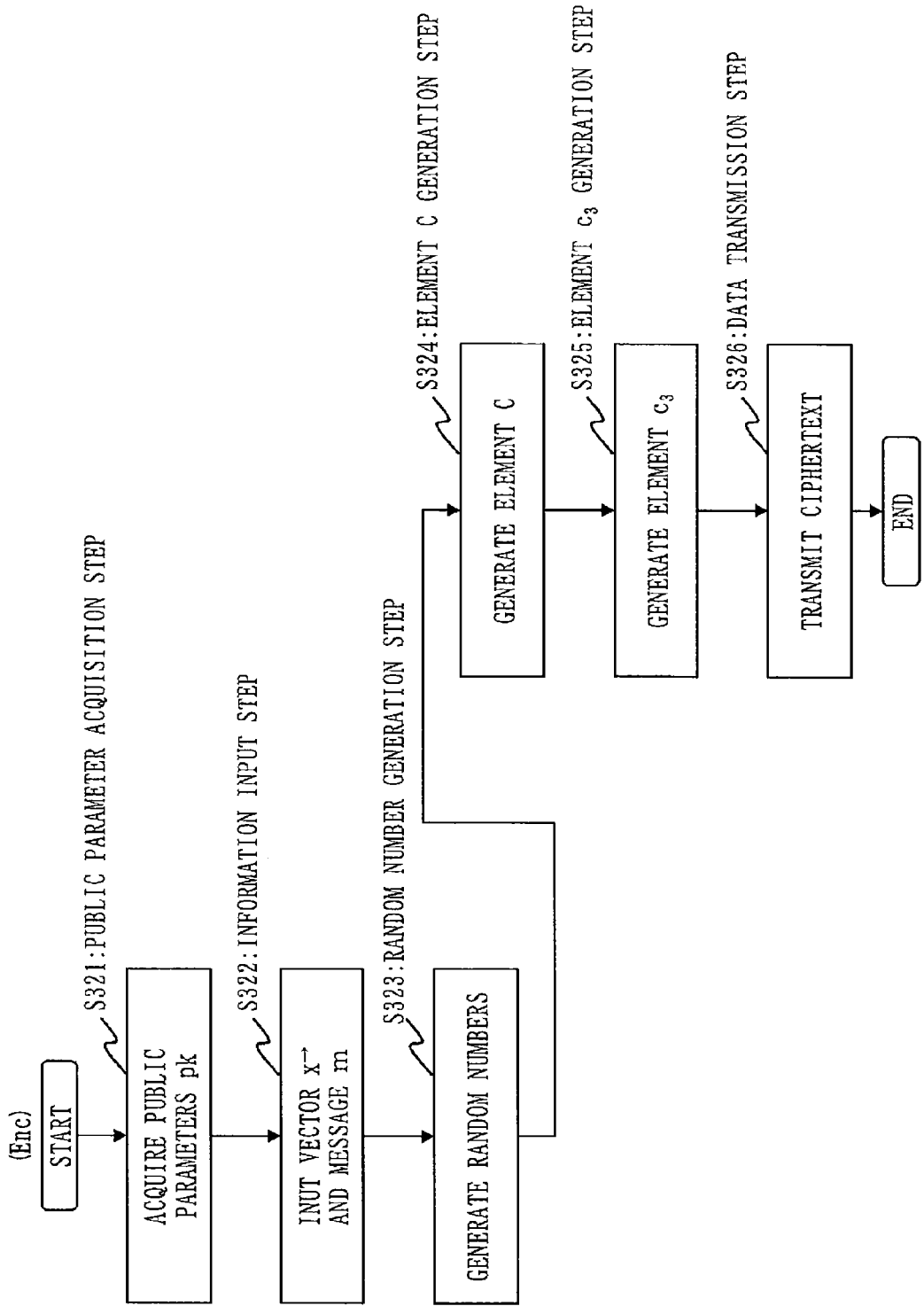
[FIG. 16] is a flowchart showing the process of Enc algorithm according to Embodiment 4.
Figure 17:
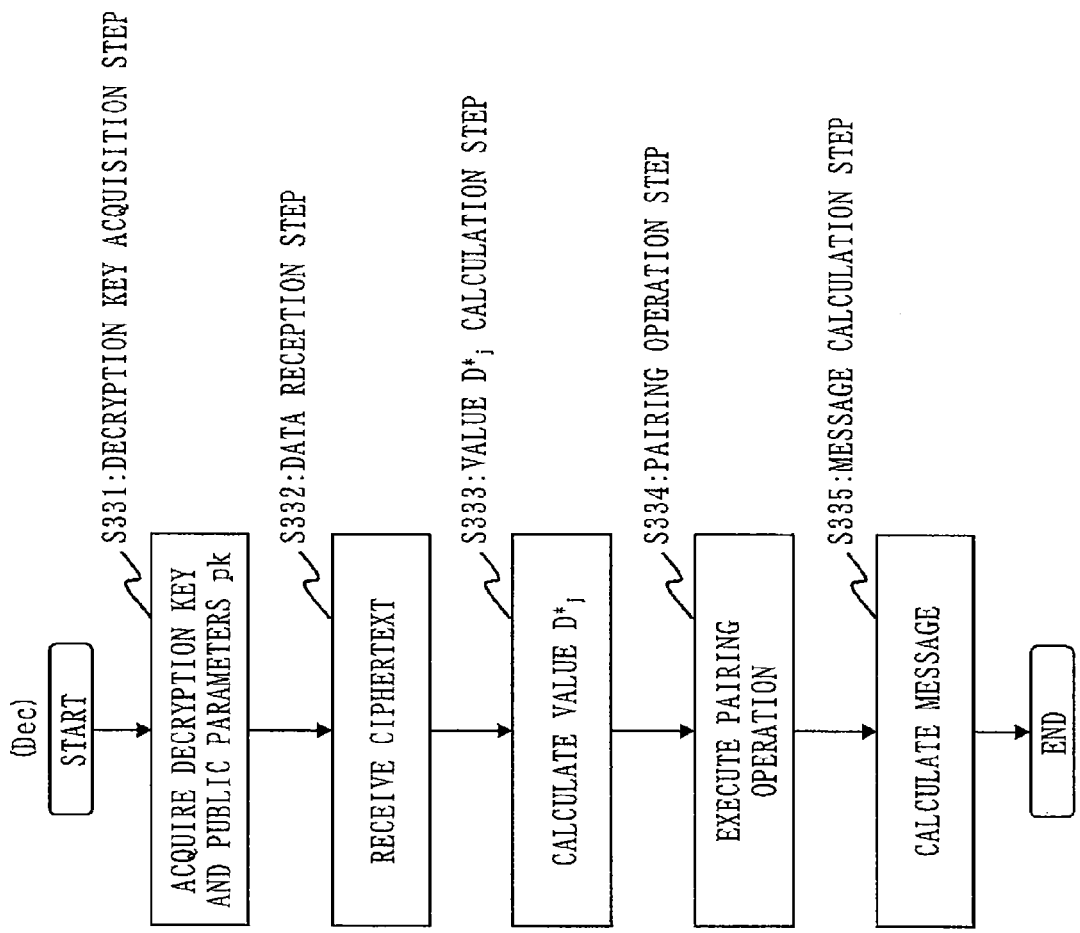
[FIG. 17] is a flowchart showing the process of Dec algorithm according to Embodiment 4.

FIGS. 14 and 15 are flowcharts showing the operation of the key generation device 100 according to Embodiment 4, in which FIG. 14 is a flowchart showing the process of Setup algorithm according to Embodiment 4, and FIG. 15 is a flowchart. showing the process of KeyGen algorithm according to Embodiment 4. FIG. 16 is a flowchart showing the operation of the encryption device 200 according to Embodiment 4, that is, a flowchart showing the process of Enc algorithm according to Embodiment 4. FIG. 17 is a flowchart showing the operation of the decryption device 300 according to Embodiment 4, that is, a flowchart showing the process of Dec algorithm according to Embodiment 4.

In the following description, let a vector $\vec{x} := (x_1, \ldots, x_n)$ to be inputted hold $x_L \neq 0$ for each integer L of $L=1, \ldots, n-1$, and let a vector $\vec{v} := (v_1, \ldots, v_n)$ to be inputted hold $v_n \neq 0$.

The key generation device 100 will be described.
The process of the Setup algorithm will be described with reference to FIG. 14.
(S301: Space Generation Step)
A space generation part 111 takes security parameter $1^\lambda$ as an input and executes $\mathcal{G}_{bpg}$ with a processing device, to generate parameter $param_G := (q, G, G_T, g, e)$ of symmetric bilinear pairing groups.

Furthermore, the space generation part 111 sets $N := 4n+1$. Then, the space generation part 111 takes as input the security parameter $1^\lambda$, N, and the parameter $param_G$ of the symmetric bilinear pairing groups and executes $\mathcal{G}_{dpvs}$ with the processing device, to generate a parameter $param_{v_t} := (q, V, G_T, A, e)$ of the dual pairing vector spaces.

(S302: Linear Transformation Generation Step)
With the processing device, a matrix generation part 112 generates linear transformation X, as indicated by Formula 162.

$X := \xleftarrow{U} \mathcal{L}'(N, \mathbb{F}_q)$ [Formula 162]

Note that $L'(N, \mathbb{F}_q)$ in Formula 162 is as indicated by Formula 163.

$$\mathcal{L}'(N, \mathbb{F}_q) := \left\{ X := \right.$$ [Formula 163]

$$\left. \begin{pmatrix} \chi_{0,0} & \chi_{0,1}\vec{e}_n & \cdots & \chi_{0,4}\vec{e}_n \\ \vec{\chi}_{1,0}^T & X_{1,1} & \cdots & X_{1,4} \\ \vdots & \vdots & & \vdots \\ \vec{\chi}_{4,0}^T & X_{4,1} & \cdots & X_{4,4} \end{pmatrix} \middle| \begin{array}{l} X_{i,j} \in \mathcal{H}(n, \mathbb{F}_q), \\ \vec{\chi}_{i,0} := \\ (\chi_{i,0,L})_{L=1,\ldots,n} \in \\ \mathbb{F}_q^n, \\ \chi_{0,0}, \chi_{0,j} \in \mathbb{F}_q \\ \text{for} \\ i, j = 1, \ldots, 4 \end{array} \right\}$$

$$\cap \, GL(N, \mathbb{F}_q),$$

$$\mathcal{H}(n, \mathbb{F}_q) :=$$

$$\left\{ \begin{pmatrix} u & & & u'_1 \\ & \ddots & & \vdots \\ & & u & u'_{n-1} \\ & & & u'_n \end{pmatrix} \middle| \begin{array}{l} u, u'_L \in \mathbb{F}_q \text{ for } L=1,\ldots,n, \\ \text{a blank element in the matrix} \\ \text{denotes } 0 \in \mathbb{F}_q \end{array} \right\}$$

Note that $\{\chi_{0,0}, \chi_{0,j}, \chi_{i,0,L}, \mu_{i,j}, \mu'_{i,j,L}\}_{i,j=1,\ldots,4;L=1,\ldots,n}$ in the following description denotes an element other than constant value 0 in the linear transformation X.

(S303: Basis B Generation Step)

With the processing device, a basis generation part 113 generates variables $B_{0,0}$, $B_{0,j}$, $B_{i,0,L}$, $B_{i,j}$, and $B'_{i,j,L}$, as indicated by Formula 164.

for $i,j=1,\ldots,4; L=1,\ldots,n$ $B_{0,0} := \chi_{0,0} g,$ $B_{0,j} := \chi_{0,j} g,$ $B_{i,0,L} := \chi_{i,0,L} g,$ $B_{i,j} := \mu_{i,j} g,$ $B_{i,j,L}' := \mu_{i,j,L}' g$ [Formula 164]

With the processing device, the basis generation part 113 also generates a basis B*, as indicated by Formula 165.

$(\theta_{i,j})_{i,j=0,\ldots,4n} := \psi \cdot (X^T)^{-1},$ $b_{t,i}^* := (\theta_{i,1}, \ldots, \theta_{i,N})_\mathbb{A} = \Sigma_{j=0}^{4n} \theta_{i,j} a_j$ for $i=0,\ldots,4n,$ $\mathbb{B}^* := (b_0^*, \ldots, b_{4n}^*)$ [Formula 165]

(S304: Basis B^ Generation Step)

With the processing device, a key generation part 114 generates a basis $\hat{B}^*_0$, as indicated by Formula 166.

$\hat{\mathbb{B}}^* := (b_0^*, \ldots, b_n^*, b_{2n+1}^*, \ldots, b_{3n}^*)$ [Formula 166]

(S305: Master Key Generation Step)

With the processing device, the key generation part 114 sets public parameters $pk := (1^\lambda, param_n, \hat{B}^*_0, \{B_{0,0}, B_{0,j}, B_{1,0,L}, B_{i,j}, B'_{i,j,L}\}_{i=1,4;j=1,\ldots,4;L=1,\ldots,n})$, and master secret key $sk := \hat{B}^*$. Then, the key generation part 114 stores the public parameters pk and the master secret key sk in a master key storage part 120.

Note $param_n := (param_v, g_T)$.

More specifically, from S301 through S305, the key generation device 100 executes the Setup algorithm indicated by Formula 168 using algorithm $G^{(3)}_{ob}$ indicated by Formula 167, to generate the public parameters pk and the master secret key sk.

$\mathcal{G}_{ob}^{(3)}(1^\lambda, n):$ [Formula 167]

$param_\mathbb{G} := (q, \mathbb{G}, \mathbb{G}_T, g, e) \xleftarrow{R} \mathcal{G}_{bpg}(1^\lambda),$ $N := 4n + 1,$ $\psi \xleftarrow{U} \mathbb{F}_q^\times, g_T := e(g, g)^\psi,$ $param_\mathbb{V} := (q, \mathbb{V}, \mathbb{G}_T, \mathbb{A}, e) := \mathcal{G}_{dpvs}(1^\lambda, N, param_\mathbb{G}),$ $param_n := (param_\mathbb{V}, g_T),$ $X \xleftarrow{U} \mathcal{L}'(N, \mathbb{F}_q),$ hereafter, $\{\chi_{0,0}, \chi_{0,j}, \chi_{i,0,L}, \mu_{i,j}, \mu'_{i,j,L}\}_{i,j=1,\ldots,4;L=1,\ldots,n}$ denotes non-zero entities of X, $(\vartheta_{i,j})_{i,j=0,\ldots,4n} := \psi \cdot (X^T)^{-1},$ $B_{0,0} := \chi_{0,0} g, B_{0,j} := \chi_{0,j} g,$ $B_{i,0,L} := \chi_{i,0,L} g, B_{i,j} := \mu_{i,j} g, B'_{i,j,L} := \mu'_{i,j,L} g$ for $i, j = 1, \ldots, 4; L = 1, \ldots, n,$ $b_i^* := (\vartheta_{i,1}, \ldots, \vartheta_{i,N})_\mathbb{A} = \sum_{j=0}^{4n} \vartheta_{i,j} a_j$ for $i = 0, \ldots, 4n, \mathbb{B}^* := (b_0^*, \ldots, b_{4n}^*),$ return $(param_n,$ $\{B_{0,0}, B_{0,j}, B_{i,0,L}, B_{i,j}, B'_{i,j,L}\}_{i,j=1,\ldots,4;L=1,\ldots,n}, \mathbb{B}^*).$ Setup$(1^\lambda, n):$ [Formula 168]

$(param_n,$ $\{B_{0,0}, B_{0,j}, B_{i,0,L}, B_{i,j}, B'_{i,j,L}\}_{i,j=1,\ldots,4;L=1,\ldots,n},$ $\mathbb{B}^*) \xleftarrow{R} \mathcal{G}_{ob}^{(3)}(1^\lambda, n),$ $\hat{\mathbb{B}}^* := (b_0^*, \ldots, b_n^*, b_{2n+1}^*, \ldots, b_{3n}^*),$ return $pk := (1^\lambda, param_n,$ $\{B_{0,0}, B_{0,j}, B_{i,0,L}, B_{i,j}, B'_{i,j,L}\}_{i=1,4;j=1,\ldots,4;L=1,\ldots,n}),$ $sk := \hat{\mathbb{B}}^*.$ Note that the public parameters are publicized via, e.g., a network, so the encryption device 200 and decryption device 300 can acquire them.

The process of the KeyGen algorithm will be described with reference to FIG. 15.

The process of S311 is the same as the process of S111 shown in FIG. 7.

(S312: Random Number Generation Step)

With the processing device, a random number generation part 141 generates random numbers, as indicated by Formula 169.

$\delta, \varphi \xleftarrow{U} \mathbb{F}_q$ [Formula 169]

(SS313: Element k* Generation Step)

With the processing device, a key element generation part 142 generates element k*, which is an element of a decryption key $sk_{\vec{v}}$, as indicated by Formula 170.

$$k^* := \left(1, \frac{n}{\delta \vec{v}}, \frac{n}{0^n}, \frac{n}{\varphi \vec{v}}, \frac{n}{0^n}\right)_{\mathbb{B}^*}$$ [Formula 170]

As with Formula 135, Formula 170 means that: 1 is set as the coefficient for basis vector $b^*_0$ of a basis $B^*$; $\delta v_1, \ldots, \delta v_n$ are each set as the coefficient for basis vectors $b^*_1, b^*_n$; 0 is set as the coefficient for basis vectors $b^*_{n+1}, \ldots, b^*_{2n}$; $\varphi v_1, \ldots, \varphi v_n$ are each set as the coefficient for basis vectors $b^*_{2n+1}, \ldots, b^*_{3n}$; and 0 is set as the coefficient for basis vectors $b^*_{3n+1}, \ldots, b^*_{4n}$.

(S314: Key Distribution Step)

For example, with the communication device, a key distribution part 150 distributes the decryption key $sk_{v \to}$, constituted by as elements, the element $k^*$ generated in S313, to the decryption device 300 in secrecy via the network. As a matter of course, the decryption key $sk_{v \to}$ might as well be distributed to the decryption device 300 by another method.

More specifically, from S311 through S313, the key generation device 100 executes the KeyGen algorithm indicated by Formula 171, to generate the decryption key $sk_{v \to}$. Then, in S314, the key generation device 100 distributes the generated decryption key $sk_{v \to}$ to the decryption device 300.

$$KeyGen(pk, sk, \vec{v}): \delta, \varphi \xleftarrow{U} \mathbb{F}_q,$$

$$k^* := \left(1, \frac{n}{\delta \vec{v}}, \frac{n}{0^n}, \frac{n}{\varphi \vec{v}}, \frac{n}{0^n}\right)_{\mathbb{B}^*},$$

return $sk_{\vec{v}} := k^*.$ [Formula 171]

The encryption device 200 will be described.

The process of the Enc algorithm will be described with reference to FIG. 16.

The processes of S321 to S322 are the same as the processes of S121 to S122 shown in FIG. 8

(S323: Random Number Generation Step)

With the processing device, a random number generation part 231 generates random numbers, as indicated by Formula 172.

$$\omega, \eta, \zeta \xleftarrow{U} \mathbb{F}_q$$ [Formula 172]

(S324: Element C Generation Step)

With the processing device, a cipher element generation part 232 generates elements $C_0$, $C_{1,j}$, and $C_{2,j}$, which are elements of a ciphertext $ct_{x \to}$, as indicated by Formula 173.

$$C_0 := \zeta B_{0,0} + \Sigma_{L=1}^n x_L(\omega B_{1,0,L} + \eta B_{4,0,L}),$$

for $j=1, \ldots, 4$ $$C_{1,j} := \omega B_{1,j} + \eta B_{4,j},$$

$$C_{2,j} := \zeta B_{0,j} + \Sigma_{L=1}^n x_L(\omega B'_{1,j,L} + \eta B'_{4,j,L})$$ [Formula 173]

The process of S325 is the same as the process of S126 shown in FIG. 8.

(S326: Data Transmission Step)

For example, with the communication device, a data transmission part 240 transmits the ciphertext ct., constituted by as elements: the vector $x^{\to}$ inputted in S322, the elements $C_0$, $C_{i,j}$, and $C_{2,j}$ generated in S324; and an element $c_3$ generated in S325, to the decryption device 300 via the network. As a matter of course, the ciphertext $ct_{x \to}$ might as well be transmitted to the decryption device 300 by another method.

More specifically, from S321 through S325, the encryption device 200 executes the Enc algorithm indicated by Formula 174, to generate the ciphertext $ct_{x \to}$. In S326, the encryption device 200 transmits the generated ciphertext $ct_x$ to the decryption device 300.

$$Enc(pk, m, \vec{x}):$$ [Formula 174]

$$\omega, \eta, \zeta \xleftarrow{U} \mathbb{F}_q,$$

$$C_0 := \zeta B_{0,0} + \sum_{L=1}^n x_L(\omega B_{1,0,L} + \eta B_{4,0,L}),$$

$$c_3 := g_T^\zeta m,$$

$$C_{1,j} := \omega B_{1,j} + \eta B_{4,j},$$

$$C_{2,j} := \zeta B_{0,j} + \sum_{L=1}^n x_L(\omega B'_{1,j,L} + \eta B'_{4,j,L})$$

for $j = 1, \ldots, 4$, return $$ct_{\vec{x}} := (\vec{x}, C_0, \{C_{1,j}, C_{2,j}\}_{j=1,\ldots,4}, c_3).$$

The decryption device 300 will be described.

The process of the Dec algorithm will be described with reference to FIG. 17.

The processes of S331 to S332 are the same as the processes of S131 to S132 shown in FIG. 9.

(S333: Value $D^*_j$ Calculation Step)

With the processing device, a pairing operation part 330 calculates value $D^*_j$, as indicated by Formula 175.

for $j=1, \ldots, 4$ $$D_j^* := \Sigma_{L=1}^{n-1} x_L K_{(j-1)n+L}^*$$ [Formula 175]

Note that the element $k^*_1$ is parsed as $(4n+1)$-tuples $(K^*_0, \ldots, K_{4n}^*) \in \mathbb{G}^{4n+1}$.

(S334: Pairing Operation Step)

With the processing device, the pairing operation part 330 executes a pairing operation, as indicated by Formula 176, to calculate value F.

$$F = e(c_0, K_0^*) \cdot \Pi_{j=1}^4 (e(C_{1,j}, D_j^*) \cdot e(C_{2,j}, K_{jn}^*))$$ [Formula 176]

The process of S335 is the same as the process of S135 shown in FIG. 9.

More specifically, from S331 through S335, the decryption device 300 executes the Dec algorithm indicated by Formula 177, to calculate a message m'.

$$Dec(pk, sk_{\vec{v}} := k^*, ct_{\vec{x}} := (\vec{x}, C_0, \{C_{1,j}, C_{2,j}\}_{j=1,\ldots,4}, c_3)):$$

Parse $k^*$ as a $(4n+1)$-tuple $(K_0^*, \ldots, K_{4n}^*) \in \mathbb{G}_{4n+1}$, $$D_j^* := \Sigma_{L=1}^{n-1} x_L K_{(j-1)n+L}^* \text{ for } j=1,\ldots,4$$

$$F := e(c_0, K_0^*) \cdot \Pi_{j=1}^4 (e(C_{1,j}, D_j^*) \cdot e(C_{2,j}, K_{jn}^*)),$$

return $m' := c_3/F.$ [Formula 177]

Note that $B := (b_0, \ldots, b_{4n})$ is specified by $\{B_{0,0}, B_{0,j}, B_{i,0,L}, B_{i,j}, B'_{i,j,L}\}_{j=1,\ldots,4; L=1,\ldots,n}$. Also, $\{B_{0,0}, B_{0,j}, B_{i,0,L}, B_{i,j}, B'_{i,j,L}\}_{i=1,4; j=1,\ldots,4; L=1,\ldots,n}$ included in an output of the Setup algorithm is specified by $B^\wedge := (b_0, \ldots, b_n, b_{3n+1}, \ldots, b_{4n})$.

The Dec algorithm can be described as Dec' algorithm indicated by Formula 178.

$Dec'(pk, sk_{\vec{v}} := k^*, ct_{\vec{v}} := (\vec{x}, C_0, \{C_{1,j}, C_{2,j}\}_{j=1,\ldots,4}, c_3))$: [Formula 178]

$$c := \left(C_0, \overline{x_1 C_{1,1}, \ldots, x_{n-1} C_{1,1}}^n, C_{2,1}, \ldots, \right.$$
$$\left. \overline{x_1 C_{1,4}, \ldots, x_{n-1} C_{1,4}}^n, C_{2,4}\right),$$

that is, $c = \left(\zeta, \overline{\omega\vec{x}}^n, \overline{0^n}^n, \overline{0^n}^n, \overline{\eta\vec{x}}^n, \right)\mathbb{B}$, $F := e(c, k^*)$, return $m' := c_3 / F$.

As indicated by Formula 179, using the Dee algorithm, $F=g_T^\zeta$ is obtained if $\vec{x}\cdot\vec{v}=0$. Hence, the message m' (=m) can be obtained by dividing $c_3=g_T^\zeta m$ by F.

$F=e(c,k)=g_T^{\zeta+\omega\delta\vec{x}\cdot\vec{v}}=g_T^\zeta$ if $\vec{x}\cdot\vec{v}=0$. [Formula 179]

In the zero inner-product encryption scheme explained in Embodiment 4, the ciphertext $ct_{\vec{x}}$ includes a total of 9 elements of G, namely, 1 by element $C_0$ and 8 by elements $C_{1,j}$ and $C_{2,j}$ for each integer j of j=1, ..., 4 indicated by Formula 173. Also, the ciphertext $ct_{\vec{x}}$ includes 1 element of $G_T$, namely, 1 by element $c_3$. In fine, the ciphertext $ct_{\vec{x}}$ has a constant size in n.

Also, in the zero inner-product encryption scheme explained in Embodiment 4, the decryption process (Dec algorithm) executes a total of only 9 pairing operations, namely, 1 by $e(C_0, K^*_0)$ and 8 by $\Pi_{j=1}^4 (e(C_{1,j}, D^*_j) \cdot e(C_{2,j}, K^*_{jn})$ indicated by Formula 176. In fine, the decryption process requires only a small number of pairing operations.

Embodiment 5

In Embodiment 5, a zero inner-product encryption scheme having a constant-size secret key will be described.

The configurations of a key generation device 100, an encryption device 200, and a decryption device 300 are respectively the same as the configurations of the key generation device 100, the encryption device 200, and the decryption device 300 shown in FIGS. 3, 4, and 5 according to Embodiment 2.

Figure 18:
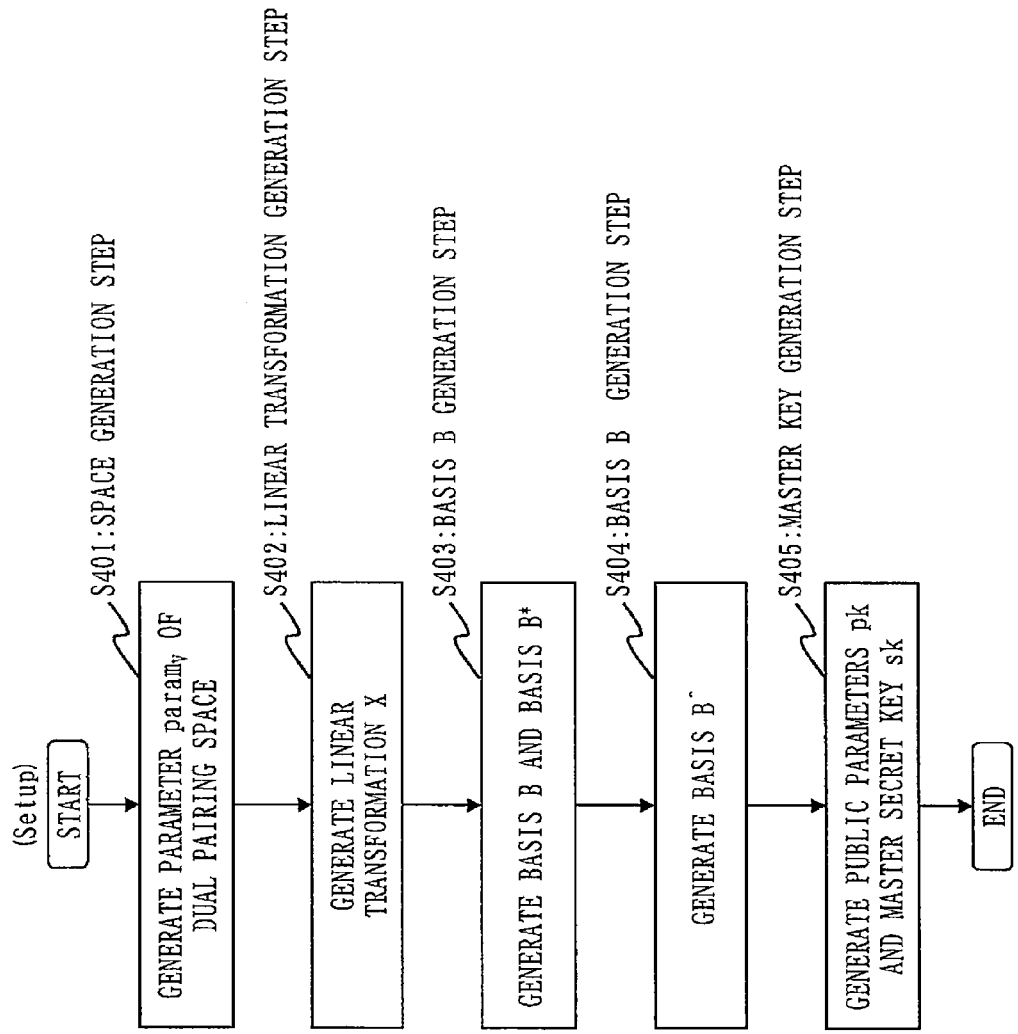
[FIG. 18] is a flowchart showing the process of Setup algorithm according to Embodiment 5.
Figure 19:
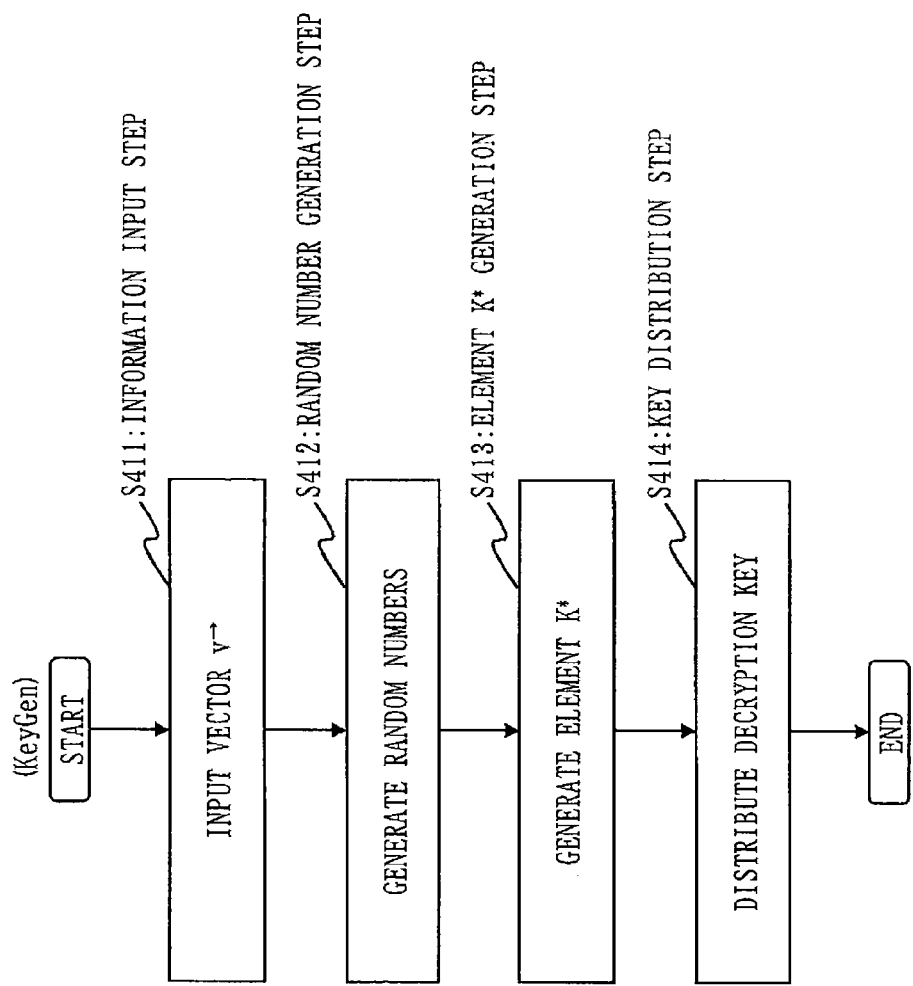
[FIG. 19] is a flowchart showing the process of KeyGen algorithm according to Embodiment 5.
Figure 20:
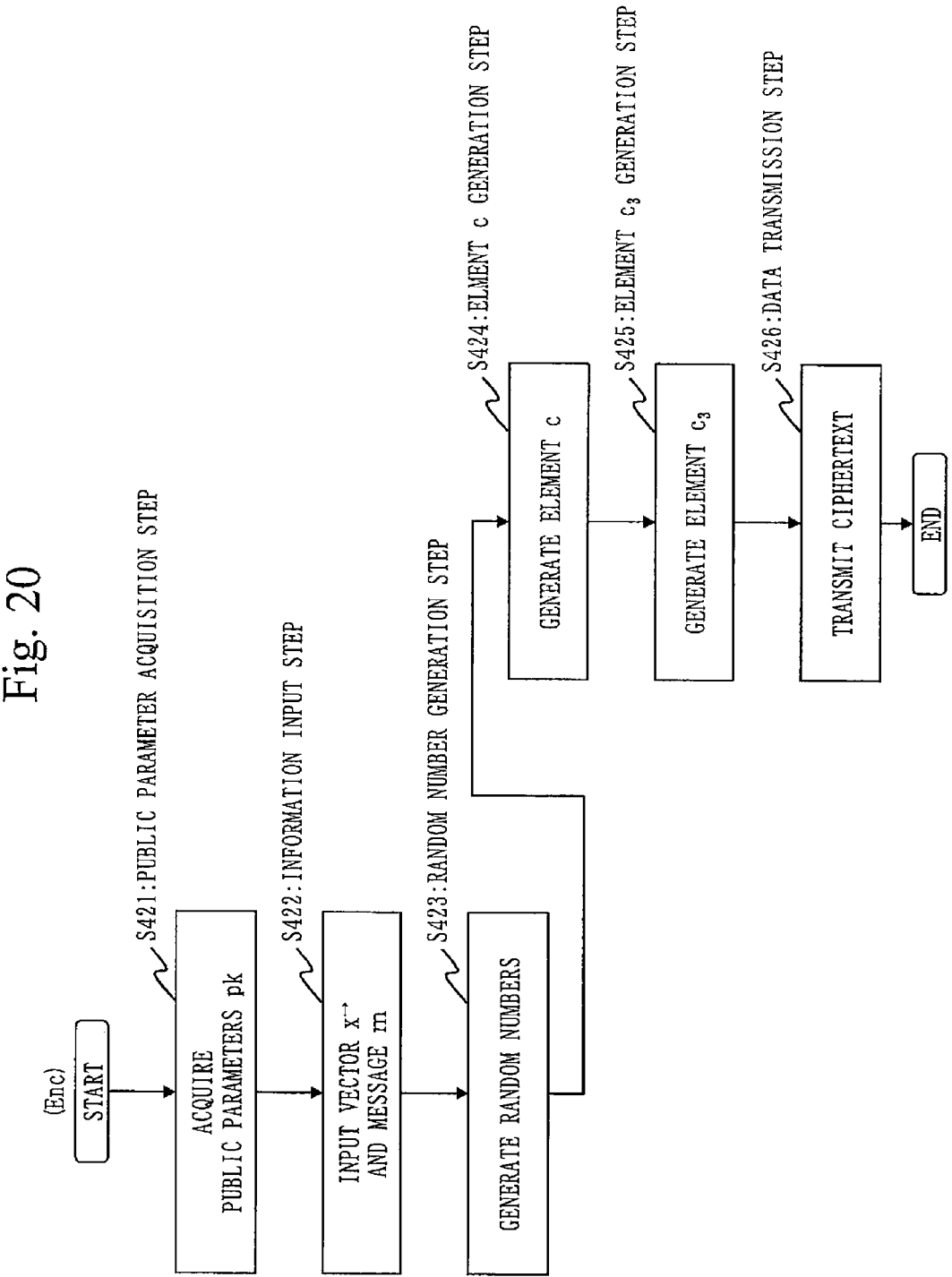
[FIG. 20] is a flowchart showing the process of Enc algorithm according to Embodiment 5.

FIGS. 18 and 19 are flowcharts showing the operation of the key generation device 100 according to Embodiment 5, in which FIG. 18 is a flowchart showing the process of Setup algorithm according to Embodiment 5, and FIG. 19 is a flowchart showing the process of KeyGen algorithm according to Embodiment 5. FIG. 20 is a flowchart showing the operation of the encryption device 200 according to Embodiment 5, that is, a flowchart showing the process of Enc algorithm according to Embodiment 5. FIG. 21 is a flowchart showing the operation of the decryption device 300 according to Embodiment 5, that is, a flowchart showing the process of Dec algorithm according to Embodiment 5.

In the following description, let a vector $\vec{v}:=(v_1, \ldots, v_n)$ to be inputted hold $v_L \neq 0$ for each integer L of L=1, ..., n−1, and let a vector $\vec{x}:=(x_1, \ldots, x_n)$ to be inputted hold $x_n \neq 0$.

The key generation device 100 will be described.

The process of the Setup algorithm will be described with reference to FIG. 18.

The processes of S401 to S402 are the same as the processes of S301 to S302 shown in FIG. 14.

(S403: Basis B Generation Step)

With a processing device, a basis generation part 113 generates bases $D_{0,0}$, $D_{0,j}$, $D_{i,0,L}$, $D_{i,j}$, and $D'_{i,j,L}$, as indicated by Formula 180, in the same manner as the bases $B_{0,0}$, $B_{0,j}$, $B_{i,0,j}$, and $B'_{i,j,L}$ of Embodiment 4 are.

for i, j=1, ..., 4; L=−1, ..., n $D_{0,0}:=\chi_{0,0} g$, $D_{0,j}:=\chi_{0,j} g$, $D_{i,0,L}:=\chi_i, 0, L g$, $D_{i,j}:=\mu_{i,j} g$, $D_{i,j,L}':=\mu'_{i,j,L} g$ [Formula 180]

With the processing device, the basis generation part 113 also generates a basis D* as indicated by Formula 181, in the same manner as the basis B* of Embodiment 4 is.

$(\theta_{i,j})_{i,j=0,\ldots,4n}:=\psi\cdot(X^T)^{-1}$, $b_i^*:=(\theta_{i,1}, \ldots, \theta_{i,N})\mathbb{A} = \Sigma_{j=0}^{4n}\theta_{i,j}a_j$ for i=1, ..., 4n, $\mathbb{D}^* := (b_0^*, \ldots, b_{4n}^*)$ [Formula 181]

Then, the basis generation part 113 treats the basis D* as a basis B. Also, for each of integers i, j of i, j=1, ..., 4 and each integer L of L=1, ..., n, the basis generation part 113 treats the variable $D_{0,0}$ as a variable $B^*_{0,0}$, the variable $D_{0,j}$ as a variable $B^*_{0,j}$, the variable $D_{i,0,L}$ as a variable $B^*_{i,0,L}$, the variable $D_{i,j}$ as a variable $B^*_{i,j}$, and the variable $D'_{i,j,L}$ as a variable $B'^*_{i,j,L}$.

(S404: Basis BA Generation Step)

With the processing device, a key generation part 114 generates a basis B^, as indicated by Formula 182.

$\hat{\mathbb{B}} := (b_0, \ldots, b_n, b_{3n+1}, \ldots, b_{4n})$ [Formula 182]

(S405: Master Key Generation Step)

With the processing device, the key generation part 114 sets public parameters pk:=($1^\lambda$, param$_n$, B^), and master secret key sk:=($\{B^*_{0,0}, B^*_{0,j}, B^*_{i,0,L}, B^*_{i,j},$ $B'^*_{i,j,L}\}_{i=1;3;j=1,\ldots,4;L=1,\ldots n}$). Then, the key generation part 114 stores the public parameters pk and the master secret key sk in a master key storage part 120.

Note param$_n$:=(param$_\mathbb{V}$, $g_T$).

More specifically, from S401 through S405, the key generation device 100 executes the Setup algorithm indicated by Formula 184 using algorithm $\mathcal{G}^{(4)}_{ob}$ indicated by Formula 183, to generate the public parameters pk and the master secret key sk. As indicated by Formula 183, the algorithm $\mathcal{G}^{(4)}_{ob}$, employs algorithm $\mathcal{G}^{(3)}_{ob}$ indicated by Formula 167.

$\mathcal{G}^{(4)}_{ob}(1^\lambda, n)$: (param$_n$, [Formula 183]

$\{D_{0,0}, D_{0,j}, D_{i,0,L}, D_{i,j}, D'_{i,j,L}\}_{i,j=1,\ldots,4;L=1,\ldots,n}$, $\mathbb{D}^*) \xleftarrow{R} \mathcal{G}^{(3)}_{ob}(1^\lambda, n)$, $\mathbb{B} := \mathbb{D}^*, B^*_{0,0} := D_{0,0}, B^*_{0,j} := D_{0,j}, B^*_{i,0,L} := D_{i,0,L}$, $B^*_{i,j} := D_{i,j}, B'^*_{i,j} := D_{i,j}, B'^*_{i,j,L} := D'^*_{i,j,L}$ for i, j = 1, ... 4; L = 1, ..., n, return (param$_n$, $\mathbb{B}$, $\{B^*_{0,0}, B^*_{0,j}, B^*_{i,0,L}, B^*_{i,j}, B'^*_{i,j,L}\}_{i,j=1,\ldots,4;L=1,\ldots,n}$).

-continued $$\text{Setup}(1^\lambda, n):$$ [Formula 184]

$$\begin{pmatrix} param_n, \mathbb{B}, \\ \{B^*_{0,0}, B^*_{0,j}, B^*_{i,0,L}, B^*_{i,j}, B'^*_{i,j,L}\}_{i,j=1,\ldots,4;L=1,\ldots,n} \end{pmatrix} \xleftarrow{R}$$

$$\mathcal{G}^{(4)}_{ob}(1^\lambda, n),$$

$$\hat{\mathbb{B}} := (b_0, \ldots, b_n, b_{3n+1}, \ldots, b_{4n}),$$

$$\text{return pk} := (1^\lambda, param_n, \hat{\mathbb{B}}),$$

$$sk :=$$

$$\{B^*_{0,0}, B^*_{0,j}, B^*_{i,0,L}, B^*_{i,j}, B'^*_{i,j,L}\}_{i=1,3;j=1,\ldots,4;L=1,\ldots,n}.$$

Note that the public parameters are publicized via, e.g., a network, so the encryption device 200 and decryption device 300 can acquire them.

The process of the KeyGen algorithm will be described with reference to FIG. 19.

The processes of S411 to S412 are the same as the processes of S311 to S312 shown in FIG. 15.

(S413: Element K* Generation Step)

With the processing device, a key element generation part 142 generates elements $K^*_0$, $K^*_{1,j}$, and $K^*_{2,j}$, which are elements of a decryption key $sk_{\vec{v}}$, as indicated by Formula 185.

$$K_0^* := B_{0,0}^* + \Sigma_{L=1}^n v_L(\delta B_{1,0,L}^* + \phi B_{3,0,L}^*),$$

for $j=1,\ldots,4$ $$K_{1,j}^* := \delta B_{1,j}^* + \phi B_{3,j}^*,$$

$$K_{2,j}^* := B_{0,j}^* + \Sigma_{L=1}^n v_L(\delta B_{1,j,L}'^* + \phi B_{3,j,L}'^*)$$ [Formula 185]

(S414: Key Distribution Step)

For example, with a communication device, a key distribution part 150 distributes the decryption key $sk_{\vec{v}}$, constituted by as elements: the vector $\vec{v}$ inputted in S411 and the elements $K^*_0$, $K^*_{1,j}$, and $K^*_{2,j}$ generated in S413, to the decryption device 300 in secrecy via the network. As a matter of course, the decryption key $sk_{\vec{v}}$ might as well be distributed to the decryption device 300 by another method.

More specifically, from S411 through S413, the key generation device 100 executes the KeyGen algorithm indicated by Formula 186, to generate the decryption key $sk_{\vec{v}}$. Then, in S414, the key generation device 100 distributes the generated decryption key $sk_{\vec{v}}$ to the decryption device 300.

$$KeyGen(pk, sk, \vec{v}): \delta, \varphi \xleftarrow{U} \mathbb{F}_q,$$ [Formula 186]

$$K_0^* := B_{0,0}^* + \sum_{L=1}^n v_L(\delta B_{1,0,L}^* + \varphi B_{3,0,L}^*),$$

$$K_{1,j}^* := \delta B_{1,j}^* + \varphi B_{3,j}^*,$$

$$K_{2,j}^* := B_{0,j}^* + \sum_{L=1}^n v_L(\delta B_{1,j,L}'^* + \varphi B_{3,j,L}'^*)$$

for $j = 1, \ldots, 4$ $$\text{return } sk_{\vec{v}} := (\vec{v}, K_0^*, \{K_{1,j}^*, K_{2,j}^*\}_{j=1,\ldots,4}).$$

The encryption device 200 will be described.

The process of the Enc algorithm will be described with reference to. FIG. 20.

The processes of S421 to S423 are the same as the processes of S321 to S323 shown in FIG. 16.

(S424: Element c Generation Step)

With the processing device, a cipher element generation part 232 generates element c, which is an element of a ciphertext $ct_{\vec{x}}$, as indicated by Formula 187.

$$c := \left(\zeta, \overset{n}{\omega \vec{x}}, \overset{n}{0^n}, \overset{n}{0^n}, \overset{n}{\eta \vec{x}}\right)_\mathbb{B}$$ [Formula 187]

As with Formula 135, Formula 187 means that: $\zeta$ is set as the coefficient for a basis vector $b_0$ of the basis B; $\omega x_1, \ldots, \omega x_n$ are each set as the coefficient for basis vectors $b_1, \ldots, b_n$; 0 is set as the coefficient for basis vectors $b_{n+1}, \ldots, b_{3n}$; and $\eta x_1, \ldots, \eta x_n$ are each set as the coefficient for basis vectors $b_{3+1}, \ldots, b_{4n}$.

The process of S425 is the same as the process of S325 shown in FIG. 16.

(S426: Data Transmission Step)

For example, with the communication device, a data transmission part 240 transmits the ciphertext $ct_{\vec{x}}$, constituted by as elements: the vector $\vec{x}$ inputted in S422; the element c generated in S424; and an element $c_3$ generated in S425, to the decryption device 300 via the network. As a matter of course, the ciphertext $ct_{\vec{x}}$ might as well be transmitted to the decryption device 300 by another method.

More specifically, from S421 through S425, the encryption device 200 executes the Enc algorithm indicated by Formula 188, to generate the ciphertext $ct_{\vec{x}}$. In S426, the encryption device 200 transmits the generated ciphertext ct, to the decryption device 300.

$$Enc(pk, m, \vec{x}): \omega, \eta, \zeta \xleftarrow{U} \mathbb{F}_q,$$ [Formula 188]

$$c := \left(\zeta, \overset{n}{\omega \vec{x}}, \overset{n}{0^n}, \overset{n}{0^n}, \overset{n}{\eta \vec{x}}\right)_\mathbb{B},$$

$$c_3 := g_T^\zeta m,$$

$$\text{return } ct_{\vec{x}} := (\vec{x}, c, c_3).$$

The decryption device 300 will be described.

The process of the Dec algorithm will be described with reference to FIG. 21.

The processes of S431 to S432 are the same as the processes of S331 to S332 shown in FIG. 17.

(S433: Value $D_j$ Calculation Step)

With the processing device, a pairing operation part 330 calculates value $D_j$, as indicated by Formula 189.

for $j=1, \ldots, 4$ $$D_j := \Sigma_{L=1}^{n-1} v_L C_{(j-1)n+L}$$ [Formula 189]

Note that the element c is parsed as (4n+1)-tuples $(C^*_0, \ldots, C^*_{4n}) \in G^{4n+1}$.

(S434: Pairing Operation Step)

With the processing device, the pairing operation part 330 executes a pairing operation, as indicated by Formula 190, to calculate value F.

$$F := e(C_0, K_0^*) \cdot \Pi_{j=1}^4 (e(D_j, K_{1,j}^*) \cdot e(C_{jn}, K_{2,j}^*))$$ [Formula 190]

The process of S435 is the same as the process of S335 shown in FIG. 17.

More specifically, from S431 through S435, the decryption device 300 executes the Dec algorithm indicated by Formula 191, to calculate a message m'.

$$Dec(pk, sk_{\vec{v}} := (\vec{v}, K_0^*, \{K_{1,j}^*, K_{2,j}^*\}_{j=1,\ldots,4}),$$

$$ct_{\vec{x}} := (\vec{x}, c, c_3)):$$

Parse $c$ as a $(4n+1)$-tuple $(C_0, \ldots, C_{4n}) \in \mathbb{G}^{4n+1}$, $D_j^* := \Sigma_{L=1}^{n-1} v_L C_{(j-1)n+L}$ for $j=1, \ldots, 4$ $F := e(C_0, K_0^*) \cdot \Pi_{j=1}^4 (e(D_j, K_{1,j}^*) \cdot e(C_{jn}, K_{2,j}^*))$, return $m' := c_3/F$. [Formula 191]

Note that $B^* := (b_0^*, b_{4n}^*)$ is specified by $\{B_{0,0}^*, B_{0,j}^*, B_{i,0,L}^*, B_{i,j}^*, B'^*_{i,j,L}\}_{i,j=1;4;L=1,\ldots,n}$. Also, $\{B_{0,0}^*, B_{0,j}^*, B_{i,0,L}^*, B_{i,j}^*, B'^*_{i,j,L}\}_{i=1;3;j=1,\ldots,4;L=1,\ldots,n}$ included in an output of the Setup algorithm is specified by $B^{^*} := (b_0^*, b_n^*, b_{2n+1}^*, \ldots, b_{3n}^*)$.

The Dec algorithm can be described as Dec' algorithm indicated by Formula 192.

$$Dec'(pk, sk_{\vec{v}} := (\vec{v}, K_0^*, \{K_{1,j}^*, K_{2,j}^*\}_{j=1,\ldots,4}),$$ [Formula 192]

$$ct_{\vec{x}} := (\vec{x}, c, c_3)) : k^* :=$$

$$\left(K_0^*, \overbrace{v_1 K_{1,1}^*, \ldots, v_{n-1} K_{1,1}^*, K_{2,1}^*}^{n}, \ldots, \right.$$

$$\left. \overbrace{v_1 K_{1,4}^*, \ldots, v_{n-1} K_{1,4}^*, K_{2,4}^*}^{n}\right),$$

that is, $k^* = \left(1, \overbrace{\tfrac{n}{\delta \vec{v}}}, \overbrace{\tfrac{n}{0^n}}, \overbrace{\tfrac{n}{\varphi \vec{v}}}, \overbrace{\tfrac{n}{0^n}}\right) \mathbb{B}^*$, $F := e(c, k^*)$, return $m' := c_3/F$.

In the zero inner-product encryption scheme explained in Embodiment 5, the decryption key $sk_{\vec{v}}$ includes a total of 9 elements of G, namely, 1 by element $K_0^*$ and 8 by elements $K_{1,j}^*$ and $K_{2,j}^*$ for each integer j of $j=1, \ldots, 4$ indicated by Formula 185. In fine, the decryption key $sk_{\vec{v}}$ has a constant size in n.

Also, in the zero inner-product encryption scheme explained in Embodiment 5, the decryption process (Dec algorithm) executes a total of only 9 pairing operations, namely, 1 by $e(C_0, K_0^*)$ and 8 by $\Pi_{j=1}^4(e(D_j, K_{1,j}^*) \cdot e(C_{jn}, K_{2,j}^*))$ indicated by Formula 190. In fine, the decryption process requires only a small number of pairing operations.

The above embodiments employ the linear transformation X shown in (b) of FIG. 2. However, linear transformation X is not limited to that shown in (b) of FIG. 2. For example, in (b) of FIG. 2, the hatched squares may have values different from each other. In (b) of FIG. 2, all components in an N column have random values other than constant value 0. However, alternatively, in place of the N column, all components in at least one of other columns might as well have random values other than constant value 0.

More generally, linear transformation X suffices if it is a sparse matrix in which each row and each column have at least one value that is other than constant value 0. Furthermore, in case of an n-row, n-column matrix, linear transformation X preferably has at least n of different value g as values other than constant value 0. Furthermore, linear transformation X is preferably such that all components in at least one column have values other than constant value 0. Furthermore, linear transformation X is preferably such that its diagonal components and all components in at least one column have values other than constant value 0. Furthermore, linear transformation X is preferably such that its diagonal components have the same value except for columns in which all components have values other than constant value 0.

Even with such a linear transformation X, the sizes of the public parameters and secret key are smaller than in a case where conventional linear transformation X is used. Also, the time taken for the generation process of the user key and the encryption process is shortened.

Depending on the type of linear transformation X, the number of pairing operations cannot be decreased.

In the above embodiments, the vector space consists of four orthogonal subspaces, that is, encoding part, hidden part, secret-key randomness part, and ciphertext randomness part. In order to cope with this, the linear transformation X is constituted using an n-row, n-column matrix $X_{i,j}$ (i, j=1, ..., 4), as indicated by Formula 124. This structure of the linear transformation X rests on a premise that the subspaces of the hidden part, secret-key randomness part, and ciphertext randomness part are n-dimensional, as with the subspace of the encoding part.

Alternatively, the subspaces of the hidden part, secret-key randomness part, and ciphertext randomness part need not be n-dimensional unlike the subspace of the encoding part. For example, the subspace of the hidden part may be (n×u)-dimensional, the subspace of the secret-key randomness part may be (n×w)-dimensional, and the subspace of the ciphertext randomness part may be (n×z)-dimensional (u, w, and z are each an integer of 0 or more). In this case, the linear transform X may be constituted using an n-row, n-column matrix $X_{i,j}$ (i, j=1, ..., 1+u+w+z), as indicated by Formula 193.

$$X := \begin{pmatrix} X_{1,1} & \cdots & X_{1,1+u+w+z} \\ \vdots & & \vdots \\ X_{1+u+w+z,1} & \cdots & X_{1+u+w+z,1+u+w+z} \end{pmatrix}$$ [Formula 193]

ID (Identity)-based revocation (IBR) and ID (Identity)-based broadcast encryption (IBBE) constitute a class of functional encryption (see Non-Patent Literatures 1, 5, 6, 8, 19, and 12).

According to the ID-based revocation, a ciphertext is encrypted for a set of identities $S=(ID_1, \ldots, ID_n)$. The ciphertext is decrypted by a secret key associated with ID that does not satisfy ID∈ S. More specifically, decryption requires $R^{IBR}(ID, S)=1$ if and only if ID∈ S is not established.

According to the ID-based broadcast encryption, a ciphertext is encrypted for a set of identities $S=(ID_1, \ldots, ID_n)$. The ciphertext is decrypted by a secret key associated with ID that satisfies ID∈ S. More specifically, decryption requires $R^{IBBE}(ID, S)=1$ if and only if ID∈ S is established.

Assume $S(X) = \Sigma_{i=0}^n v_i X^i := \Pi_{i=1}^n (X - ID_i)$ where $S := \{ID_1, \ldots, ID_n\}$. Also, assume a vector $\vec{v} := (v_0, v_1, \ldots, v_n)$ and a vector $\vec{x} := (1, ID, \ldots, ID^n)$.

Then, the non-zero inner-product encryption scheme explained in Embodiments 2 and 3 can be regarded as an ID-based revocation scheme, and the zero inner-product encryption scheme explained in Embodiments 4 and 5 can be regarded as an ID-based broadcast encryption scheme.

More specifically, the inner-product encryption schemes explained in the above embodiments can implement an ID-based revocation scheme and an ID-based broadcast encryption scheme. In this case as well, a ciphertext or a decryption key can have a constant size in n, so that decryption can be conducted by a small number of pairing operations.

In addition to the practical encryption schemes explained in Embodiments 2 to 5, if the linear transformation X described above is applied to the encryption schemes explained in Non-Patent Literatures 13, 15, 16, 17, and the like, the sizes of the public parameters and secret key decrease. Also, the time taken for the generation process of the user key and the encryption process is shortened.

FIG. 22 shows comparison of the non-zero inner-product encryption schemes and zero inner-product encryption schemes explained in Embodiments 2 to 5 with the non-zero inner-product encryption scheme and the zero inner-product encryption scheme described in Non-Patent Literature 2.

In FIG. 22, $|G|$, $|G_T|$, $|F_q|$, P, and M represent size of G, size of $G_T$, size of $F_q$, pairing operation, and scalar multiplication on G, respectively. Also, CT, SK, IP, and DBDH stand for ciphertext, secret key (decryption key), inner product, and decisional bilinear Diffie-Hellman, respectively.

Embodiment 6

In the above embodiments, the method of implementing the cryptographic process in the dual vector spaces has been described. In Embodiment 6, a method of implementing a cryptographic process in dual additive groups will be described.

More specifically, in the above embodiments, the cryptographic process is implemented in the cyclic group of the prime order q. When a ring R is expressed using a composite number M as indicated by Formula 194, the cryptographic process described in the above embodiments can also be applied to an additive group having a ring R as a coefficient.

$$R := \mathbb{Z}/M\mathbb{Z} \quad [\text{Formula 194}]$$

where z : an integer; and

M: a composite number

If $F_q$ in the algorithm explained in the above embodiments is changed to R, the cryptographic process in a dual additive group can be implemented.

The hardware configuration of a cryptographic processing system 10 (a key generation device 100, an encryption device 200, and a decryption device 300) in an embodiment will be described.

FIG. 23 is a diagram showing an example of the hardware configuration of each of the key generation device 100, the encryption device 200, the decryption device 300, and a key delegation device 400.

As shown in FIG. 23, each of the key generation device 100, encryption device 200, decryption device 300, and key delegation device 400 includes a CPU 911 (Central Processing Unit; also referred to as central processing device, processing device, computation device, microprocessor, microcomputer, or processor) which executes programs. The CPU 911 is connected to a ROM 913, a RAM 914, an LCD 901 (Liquid Crystal Display), a keyboard 902 (KB), a communication board 915, and a magnetic disk device 920 via a bus 912, and controls these hardware devices. In place of the magnetic disk device 920 (fixed disk device), a storage device such as an optical disk device or memory card readwrite device may be employed. The magnetic disk device 920 is connected via a predetermined fixed disk interface.

The ROM 913 and the magnetic disk device 920 are examples of a nonvolatile memory. The RAM 914 is an example of a volatile memory. The ROM 913, the RAM 914, and the magnetic disk device 920 are examples of the storage device (memory). The keyboard 902 and the communication board 915 are examples of an input device. The communication board 915 is an example of a communication device. Furthermore, the LCD 901 is an example of a display device.

The magnetic disk device 920, ROM 913, or the like stores an operating system 921 (OS), a window system 922, programs 923, and files 924. The CPU 911, the operating system 921, and the window system 922 execute each program of the programs 923.

The programs 923 store software and programs that execute the functions described as the "master key generation part 110", "master key storage part 120", "information input part 130", "decryption key generation part 140", "key distribution part 150", "public parameter acquisition part 210", "information input part 220", "ciphertext generation part 230", "data transmission part 240", "decryption key acquisition part 310", "data reception part 320", "pairing operation part 330", "message calculation part 340", and the like in the above description. The programs 923 store other programs as well. The programs are read and executed by the CPU 911.

The files 924 store information, data, signal values, variable values, and parameters such as the "public parameters pk", "master secret key sk", "decryption key $sk_{v\to}$*", "ciphertext $ct_{x\to}$", and the like of the above explanation, as the items of a "file" and "database". The "file" and "database" are stored in a recording medium such as a disk or memory. The information, data, signal values, variable values, and parameters stored in the recording medium such as the disk or memory are read out to the main memory or cache memory by the CPU 911 through a readwrite circuit, and are used for the operations of the CPU 911 such as extraction, search, look-up, comparison, computation, calculation, process, output, print, and display. The information, data, signal values, variable values, and parameters are temporarily stored in the main memory, cache memory, or buffer memory during the operations of the CPU 911 including extraction, search, look-up, comparison, computation, calculation, process, output, print, and display.

The arrows of the flowcharts in the above explanation mainly indicate inputoutput of data and signals. The data and signal values are recorded in the memory of the RAM 914, the recording medium such as an optical disk, or in an IC chip. The data and signals are transmitted online via a transmission medium such as the bus 912, signal lines, or cables; or electric waves.

The "part" in the above explanation may be a "circuit", "device", "equipment", "means" or "function"; or a "step", "procedure", or "process". The "device" may be a "circuit", "equipment", "means", or "function"; or a "step", "procedure", or "process". The "process" may be a "step". Namely, the "part" may be implemented as firmware stored in the ROM 913. Alternatively, the "part" may be implemented by only software; by only hardware such as an element, a device, a substrate, or a wiring line; by a combination of software and hardware; or furthermore by a combination of software, hardware, and firmware. The firmware and software are stored, as a program, in the recording medium such as the ROM 913. The program is read by the CPU 911 and executed by the CPU 911. Namely, the program causes the computer or the like to function as a "part" described above. Alternatively, the program causes the computer or the like to execute the procedure and method of the "part" described above.

REFERENCE SIGNS LIST

10: cryptographic processing system; 100: key generation device; 110: master key generation part; 111: space generation part; 112: matrix generation part; 113: basis generation part; 114: key generation part; 120: master key storage part; 130: information input part; 140: decryption key generation part; 141: random number generation part; 142: key element generation part; key distribution part; 200: encryption device; 210: public parameter acquisition part; 220: information input part; 230: ciphertext generation part; 231: random number generation part; 232: cipher element generation part; 240: data transmission part; 300: decryption device; 310: decryption key acquisition part; 320: data reception part; 330: pairing operation part; 340: message calculation part

The invention claimed is:

1. A cryptographic processing system configured to utilize a basis B and a basis B* generated by transforming a predetermined basis A using a sparse matrix in which each row and each column have at least one value that is other than constant value 0, to conduct a cryptographic process, the cryptographic processing system comprising:
   encryption circuitry that generates a vector in the basis B, the vector being embedded with predetermined information, as a cipher vector; and
   decryption circuitry that, by treating a predetermined vector in the basis B* as a key vector, conducts a pairing operation for the key vector and the cipher vector which is generated by the encryption circuitry, so as to decrypt the cipher vector, and extracts information on the predetermined information.

2. The cryptographic processing system according to claim 1, wherein the sparse matrix is an n-row, n-column (n is an integer of 2 or more) matrix, and has at least n of different values as a value other than constant value 0.

3. The cryptographic processing system according to claim 2, wherein the sparse matrix is such that all components in at least one column have values other than constant value 0.

4. The cryptographic processing system according to claim 3, wherein the sparse matrix is such that diagonal components thereof and all components in at least one column have values other than constant value 0.

5. The cryptographic processing system according to claim 4, wherein the sparse matrix is such that the diagonal components have the same value except for the column in which all components have values other than constant value 0.

6. The cryptographic processing system according to claim 5, wherein the sparse matrix is a matrix indicated by Formula 1:

$$\begin{pmatrix} \mu & & & \mu'_1 \\ & \ddots & & \vdots \\ & & \mu & \mu'_{n-1} \\ & & & \mu'_n \end{pmatrix} \quad [\text{Formula 1}]$$

where $\mu, \mu'_1, \ldots, \mu'_n$ are each a predetermined value other than constant value 0, and blank portions represent constant value 0.

7. The cryptographic processing system according to claim 1, wherein a basis B and a basis B* are used, the basis B and the basis B* being generated from the basis A as indicated by Formula 3 using an N-row, N-column (N is an integer of n or more) linear transformation X constituting a sparse matrix in which a 1st row, 1st column value to an n-th row, n-th column value are as indicated by Formula 2,
   wherein the encryption circuitry generates a vector including Formula 4, as the cipher vector, and
   wherein the decryption circuitry, by treating a vector k* including Formula 5, as the key vector, decrypts the cipher vector:

$$\begin{pmatrix} \mu_1 & & & \mu'_1 \\ & \ddots & & \vdots \\ & & \mu_{n-1} & \mu'_{n-1} \\ & & & \mu'_n \end{pmatrix} \quad [\text{Formula 2}]$$

where $\mu_1, \ldots, \mu_{n-1}, \mu'_1, \ldots, \mu'_n$ are each a predetermined value other than constant value 0, and blank portions represent constant value 0, $$b_i := \Sigma_{j=1}^N \chi_{i,j} a_j \text{ for } i=1, \ldots, N, B := (b_1, \ldots, b_N)$$

$$\theta_{i,j} := \psi \cdot (X^T)^{-1},$$

$$b_i^* := \Sigma_{j=1}^N \theta_{i,j} a_j \text{ for } i=1, \ldots, N, B^* := (b^*_1, \ldots, b^*_N) \quad [\text{Formula 3}]$$

where $\chi_{i,j}$ is an i-th row, j-th column component of the linear transformation X, $\psi$ is a predetermined value, and $a_j$ is a j-th basis vector of the basis A, $$\Sigma_{i=1}^n \omega x_i b_i \quad [\text{Formula 4}]$$

where $\omega$ and $x_1, \ldots, x_n$ are each a predetermined value, and $$\Sigma_{i=1}^n \delta v_i b_i^* \quad [\text{Formula 5}]$$

where $\delta$ and $v_1, \ldots, v_n$ are each a predetermined value.

8. The cryptographic processing system according to claim 7,
   wherein the sparse matrix indicated by Formula 2 has values $B_i$ (i=1, ..., n−1) which are the same value B,
   wherein the encryption circuitry generates a vector including a vector $C_1$ and a vector $C_2$, as the cipher vector, the vector $C_1$ including Formula 6, the vector $C_2$ including Formula 7, and
   wherein the encryption circuitry calculates D* indicated by Formula 8, to conduct pairing operation indicated by Formula 9:

$$C_1 := \omega B_1 \quad [\text{Formula 6}]$$

$$C_2 := \Sigma_{i=1}^n x_i (\omega B_i') \quad [\text{Formula 7}]$$

$$D^* := \Sigma_{i=1}^{n-1} ((\vec{x} \cdot \vec{v})^{-1} x_i) K_i^* \quad [\text{Formula 8}]$$

where $K^*_1, \ldots, K^*_{n-1}$ are each a component of basis vectors $b^*_1, \ldots, b^*_{n-1}$ for a case where the vector k* is decomposed into components for respective basis vectors, $$e(C_1, D^*) \cdot e(C_2, K_n^*) \quad [\text{Formula 9}]$$

where $K^*_n$ is a component of a basis vector $b^*_n$ for a case where the vector k* is decomposed into components for respective basis vectors.

9. The cryptographic processing system according to claim 7,
   wherein the sparse matrix indicated by Formula 2 has values $B_i$, (i=1, ..., n−1) which are the same value B,
   wherein the encryption circuitry generates a vector including a vector $C_1$ and a vector $C_2$, as the cipher vector, the vector $C_1$ including Formula 10, the vector $C_2$ including Formula 11, and
   wherein the encryption circuitry calculates D* indicated by Formula 12, to conduct pairing operation indicated by Formula 13:

$$C_1 := \omega B_1 \quad [\text{Formula 10}]$$

$$C_2 := \Sigma_{i=1}^n x_i (\omega B_i') \quad [\text{Formula 11}]$$

$$D^* := \Sigma_{i=1}^{n-1} x_i K_i^* \quad [\text{Formula 12}]$$

where $K^*_1, \ldots, K^*_{n-1}$ are each a component of basis vectors $b^*_1, \ldots, b^*_{n-1}$ for a case where the vector $k^*$ is decomposed into components for respective basis vectors, and $$e(C_1, D^*) \cdot e(C_2, K_n^*) \quad \text{[Formula 13]}$$

where $K^*_n$ is a component of a basis vector $b^*_n$ for a case where the vector $k^*$ is decomposed into components for respective basis vectors.

10. The cryptographic processing system according to claim 1, wherein a basis B and a Basis B* are utilized, the basis B and the basis B* being generated from the basis A as indicated by Formula 15 using an N-row, N-column (N is an integer of n or more) linear transformation X constituting a sparse matrix in which a 1st row, 1st column value to an n-th row, n-th column value are as indicated by Formula 14, wherein the encryption circuitry generates a vector c including Formula 16, as the cipher vector, and wherein the decryption circuitry by treating a vector including Formula 17, as the key vector, decrypts the cipher vector:

$$\begin{pmatrix} \mu_1 & & & \mu'_1 \\ & \ddots & & \vdots \\ & & \mu_{n-1} & \mu'_{n-1} \\ & & & \mu'_n \end{pmatrix} \quad \text{[Formula 14]}$$

where $\mu_1, \ldots, \mu_{n-1}, \mu'_1, \ldots, \mu'_n$ are each a predetermined value other than constant value 0, and blank portions represent constant value 0, $$b_i^* := \Sigma_{j=1}^N \chi_{i,j} a_j \text{ for } i=1, \ldots, N, B^* := (b^*_1, \ldots, b^*_N)$$

$$\theta_{i,j} := \psi \cdot (X^T)^{-1},$$

$$b_i := \Sigma_{j=1}^N \theta_{i,j} a_j \text{ for } i=1, \ldots, N, B := (b_1, \ldots, b_N) \quad \text{[Formula 15]}$$

where $\chi_{i,j}$ is an i-th row, j-th column component of the linear transformation X, $\psi$ is a predetermined value, and $a_j$ is a j-th basis vector of the basis A, $$\Sigma_{i=1}^n \omega x_i b_i \quad \text{[Formula 16]}$$

where $\omega$ and $x_1, \ldots, x_n$ are each a predetermined value, and $$\Sigma_{i=1}^n \delta v_i b_i^* \quad \text{[Formula 17]}$$

where $\delta$ and $v_1, \ldots, v_n$ are each a predetermined value.

11. The cryptographic processing system according to claim 10, wherein the sparse matrix indicated by Formula 14 has values $B_i$, (i=1, ..., n−1) which are the same value B, and wherein the decryption circuitry, by treating a vector including a vector $K^*_1$ and a vector $K^*_2$, as the key vector, the vector $K^*_1$ including Formula 18, the vector $K^*_2$ including Formula 19, calculates $D^*$ indicated by Formula 20, to conduct pairing operation indicated by Formula 21:

$$K_1^* := \delta B_1 \quad \text{[Formula 18]}$$

$$K_2^* := \Sigma_{i=1}^n v_i(\delta B_i') \quad \text{[Formula 19]}$$

$$D := \Sigma_{i=1}^{n-1} ((\vec{x} \cdot \vec{v})^{-1} v_i) C_i \quad \text{[Formula 20]}$$

where $C_1, \ldots, C_{n-1}$ are each a component of basis vectors $b_1, \ldots, b_{n-1}$ for a case where the vector c is decomposed into components for respective basis vectors, and $$e(D, K_1^*) \cdot e(C_n, K_2^*) \quad \text{[Formula 21]}$$

where $C_n$ is a component of a basis vector $b_n$ for a case where the vector c is decomposed into components for respective basis vectors.

12. The cryptographic processing system according to claim 10, wherein the sparse matrix indicated by Formula 14 has values B, (i=1, ..., n−1) which are the same value B, and wherein the decryption circuitry, by treating a vector including a vector $K^*_1$ and a vector $K^*_2$, as the key vector, the vector $K^*_1$ including Formula 22, the vector $K^*_2$ including Formula 23, calculates $D^*$ indicated by Formula 24, to conduct pairing operation indicated by Formula 25:

$$K_1^* := \delta B_1 \quad \text{[Formula 22]}$$

$$K_2^* := \Sigma_{i=1}^n v_i(\delta B_i') \quad \text{[Formula 23]}$$

$$D := \Sigma_{i=1}^{n-1} v_i C_i \quad \text{[Formula 24]}$$

where $C_1, \ldots, C_{n-1}$ are each a component of basis vectors $b_1, \ldots, b_{n-1}$ for a case where the vector c is decomposed into components for respective basis vectors, and $$e(D, K_1^*) \cdot e(C_n, K_2^*) \quad \text{[Formula 25]}$$

where $C_n$ is a component of the basis vector b. for a case where the vector c is decomposed into components for respective basis vectors.

13. A cryptographic processing method configured to utilize a basis B and a basis B* generated by transforming a predetermined basis A using a sparse matrix in which each row and each column have at least one value other than 0, to conduct a cryptographic process, the cryptographic processing method comprising:

with an encryption device, generating a vector in the basis B, the vector being embedded with predetermined information, as a cipher vector; and with a decryption device, by treating a predetermined vector in the basis B* as a key vector, conducting a pairing operation for the key vector and the cipher vector which is generated by the encryption device, so as to decrypt the cipher vector, and extracting information on the predetermined information.

14. A non-transitory computer-readable medium encoded with computer-readable instructions that, when executed by a computer, cause the computer to utilize a basis B and a basis B* generated by transforming a predetermined basis A using a sparse matrix in which each row and each column have at least one value other than 0, to perform a method, comprising:

generating a vector in the basis B, the vector being embedded with predetermined information, as a cipher vector; and by treating a predetermined vector in the basis B* as a key vector, conducting a pairing operation for the key vector and the cipher vector so as to decrypt the cipher vector, and extracting information on the predetermined information.

15. A key generation device for generating a public parameter and a secret key in public key encryption, comprising:

a matrix generation circuit which generates a linear transformation X including a sparse matrix in which each row and each column have at least one value other than 0;

a basis generation circuit which generates a basis D and a basis D* from a predetermined basis A as indicated by Formula 26 using the linear transformation X generated by the matrix generation circuit; and a master key generation circuit which, by treating at least part of basis vectors of one of the basis D and the basis D* generated by the basis generation circuit, as a public parameter, generates at least part of basis vectors of a remaining one of the basis D and the basis D*, as a secret key:

$$b_i := \sum_{j=1}^{N} \chi_{i,j} a_j \text{ for } i=1, \ldots, N, D:=(b_1, \ldots, b_N)$$

$$\theta_{i,j} := \psi \cdot (X^T)^{-1},$$

$$b_i^* := \sum_{j=1}^{N} \theta_{i,j} a_j \text{ for } i=1, \ldots, N, D^*:=(b^*_1, \ldots, b^*_N) \quad \text{[Formula 26]}$$

where $\chi_{i,j}$ is an i-th row, j-th column component of the linear transformation X, $\psi$ is a predetermined value, and $a_j$ is a j-th basis vector of the basis A.

* * * * *